(12) United States Patent
Bacher et al.

(10) Patent No.: US 7,754,863 B2
(45) Date of Patent: Jul. 13, 2010

(54) HIGH-CAPACITY OPTICAL STORAGE MEDIA

(75) Inventors: Jean-Pierre Bacher, Buschwiller (FR); Gisèle Baudin, Allschwil (CH); Frédérique Wendeborn, Ranspach-le-Haut (FR); Jean-Marie Adam, Rosenau (FR); Urs Lehmann, Basel (CH); Jean-Luc Birbaum, Binningen (CH)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 537 days.

(21) Appl. No.: 11/659,993

(22) PCT Filed: Jul. 6, 2005

(86) PCT No.: PCT/EP2005/053215

§ 371 (c)(1),
(2), (4) Date: Feb. 12, 2007

(87) PCT Pub. No.: WO2006/018352

PCT Pub. Date: Feb. 23, 2006

(65) Prior Publication Data

US 2007/0248782 A1 Oct. 25, 2007

(30) Foreign Application Priority Data

| Aug. 16, 2004 | (EP) | 04103931 |
| Nov. 5, 2004 | (EP) | 04105558 |
| Feb. 2, 2005 | (EP) | 05100720 |

(51) Int. Cl.
C09B 45/34 (2006.01)
C09B 69/02 (2006.01)
G11B 7/24 (2006.01)

(52) U.S. Cl. .................. 534/698; 534/707; 534/710; 428/64.4

(58) Field of Classification Search .................. None
See application file for complete search history.

(56) References Cited

U.S. PATENT DOCUMENTS

| 4,686,143 | A | 8/1987 | Yoshikawa et al. | 428/411.1 |
| 5,330,542 | A | 7/1994 | Maeda et al. | 8/639 |
| 5,426,015 | A | 6/1995 | Chapman et al. | 430/275 |
| 5,500,325 | A | 3/1996 | Chapman et al. | 430/270.16 |
| 5,876,821 | A | 3/1999 | Chapman et al. | 428/64.1 |
| 6,103,331 | A | 8/2000 | Kanno | 428/64.1 |
| 6,168,843 | B1 | 1/2001 | Kambe et al. | 428/64.1 |
| 6,242,067 | B1 | 6/2001 | Kambe et al. | 428/64.1 |
| 6,361,922 | B1 | 3/2002 | Chapman et al. | 430/270.19 |
| 6,741,547 | B2* | 5/2004 | Tomura et al. | 369/275.4 |
| 7,402,375 | B2* | 7/2008 | Kasada et al. | 430/270.2 |
| 2001/0044074 | A1 | 11/2001 | Hohsaka et al. | 430/270.21 |
| 2002/0028918 | A1 | 3/2002 | Kasada et al. | 534/693 |
| 2002/0178517 | A1 | 12/2002 | Kasada et al. | 8/644 |
| 2005/0226135 | A1* | 10/2005 | Morita et al. | 369/275.4 |
| 2005/0227178 | A1* | 10/2005 | Morita et al. | 430/270.18 |
| 2005/0238840 | A1 | 10/2005 | Lehmann et al. | 428/64.8 |
| 2005/0240019 | A1* | 10/2005 | Kasada et al. | 546/2 |
| 2005/0250047 | A1 | 11/2005 | Morton et al. | 430/270.15 |
| 2007/0042152 | A1 | 2/2007 | Adam et al. | 428/64.1 |
| 2007/0265455 | A1* | 11/2007 | Yano et al. | 548/471 |

FOREIGN PATENT DOCUMENTS

| JP | 1-121442 | 1/1989 |
| JP | 2-55189 | 2/1990 |
| JP | 3-51182 | 5/1991 |
| JP | 2002-293031 | 10/1992 |
| JP | 2000-198273 | 7/2000 |
| JP | 2002/002118 | 1/2002 |
| WO | WO 01/19923 | * 3/2001 |

OTHER PUBLICATIONS

English language abstract No. 1990:542417 and 90-103951/14 of JP 2-55189.
English language abstract of JP 11-213442 from the esp@cenet web site printed on Mar. 8, 2007.
English language abstract of JP 2002-293031 from the esp@cenet web site printed on Mar. 8, 2007.
English language abstract of JP 2000-198273 from the esp@cenet web site printed on Nov. 23, 2005.
S.I. Gusev et al., Zhurnal Analiticheskoj Khimii, vol. 40, No. 12, pp. 2134-2137, (1985).
S. Zareba; Acta Poloniae Pharmaceutica, vol. 49, No. 5, pp. 55-61, (1992).

* cited by examiner

Primary Examiner—Fiona T Powers
(74) Attorney, Agent, or Firm—Tyler A. Stevenson

(57) ABSTRACT

The invention accordingly relates to an optical recording medium comprising a substrate, a reflecting layer and a recording layer, wherein the recording layer comprises a compound of formula (I) or a mesomeric or a tautomeric form thereof, wherein $M_1$ is a metal cation in the oxidation state +3, a hydroxy or halogeno metal group wherein the metal is in the oxidation state +4, or an oxo metal group wherein the metal is in the oxidation state +5; (III) and (IV)are each independently of the other (V), (VI) or (VII); (VIII) is (IX), (X), (XI), (XII), (XIII), or (XIV); (XV) is (XVI) or $C_{2-C_8}$heteroaryl unsubstituted or mono- or poly-substituted by $R_{10}$, $R_{11}$, $R_{12}$ and/or $R_{13}$; $Q_1$ is N or $CR_{18}$, $Q_2$ is N or $CR_{19}$, $Q_3$, $Q_5$ and $Q_7$ are each independently of the other $CR_{20}R_{21}$, O, S or $NR_{22}$, $Q_4$ is $CR_{16}$ or N and $Q_6$ is $CR_{17}$ or N; and $R_2$ and/or $R_6$ are O, S or $NR_{33}$. Please see the disclosure for the other substituents which are less relevant. The compounds of formula (I) are novel and also claimed, as well as the compound of formula (II), or a mesomer or tautomer thereof, wherein R38 is halogen, $CF_3$, $NO_2$, CN, $COR_{22}$, $COOR_{23}$, $SO_3R_{23}$, NCO or SCN, $G_1$, $G_2M_1$, $R_1R_2$, $R_4$, $R_5$, $R_6$, $R_8$, $R_{22}$ and $R_{23}$ are as defined in formula (I), $M_2^{m+}$ is a cation with m positive charges, and m is an integer 1, 2 or 3. The optical recording media are remarkably suitable for DVD±R (658 nm), especially at high recording speeds.

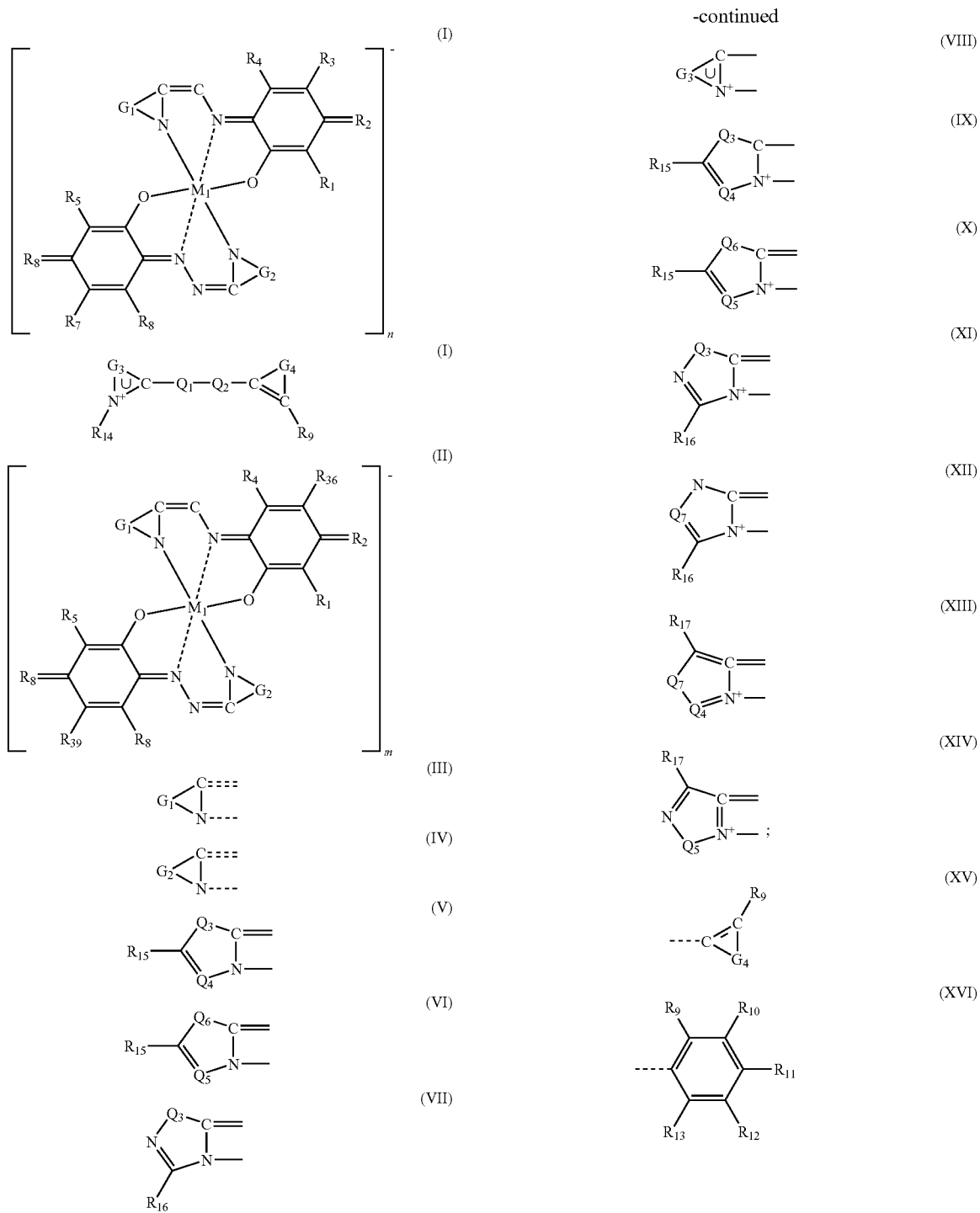

HIGH-CAPACITY OPTICAL STORAGE MEDIA

The field of the invention is the optical storage of information on write-once storage media, the information pits being differentiated by the different optical properties of a colorant at written and unwritten sites. This technology is usually termed "WORM" (for example "CD-R", "DVD-R", "DVD+R"); those terms have been retained herein.

By the use of compact high-performance diode lasers that emit in the range of from 630 to 690 nm, it is possible in principle to achieve a 4- to 5-fold improvement in data packing density and a 6- to 8-fold increase in storage capacity in comparison with media having a blue or green layer, in that the track pitch (distance between two turns of the information track) and the size of the pits can be reduced, for example, to approximately half the value in comparison with conventional CDs.

This imposes extraordinarily high demands on the recording layer to be used, however, such as high refractive index, uniformity of script width at different length pulse durations and also high light stability in daylight with, at the same time, high sensitivity to high-energy laser radiation especially at high recording speeds. The known recording layers possess those properties only to an unsatisfactory extent.

JP-A-02/55 189 and JP-A-03/51 182 disclose optical storage media in which the recording layer consists substantially of a cyanine dye and an O-coordinated, homocyclic azo metal complex.

U.S. Pat. No. 6,168,843, U.S. Pat. No. 6,242,067 and JP-A-2000/198273 disclose storage media suitable for recording using a laser of wavelength 635-650 nm that consist of mixtures of cyanine or phthalocyanine dyes with para-amino- and nitro- or halo-substituted, homocyclic azo metal complexes, which are also O-coordinated. Those azo metal complexes may additionally be substituted by hydroxy. Comparison Example 2 of U.S. Pat. No. 6,242,067 discloses, however, that hydroxy substitution results in insufficient solubility. In addition, the sensitivity of compounds according to U.S. Pat. No. 6,168,843 is sufficient only for single (1x), or in the case of compounds according to U.S. Pat. No. 6,242,067 double (2x), DVD-recording speed. WO-03/098 617 and WO-03/098 618 disclose pentacyclic rhodamines, in combination with which inter alia also O-coordinated, homocyclic azo metal complexes are mentioned.

U.S. Pat. No. 4,686,143 discloses writable optical information media that can be written at 780 nm and comprise metal complexes of monoazo compounds having an aromatic ring and an N-heteroaromatic ring. The N-heteroaromatic ring may be unsubstituted or substituted by an electron acceptor substituent and both rings may be substituted by an electron donor substituent, illustrated, for example, by the ligand "NBTADMAP" of the formula

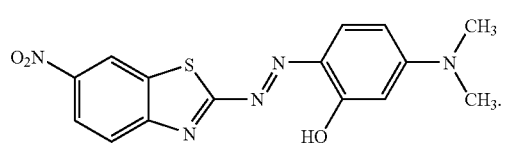

JP-A-2002/002 118 likewise discloses for use at 780 nm writable optical information media comprising metal complexes of heterocyclic azo compounds, for example those of the formula

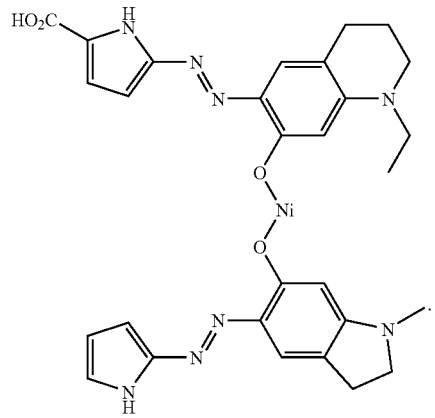

JP-A-2002/293 031 proposes the combination of metal complexes from JP-A-02/55 189 and JP-A-03/51 182 with those of U.S. Pat. No. 6,168,843, U.S. Pat. No. 6,242,067 and JP-A-2000/198273.

JP-A-11/213442 discloses an optical recording medium of geometry suitable for use in the range from 620 to 690 nm, comprising a metal complex of a heterocyclic azo ligand of the formula

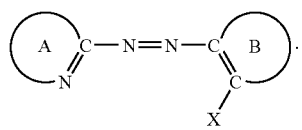

While A may be substituted by both an electron-donating or an electron-attracting group, however, B may only be substituted by an electron-donating group.

EP-A-1 125 987 similarly discloses cyanine azo metal complexes. The examples wherein one ligand is a heterocyclic group all have a diethylamino group in para position to the azo group. This is also the case in formula 16 of EP-A-1 174472.

A leitmotif in all those publications is that a dialkylated amino group in the para-position to the azo group is essential for good performance in optical information media.

EP-A-1 170 339 discloses styryl dyes of the generic formula

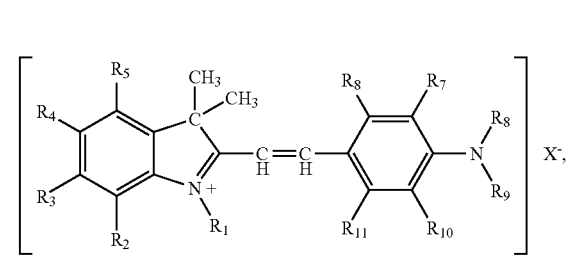

wherein, among other formulae, X⁻ may be a complex of structure

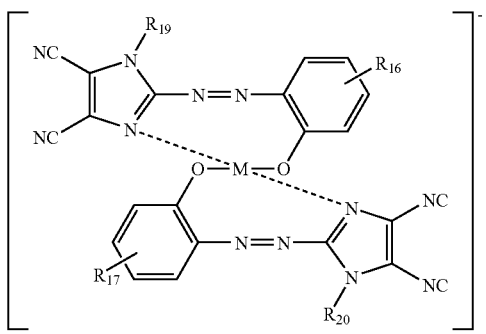

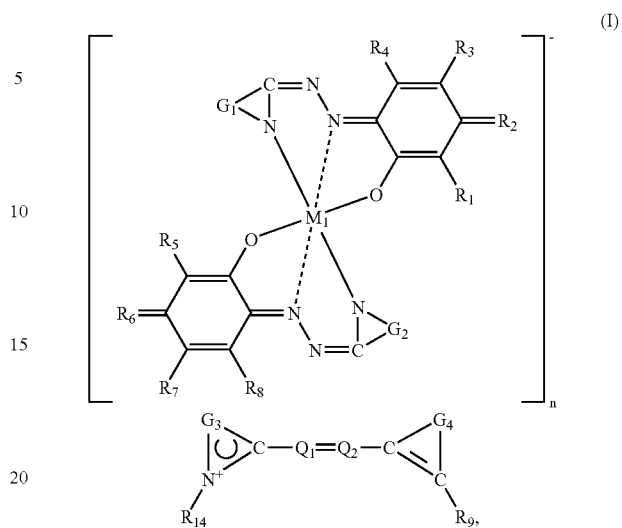

$R_{16}$ and $R_{17}$, however, do not comprise any deprotonated group. Furthermore, the only example of such complex (chemical formula 8), while lacking embodiment, shows protonated heterocyclic rings ($R_{19}/R_{20}$) with the metal in the oxidation state +1 (see comparative example).

WO 2004/088649 is a patent application according to Art. 54(3) EPC and Rule 64.3 PCT, which is directed to a broad choice of metal complex dyes.

However, the properties of the known recording media still leave something to be desired, especially in respect of the quality of recordings using a laser of a wavelength around 658±5 nm (DVD-R or DVD+R, hereafter DVD±R).

The aim of the present invention is to provide an optical recording medium, the recording layer of which has high storage capacity combined with excellent other properties. Such a recording medium should be both writable and readable at the same wavelength in the range of from 600 to 700 nm (preferably from 630 to 690 nm). The main features of the recording layer according to the invention are the very high initial reflectivity in the said wavelength range of the laser diodes, which can be modified with great sensitivity; the high refractive index; the good uniformity of the script width at different pulse durations; the excellent light and multiple read stability; and the good solubility in polar solvents, as well as excellent compatibility with laser sources of different wavelengths both for recording and for playback.

Very surprisingly, by the use of certain salts of styryl or azo cations with metal complex anions having particular substituents as recording layer or as an additive to the recording layer, it has been possible to provide an optical recording medium having properties that are astonishingly better than those of the recording media known hitherto. The refractive index in the solid layer is astonishingly very high. The layers are unexpectedly neither hygroscopic nor moisture-sensitive and possess a high environmental, light and multiple read stability. The instant cations surprisingly provide a high solubility, which is not expected in view of the metal complex anion's general physicochemical properties.

The invention accordingly relates to an optical recording medium comprising a substrate, a reflecting layer and a recording layer, wherein the recording layer comprises a compound of formula or a mesomeric or tautomeric form thereof, wherein $M_1$ is a metal cation in the oxidation state +3, a hydroxy or halogeno metal group wherein the metal is in the oxidation state +4, or an oxo metal group wherein the metal is in the oxidation state +5;

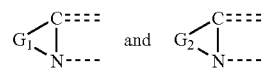

are each independently of the other

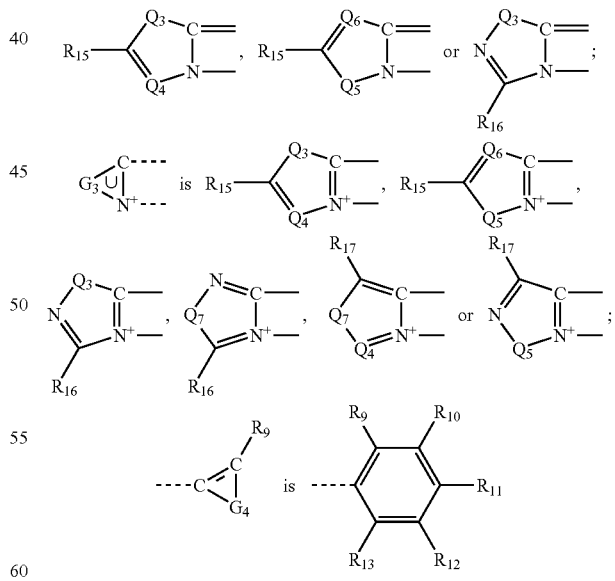

or $C_2$-$C_8$heteroaryl unsubstituted or mono- or poly-substituted by $R_{10}$, $R_{11}$, $R_{12}$ and/or $R_{13}$;

$Q_1$ is N or $CR_{18}$, $Q_2$ is N or $CR_{19}$, $Q_3$, $Q_5$ and $Q_7$ are each independently of the other $CR_{20}R_{21}$, O, S or $NR_{22}$, $Q_4$ is $CR_{16}$ or N and $Q_6$ is $CR_{17}$ or N;

$R_1$, $R_3$, $R_4$, $R_5$, $R_7$, $R_8$, $R_9$, $R_{10}$, $R_{11}$, $R_{12}$, $R_{13}$, $R_{15}$, $R_{16}$, $R_{17}$, $R_{18}$ and $R_{19}$ are each independently of all others H, halogen, $OR_{23}$, $SR_{23}$, $NR_{22}R_{24}$, $NR_{22}COR_{25}$, $NR_{22}COOR_{26}$, $NR_{22}CONR_{26}R_{27}$, $NR_{22}CN$, $OSiR_{22}R_{25}R_{28}$, $COR_{22}$, $CR_{22}OR_{25}OR_{28}$, $NO_2$, $CN$, $COOR_{23}$, $CONR_{26}R_{27}$, $SO_2R_{22}$, $SO_2NR_{26}R_{27}$, $SO_3R_{26}$, $PO(OR_{22})(OR_{25})$; $C_1$-$C_6$alkyl, $C_2$-$C_6$alkenyl, $C_2$-$C_6$alkynyl, $C_3$-$C_6$cycloalkyl, $C_3$-$C_6$cycloalkenyl or $C_2$-$C_5$heterocycloalkyl each unsubstituted or mono- or poly-substituted by halogen, $OR_{23}$, $SR_{23}$, $NR_{22}R_{24}$, $NR_{22}COR_{25}$, $NR_{22}COOR_{23}$, $NR_{22}CONR_{26}R_{27}$, $NR_{22}CN$, $COR_{22}$, $CR_{22}OR_{25}OR_{28}$, $NO_2$, $CN$, $COOR_{23}$, $CONR_{26}R_{27}$ and/or $SO_2R_{26}$; or $C_7$-$C_{11}$aralkyl, $C_6$-$C_{10}$aryl or $C_1$-$C_8$heteroaryl each unsubstituted or mono- or poly-substituted by $C_1$-$C_4$alkyl, halogen, $OR_{23}$, $SR_{23}$, $NR_{22}R_{24}$, $COR_{22}$, $NO_2$, $CN$ and/or $COOC_1$-$C_4$alkyl; or $R_{15}$ and $R_{16}$ or $R_{15}$ and $R_{17}$ are together in pairs

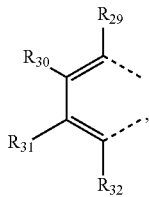

thus forming a phenyl ring together with the two adjacent carbons to which they are bound;

$R_2$ and/or $R_6$ are O, S or $NR_{33}$;

$R_{14}$ is $C_1$-$C_{12}$alkyl, $C_3$-$C_{12}$cycloalkyl, $C_1$-$C_{12}$heterocycloalkyl, $C_2$-$C_{12}$alkenyl, $C_3$-$C_{12}$cycloalkenyl, $C_4$-$C_{12}$heterocycloalkenyl, $C_7$-$C_{12}$aralkyl, $C_1$-$C_9$heteroaryl, $C_2$-$C_{11}$heteroaralkyl, $C_6$-$C_{12}$aryl or $C_1$-$C_{12}$alkyl interrupted by from one to five non-successive oxygen and/or sulfur atoms and/or by from one to five identical or different groups $NR_{22}$, each unsubstituted or mono- or poly-substituted by halogen, $OR_{23}$, $SR_{23}$, $NR_{22}R_{24}$, $NR_{22}COR_{25}$, $NR_{22}COOR_{26}$, $NR_{22}CONR_{26}R_{27}$, $NR_{22}CN$, $OSiR_{22}R_{25}R_{28}$, $COR_{22}$, $CR_{22}OR_{25}OR_{28}$, $NO_2$, $CN$, $COOR_{23}$, $CONR_{26}R_{27}$, $SO_2R_{22}$, $SO_2NR_{26}R_{27}$, $SO_3R_{26}$ or $PO(OR_{22})(OR_{25})$;

$R_{20}$ and $R_{21}$ are each independently of the other $C_1$-$C_{12}$alkyl, $C_2$-$C_{12}$alkenyl, $C_2$-$C_{12}$alkynyl, $C_7$-$C_{12}$aralkyl, $C_3$-$C_{12}$cycloalkyl, $C_3$-$C_{12}$cycloalkenyl or $C_2$-$C_{11}$hetero-cycloalkyl each unsubstituted or mono- or poly-substituted by halogen, $OR_{23}$, $SR_{23}$, $NR_{22}R_{24}$, $NR_{22}COR_{25}$, $NR_{22}COOR_{23}$, $NR_{22}CONR_{26}R_{27}$, $NR_{22}CN$, $COR_{22}$, $CR_{22}OR_{25}OR_{28}$, $NO_2$, $CN$, $COOR_{23}$, $CONR_{26}R_{27}$ and/or $SO_2R_{26}$; or $R_{20}$ and $R_{21}$ are together $C_2$-$C_{12}$alkylene, $C_2$-$C_{12}$alkenylene, $C_2$-$C_{12}$cycloalkylene or $C_2$-$C_{12}$cycloalkenylene, one to five non-successive carbon atoms of which can be replaced by oxygen and/or sulfur atoms and/or by identical or different groups $NR_{22}$, $C_2$-$C_{12}$alkylene, $C_2$-$C_{12}$alkenylene, $C_2$-$C_{12}$cycloalkylene or $C_2$-$C_{12}$cycloalkenylene being each unsubstituted or mono- or poly-substituted by halogen, $OR_{23}$, $SR_{23}$, $NR_{22}R_{24}$, $NR_{22}COR_{25}$, $NR_{22}COOR_{23}$, $NR_{22}CONR_{26}R_{27}$, $NR_{22}CN$, $COR_{22}$, $CR_{22}OR_{25}OR_{28}$, $NO_2$, $CN$, $COOR_{23}$, $CONR_{26}R_{27}$ and/or $SO_2R_{26}$;

$R_{22}$, $R_{25}$ and $R_{28}$ are each independently of the others hydrogen; $C_1$-$C_4$alkyl, $C_2$-$C_4$alkenyl, $C_2$-$C_4$alkynyl, $[C_2$-$C_3$alkylene-O$-]_k$-$R_{34}$ or $[C_2$-$C_3$alkylene-$NR_{35}-]_k$-$R_{34}$ each unsubstituted or mono- or poly-substituted by halogen; or benzyl;

each $R_{23}$, independently of any other $R_{23}$, is $R_{24}$ or $R_{33}$, preferably H;

$R_{24}$, $R_{26}$ and $R_{27}$ are each independently of the others H; $C_1$-$C_6$alkyl, $C_2$-$C_6$alkenyl, $C_2$-$C_6$alkynyl, $C_3$-$C_6$cycloalkyl, $C_3$-$C_6$cycloalkenyl or $C_2$-$C_5$heterocycloalkyl each unsubstituted or mono- or poly-substituted by halogen, $OR_{23}$, $SR_{23}$, $NR_{22}R_{28}$, CN and/or $COOR_{22}$; or $C_6$-$C_{10}$aryl, $C_7$-$C_{11}$aralkyl or $C_1$-$C_8$heteroaryl each unsubstituted or mono- or poly-substituted by $C_1$-$C_4$alkyl, halogen, $OR_{23}$, $SR_{23}$, $NR_{22}R_{25}$, $COR_{22}$, $CR_{22}OR_{25}OR_{28}$, $NO_2$, CN and/or $COOR_{28}$;

or $NR_{22}R_{24}$, $NR_{22}R_{25}$, $NR_{25}R_{28}$ or $NR_{26}R_{27}$ is a five- or six-membered heterocycle which may contain a further N or O atom and which can be mono- or poly-substituted by methyl or ethyl;

$R_{29}$, $R_{30}$, $R_{31}$ and $R_{32}$ are each independently of the other H, $C_1$-$C_4$alkyl, halogen, $OR_{23}$, $SR_{23}$, $NR_{22}R_{24}$, $COR_{22}$, $NO_2$, CN and/or $COOC_1$-$C_4$alkyl;

$R_{33}$ is $COR_{24}$, $CONR_{26}R_{27}$, CN, $SO_2NR_{26}R_{27}$ or $SO_2R_{26}$;

$R_{34}$ and $R_{35}$ are each independently of the other methyl, ethyl, vinyl and/or allyl;

it being possible once or more times radicals of the same or different substituents each selected from the group consisting of $R_1$, $R_3$, $R_4$, $R_5$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{22}$, $R_{23}$, $R_{24}$, $R_{25}$, $R_{26}$, $R_{28}$, $R_{29}$, $R_{30}$, $R_{31}$, $R_{32}$, $R_{34}$ and $R_{36}$ to be bonded to one another in pairs by way of a direct bond or an —O—, —S— or —N($R_{35}$)— bridge, optionally forming a dimer, trimer or oligomer comprising two or more identical or different moieties of formula (I);

k is an integer 1, 2, 3 or 4; and n is an integer 1, 2 or 3.

Substituents, including a plurality of substituents having the same label, are generally independent from each other. n depends on the number of charges in the substituents of the compound of formula (I), so that eventual positive charges resulting for example from N-substitution of $C_1$-$C_8$heteroaryl groups are compensated and the compound of formula (I) is neutral. Preferred are compounds of formula (I), wherein n is 1, as well as alternatively compounds of formula 1, wherein n is 2 and one of $G_3$, $R_9$, $R_{10}$, $R_{11}$, $R_{12}$, $R_{13}$ or $R_{14}$, preferably $R_9$, $R_{10}$, $R_{11}$, $R_{12}$ or $R_{13}$, comprises a positively charged N-substituted $C_1$-$C_5$heteroaryl group.

$M_1$ is a cation in the oxidation state +3, a hydroxy or halogen metal cation wherein the metal is in the oxidation state +4, or an oxo metal cation wherein the metal is in the oxidation state +5, of an at least trivalent metal of groups 3 to 15 (formerly groups IIIA to VB), preferably $Al^{3+}$, $As^{3+}$, $Au^{3+}$, $Bi^{3+}$, $Ce^{3+}$, $Co^{3+}$, $Cr^{3+}$, $Dy^{3+}$, $Er^{3+}$, $Eu^{3+}$, $Fe^{3+}$, $Gd^{3+}$, $Ho^{3+}$, $Ir^{3+}$, $La^{3+}$, $Lu^{3+}$, $Mn^{3+}$, $Mo^{3+}$, $Nb^{3+}$, $Nd^{3+}$, $Pm^{3+}$, $Pr^{3+}$, $Rh^{3+}$, $Ru^{3+}$, $Sb^{3+}$, $Sc^{3+}$, $Sm^{3+}$, $Ta^{3+}$, $Tb^{3+}$, $Ti^{3+}$, $[TiCl]^{3+}$, $[TiOH]^{3+}$, $Tm^{3+}$, $V^{3+}$, $[VO]^{3+}$, $W^{3+}$, $Y^{3+}$, $Yb^{3+}$, $[ZrCl]^{3+}$ or $[ZrOH]^{3+}$, most preferred $Co^{3+}$ or $Cr^{3+}$.

Alkyl, alkenyl or alkynyl may be straight-chain or branched. Alkenyl is alkyl that is mono- or poly-unsaturated, wherein two or more double bonds may be isolated or conjugated. Alkynyl is alkyl or alkenyl that is doubly-unsaturated one or more times, wherein the triple bonds may be isolated or conjugated with one another or with double bonds. Cycloalkyl or cycloalkenyl is monocyclic or polycyclic alkyl or alkenyl, respectively.

$C_1$-$C_{12}$Alkyl can therefore be, for example, methyl, ethyl, n-propyl, isopropyl, n-butyl, sec-butyl, isobutyl, tert-butyl, 2-methyl-butyl, n-pentyl, 2-pentyl, 3-pentyl, 2,2-dimethyl-propyl, n-hexyl, heptyl, n-octyl, 1,1,3,3-tetramethylbutyl, 2-ethylhexyl, nonyl, decyl, undecyl or dodecyl.

$C_3$-$C_{12}$Cycloalkyl can therefore be, for example, cyclopropyl, cyclopropyl-methyl, cyclobutyl, cyclopentyl, cyclohexyl, cyclohexyl-methyl, trimethylcyclohexyl, thujyl, norbornyl, bornyl, norcaryl, caryl, menthyl, norpinyl, pinyl, 1-adamantyl or 2-adamantyl.

$C_2$-$C_{12}$Alkenyl is, for example, vinyl, allyl, 2-propen-2-yl, 2-buten-1-yl, 3-buten-1-yl, 1,3-butadien-2-yl, 2-penten-1-yl, 3-penten-2-yl, 2-methyl-1-buten-3-yl, 2-methyl-3-buten-2-yl, 3-methyl-2-buten-1-yl, 1,4-pentadien-3-yl, or any isomer of hexenyl, octenyl, nonenyl, decenyl or dodecenyl.

$C_3$-$C_{12}$Cycloalkenyl is, for example, 2-cyclobuten-1-yl, 2-cyclopenten-1-yl, 2-cyclo-hexen-1-yl, 3-cyclohexen-1-yl, 2,4-cyclohexadien-1-yl, 1-p-menthen-8-yl, 4(10)-thujen-10-yl, 2-norbornen-1-yl, 2,5-norbornadien-1-yl, 7,7-dimethyl-2,4-norcaradien-3-yl or camphenyl.

$C_2$-$C_{12}$Alkynyl is, for example, 1-propyn-3-yl, 1-butyn-4-yl, 1-pentyn-5-yl, 2-methyl-3-butyn-2-yl, 1,4-pentadiyn-3-yl, 1,3-pentadiyn-5-yl, 1-hexyn-6-yl, cis-3-methyl-2-penten-4-yn-1-yl, trans-3-methyl-2-penten-4-yn-1-yl, 1,3-hexadiyn-5-yl, 1-octyn-8-yl, 1-nonyn-9-yl, 1-decyn-10-yl or 1-dodecyn-12-yl.

$C_7$-$C_{12}$Aralkyl is, for example, benzyl, 2-benzyl-2-propyl, β-phenyl-ethyl, 9-fluorenyl, α,α-dimethylbenzyl, ω-phenyl-butyl, ω-phenyl-octyl, ω-phenyl-dodecyl or 3-methyl-5-(1',1',3',3'-tetramethyl-butyl)-benzyl. When $C_7$-$C_{12}$aralkyl is substituted, both the alkyl moiety and the aryl moiety of the aralkyl group can be substituted, the latter alternative being preferred.

$C_6$-$C_{12}$Aryl is, for example, phenyl, naphthyl or biphenyl, always preferred phenyl.

Halogen is chlorine, bromine, fluorine or iodine, preferably chlorine or bromine on aryl or heteroaryl and fluorine on alkyl.

$C_1$-$C_9$Heteroaryl is an unsaturated or aromatic radical having 4n+2 conjugated π-electrons, for example 2-thienyl, 2-furyl, 1-pyrazolyl, 2-pyridyl, 2-thiazolyl, 2-oxazolyl, 2-imidazolyl, isothiazolyl, triazolyl, tetrazolyl or any other ring system consisting of thiophene, furan, thiazole, oxazole, imidazole, isothiazole, thiadiazole, triazole, pyridine, pyrazine, pyrimidine, pyridazine and benzene rings and unsubstituted or substituted by from 1 to 6 ethyl substituents, for example methyl, ethylene and/or methylene substituents. Heterocyclic

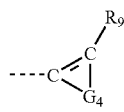

substituted by $R_{10}$, $R_{11}$, $R_{12}$ and $R_{13}$ is for example

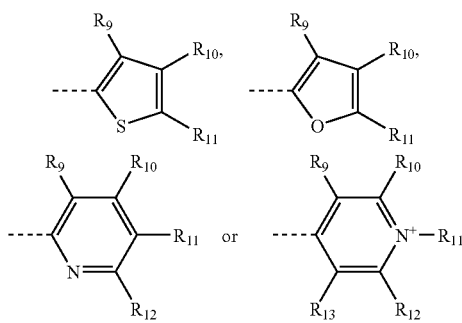

and provides highly surprisingly an improved sensitivity (with sufficient thermal interference control) at high recording speeds, as compared with aryl groups.

Furthermore, aryl and aralkyl can also be aromatic groups bonded to a metal, for example in the form of metallocenes of transition metals known per se, more especially

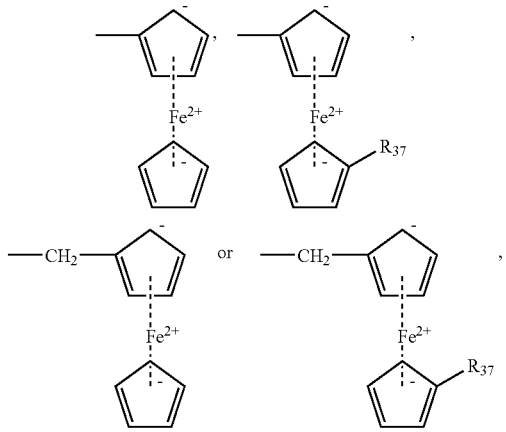

wherein $R_{37}$ is $CH_2OH$, $CH_2OR_{24}$ or $COOR_{24}$.

$C_3$-$C_{12}$Heterocycloalkyl is an unsaturated or partially unsaturated ring system radical, for example epoxy, oxetan, aziridine; tetrazolyl, pyrrolidyl, piperidyl, piperazinyl, imidazolinyl, pyrazolidinyl, pyrazolinyl, morpholinyl, quinuclidinyl; or some other $C_4$-$C_{12}$heteroaryl that is mono- or poly-hydrogenated.

5- to 12-membered rings are, for example, cyclopentyl, cyclohexyl, cycloheptyl and cyclooctyl, preferably cyclopentyl and especially cyclohexyl.

The quinoid structure with double bonds to $R_2$ and $R_6$ is of course only one mesomeric form of the compound of formula (I), but it is the most likely structure in view of the spectroscopic data. There may alternatively also be drawn a phenylazo with a single bond to $R_2$ or $R_6$ and a negative charge on $R_2$ or $R_6$, which may further be protonated through tautomery. Nevertheless, the electronic delocalisation through mesomerism is an essential feature of the invention and advantageously stabilizes the anion through additional bonds with the metal. Thus, $R_2$ and/or $R_6$ are preferably O, S, N—CN or N—$SO_2CF_3$, especially preferred O.

Either in combination with preferred $R_2$ and/or $R_6$ or independently thereof, $R_3$ and/or $R_7$ are much preferably H, halogen, $CF_3$, $NO_2$, CN, $COR_{22}$, $COOR_{23}$, $SO_3R_{23}$, NCO or SCN, most preferably H. Independently from the counter ion's structure, these preferred substituents surprisingly lead to an improved light and multiple read stability when used in optical recording media, either as the main recording dye or as an additive for other recording dyes, too.

It is especially preferred that, either in combination with preferred $R_2$, $R_3$, $R_6$ and/or $R_7$ or independently thereof, preferably in the heterocycle comprising $G_1$ or $G_2$, at least one of $R_{15}$ and $R_{17}$, especially $R_{15}$, is $CF_3$, $NO_2$, CN, $COR_{22}$, $COOR_{23}$, $CR_{22}OR_{25}OR_{28}$, $CONR_{26}R_{27}$, $SO_2R_{22}$, $SO_3R_{23}$, $SO_2NR_{26}R_{27}$ or $PO(OR_{22})(OR_{25})$, most preferred $CF_3$, $NO_2$, CN, $COR_{22}$, $COOR_{23}$, $SO_2R_{22}$ and/or $SO_3R_{23}$. Though both $R_{15}$ and $R_{17}$ may be such preferred groups, preferably only one of them is a preferred group and the other is hydrogen or $C_1$-$C_4$alkyl, or $R_{15}$ and $R_{17}$ are together butadienylene either unsubstituted or substituted, preferably unsubstituted or substituted by $CF_3$, $NO_2$, $CN$, $COR_{22}$, $COOR_{23}$ and/or $SO_3R_{23}$.

Preferably, either in combination with preferred $R_2$, $R_3$, $R_6$, $R_7$, $R_{15}$ and/or $R_{17}$ or independently thereof, especially in the heterocycle comprising $G_3$, $R_{16}$ is H or F, or together with $R_{15}$ is butadienylen either unsubstituted or substituted, preferably unsubstituted or substituted by one or more $C_1$-$C_4$alkyl, halogen, $OR_{23}$, $SR_{23}$, $NR_{22}R_{25}$, $CF_3$, $NO_2$, $CN$, $COR_{22}$, $COOR_{23}$, $SO_2R_{22}$ and/or $SO_3R_{23}$.

$Q_3$ is preferably S or $CR_{20}R_{21}$, more preferably S in

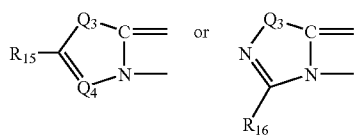

standing for

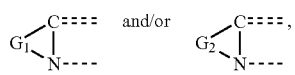

and/or $CR_{20}R_{21}$, in particular $C_3$-$C_6$alkyliden or $C_3$-$C_6$cycloalkyliden, (even more preferably 1-cyclohexyliden or especially 2-butyliden—that is, $CR_{20}R_{21}$ wherein $R_{20}$ and $R_{21}$ together=1,5-pentylene or $R_{20}$=methyl/$R_{21}$=ethyl, respectively), in

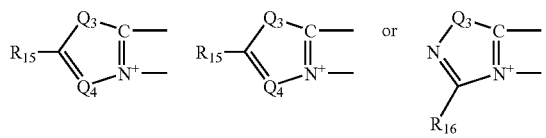

standing for

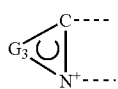

Most preferably,

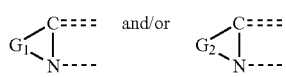

stand for

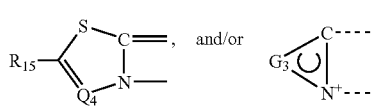

stands for

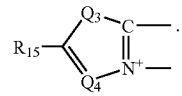

$Q_5$ and $Q_7$ are preferably S. These preferences are independent of the preferred $R_2$, $R_3$, $R_6$, $R_7$, $R_{15}$, $R_{16}$ and/or $R_{17}$; however, the preferences disclosed herebefore for $R_2$, $R_3$, $R_6$, $R_7$, $R_{15}$, $R_{16}$ and/or $R_{17}$ are fully applicable with particular benefits in the case of preferred

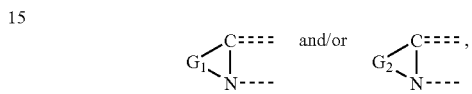

$Q_5$ and $Q_7$, too.

All above-mentioned preferences are fully applicable especially in further combination with

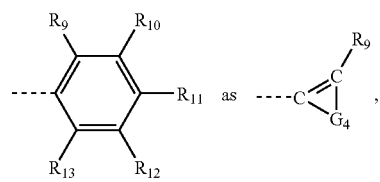

too.

The preferences for the cationic and anionic sub-structures contained in formula (I) are independent of each other. However, it is preferable to combine preferred cations with preferred anions.

Further preference is given to compounds of formula (I) wherein $R_4$ is hydrogen, hydroxy, $C_1$-$C_4$alkoxy or $C_1$-$C_4$alkyl; $R_{15}$ is nitro or cyano, preferably nitro; and/or $R_{22}$ or $R_{24}$ are methyl, ethyl, n-propyl, isopropyl, n-butyl, 2-butyl, isobutyl, tert-butyl, 3-pentyl, n-amyl, tert-amyl, neopentyl, 2,2-dimethyl-but-4-yl, cyclopropyl, cyclopropylmethyl, cyclobutyl, cyclobutylmethyl, cyclopentyl, cyclopentylmethyl or cyclohexyl, each unsubstituted or mono- or polysubstituted by fluorine. $R_{20}$ and $R_{21}$ are preferably both methyl, both ethyl or $R_{20}$ ethyl and $R_{21}$ methyl, or both together 1,5-pentylene. Alkyl, alkenyl, alkynyl, cycloalkyl and heterocycloalkyl are generally preferably $C_1$-$C_4$alkyl, $C_2$-$C_4$alkenyl, $C_2$-$C_4$alkynyl and epoxyalkyl, respectively. All these further preferences are fully applicable with particular benefits in the case of preferred $R_2$, $R_3$, $R_6$, $R_7$, $R_{15}$, $R_{16}$ and/or $R_{17}$ as well as

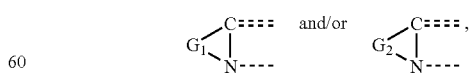

$Q_5$ and $Q_7$, too.

When $R_{22}$, $R_{25}$ and $R_{28}$ are bonded to one another in pairs by way of a direct bond or an —O—, —S— or —$NR_{35}$— bridge, they are preferably so bonded that a five- or six-membered ring is formed.

Another aspect of the invention are compounds of formula (I) wherein two cations or two ligands of the anion are bridged, for example by way of direct bonds or —O—, —S— or —NR$_{35}$— bridges between any substituents in formula (I), it being possible for the bridged ligands to be complexed either with the same metal cation or optionally with different metal cations, there being formed in the latter case oligomers which are, of course, also to be regarded as being subjects of the invention. Bridgings by way of O or N atoms of the cation or anion, either those in the chromophore or those on substituents, are especially advantageous.

Dimers and trimers can be made purposefully in close analogy to methods which are known per se. They may be either symmetrical or preferably asymmetrical, comprising 2 or 3 different moieties of formula (I) linked together by bonds and/or bridges. Oligomer are constituted for example of 4 to 12 moieties of formula (I) all linked together.

Such dimer, trimer or higher formation is illustrated by the following examples (which are on no account limiting) wherein X may be, for example, —CH$_2$—, —CH$_2$—CH$_2$—, —CH$_2$—O—CH$_2$— or —CH$_2$—NH—CH$_2$—:

Of course, in oligomers the stoichiometry should be such that the resulting compound of formula (I) is not charged. Such and similar oligomers can also prepared unintentionally together with the monomeric compounds, in which case they can be separated by known methods. The formation of monomers or oligomers can be favoured by usual means through control of the reaction conditions, in particular the respective concentrations of the reagents and the sequence and speed of addition.

The recording medium according to the invention, in addition to comprising the compounds of formula (I), may additionally comprise salts, for example ammonium chloride, pentadecylammonium chloride, sodium chloride, sodium iodide, sodium sulfate, sodium hydrogen sulfate, sodium methyl sulfate, sodium methylsulfonate, sodium tosylate, sodium acetate, sodium hexafluorophosphate, cobalt(II) acetate or cobalt(II) chloride, the ions of which may, for example, originate from the components used.

Interesting anions of formula (I) are especially those of the following formulae (all six bonds to the metal have similar length according to the X-ray data):

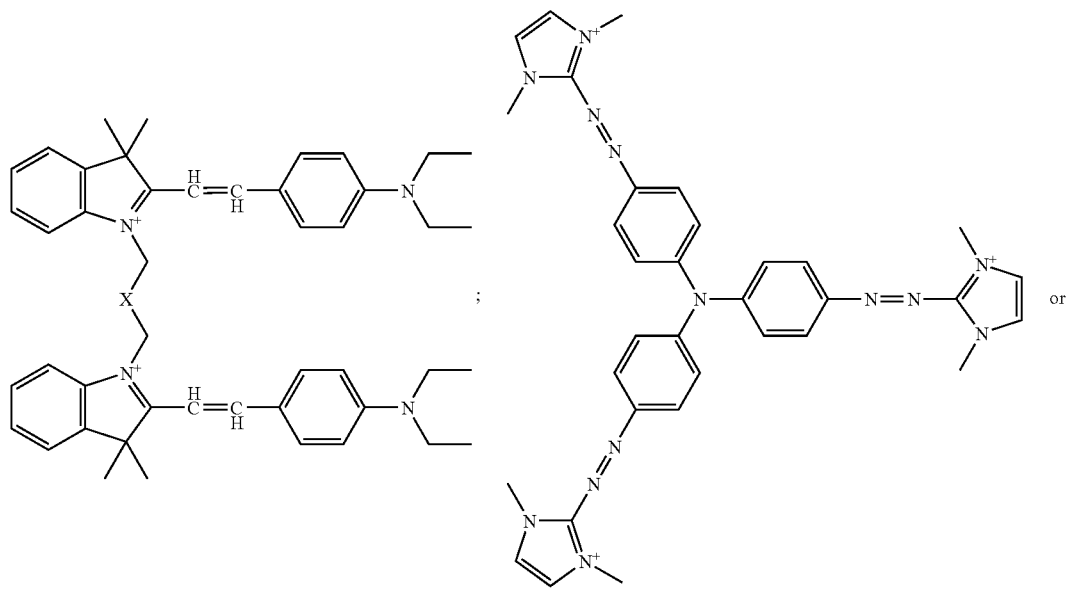

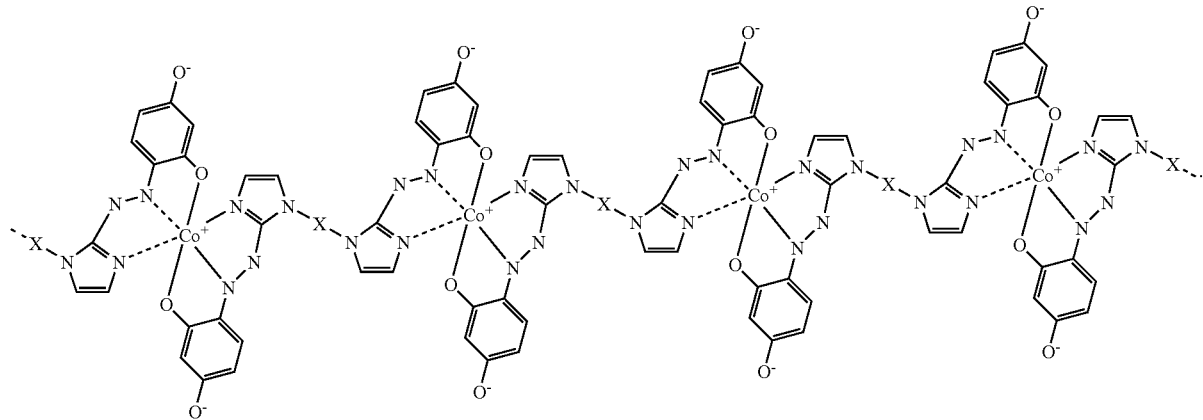

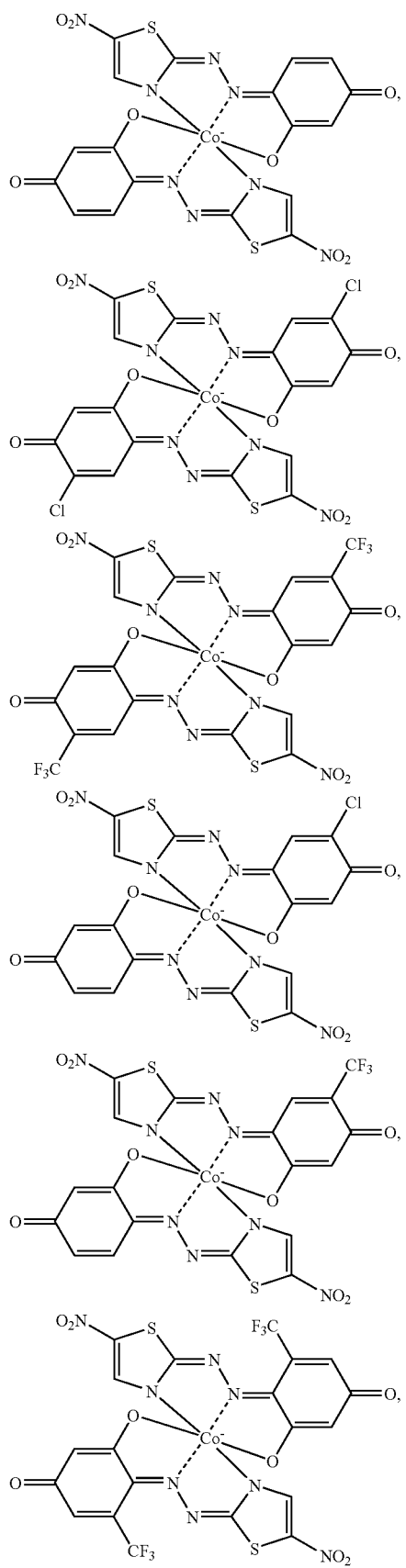
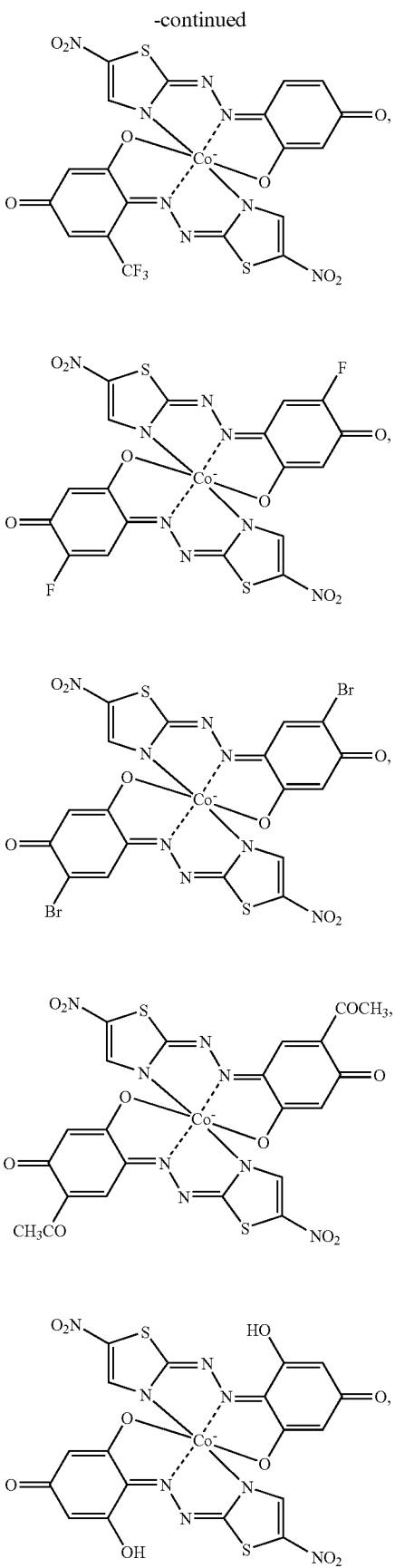

-continued
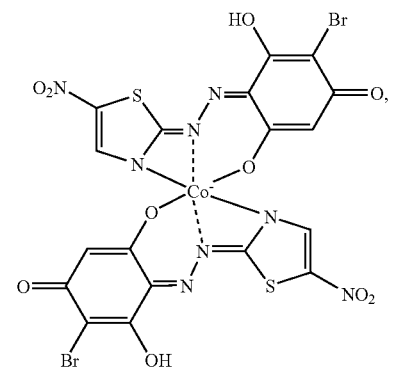
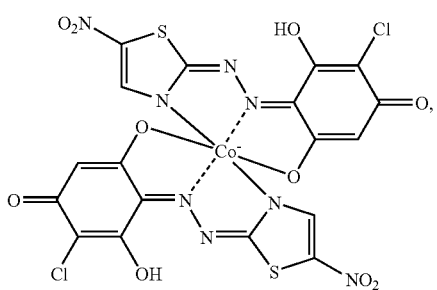
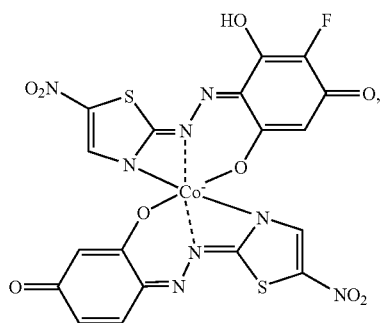
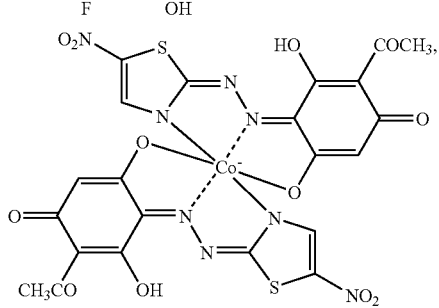
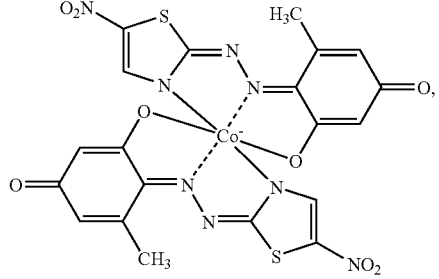
-continued
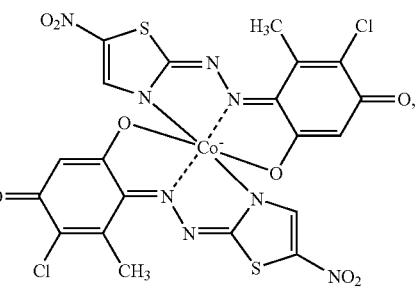
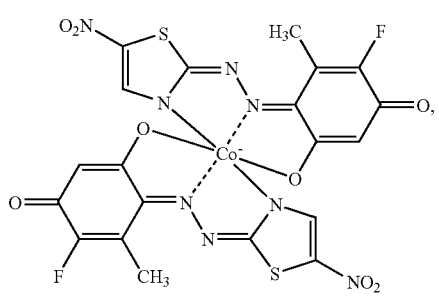
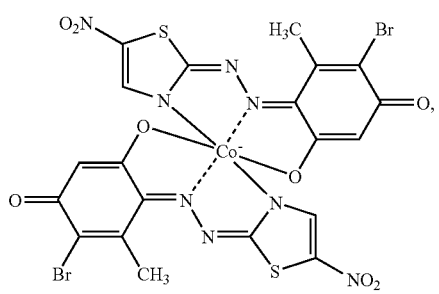
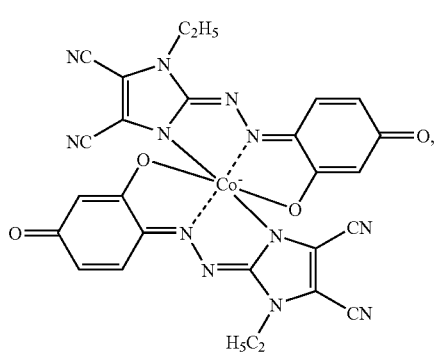
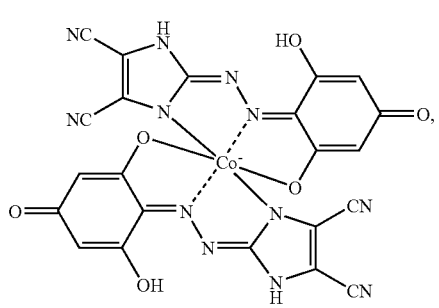

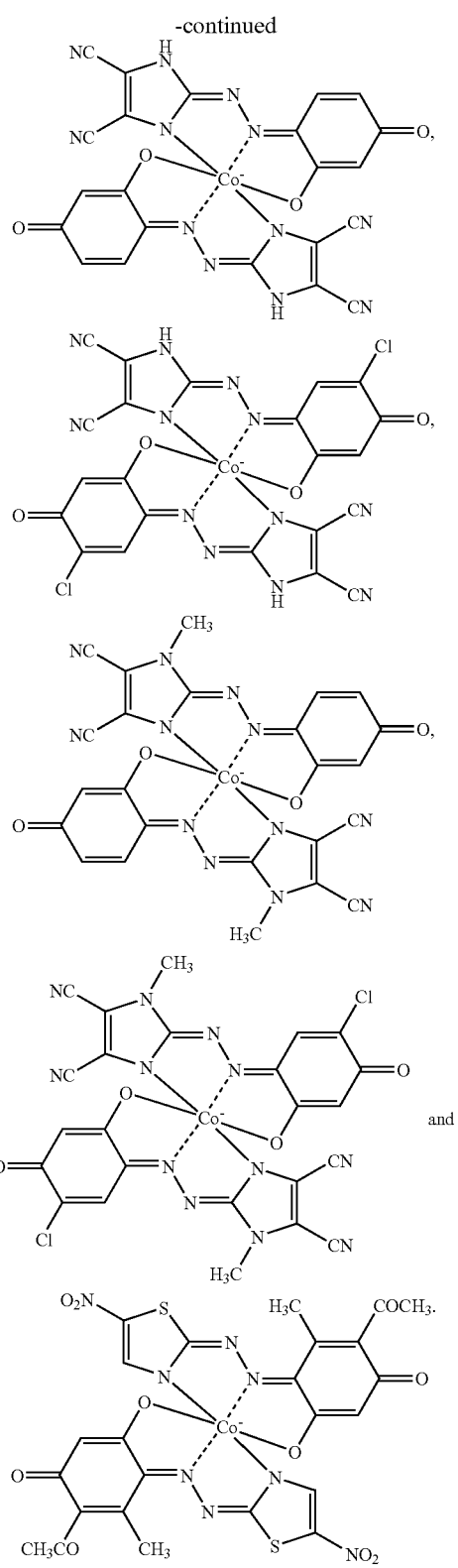

-continued

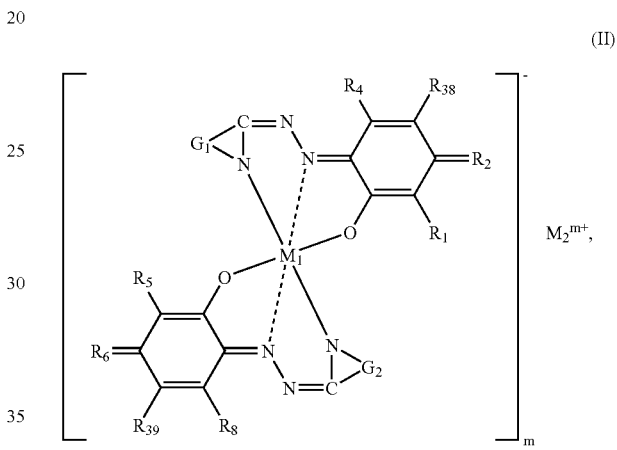

Interesting compounds of formula (I), wherein one or more of $R_1$ to $R_4$ is different from the corresponding $R_5$ to $R_8$ and/or wherein $G_1$ is different from $G_2$ may be prepared simply by mixed synthesis, two different ligands being metallated at the same time. The compounds of formula (I) having asymmetric ligands can either be isolated by customary methods, such as chromatography, or preferably used in admixture with the compounds of formula (I) having two identical ligands.

Acta Poloniae Pharmaceutica 49/5, 55-61 [1992] discloses the complexation of metal ions with Atidarez-β and Atidarez-γ. It is disclosed that strong bases and acids lead to decomposition and that tentatives to isolate metal complexes through extraction with various organic solvents failed.

The compounds of formula (I) are new. Some of their components are known, in particular the styryl cation part, for example from U.S. Pat. No. 6,103,331. The metal complex anions are partially new but can be prepared in close analogy to known metal complexes by methods known per se. The final salts of formula (I) are simply prepared by mixing each a soluble salt of the cation and anion. Hence, the invention also pertains to a compound of formula (I) or a tautomeric or mesomeric form thereof.

Also new is a compound of formula or a mesomer or tautomer thereof, wherein $R_{38}$ is halogen, $CF_3$, $NO_2$, CN, $COR_{22}$, $COOR_{23}$, $SO_3R_{23}$, NCO or SCN, $R_{39}$ is $R_7$ as defined in formula (I), preferably H, halogen, $CF_3$, $NO_2$, CN, $COR_{22}$, $COOR_{23}$, $SO_3R_{23}$, NCO or SCN, $G_1$, $G_2$, $M_1$, $R_1$, $R_2$, $R_4$, $R_5$, $R_6$, $R_8$, $R_{22}$ and $R_{23}$ are as defined in formula (I), $M_2^{m+}$ is a cation with m positive charges, and m is an integer 1, 2 or 3.

$M_2^{m+}$ is for example a proton, a suitable metal, ammonium or phosphonium cation or a positively charged organic or organometallic chromophore as mentioned above.

The compounds of formula (II) are especially useful as stabilizers in the recording layer of optical recording media, particularly in combination either with the instant compounds of formula (I) or with any other, known dyes such as those mentioned herein below.

The substrate, which acts as support for the layers applied thereto, is advantageously semi-transparent (T≧10%) or preferably transparent (T≧90%). The support can be from 0.01 to 10 mm thick, preferably from 0.1 to 5 mm thick.

The recording layer is preferably arranged between the transparent substrate and the reflecting layer. The thickness of the recording layer is from 10 to 1000 nm, preferably from 30 to 300 nm, especially about 80 nm, for example from 60 to 120 nm. The absorption of the recording layer is typically from 0.1 to 1.0 at the absorption maximum (up to 1.5 in dual layer). The layer thickness is very especially so chosen in known manner in dependence upon the respective refractive indices in the non-written state and in the written state at the reading wavelength that in the non-written state constructive interference is obtained, but in the written state destructive interference is obtained, or vice versa.

The reflecting layer, the thickness of which can be from 10 to 150 nm, preferably has high reflectivity ($R \geq 45\%$, especially $R \geq 60\%$), coupled with low transparency ($T \leq 10\%$). In further embodiments, for example in the case of media having a plurality of recording layers, the reflector layer may likewise be semi-transparent, that is to say may have comparatively high transparency (for example $T \geq 50\%$) and low reflectivity (for example $R \leq 30\%$).

The uppermost layer, for example the reflective layer or the recording layer, depending upon the layer structure, is advantageously additionally provided with a protective layer having a thickness of from 0.1 to 1000 µm, preferably from 0.1 to 50 µm, especially from 0.5 to 15 µm. Such a protective layer can, if desired, serve also as adhesion promoter for a second substrate layer applied thereto, which is preferably from 0.1 to 5 mm thick and consists of the same material as the support substrate.

The reflectivity of the entire recording medium is preferably at least 15%, especially at least 40%.

The main features of the recording layer according to the invention are the very high initial reflectivity in the said wavelength range of the laser diodes, which can be modified with great sensitivity; the high refractive index; the especially narrow absorption band in the solid state; the good uniformity of the script width at different pulse durations; as well the good light stability and the good solubility in polar solvents.

The recording medium according to the invention is neither writable nor readable using the infra-red laser diodes of customary CD apparatus in accordance with the requirements of the Orange Book Standard. As a result, the risk of damage in the event of an erroneous attempt at writing using an apparatus not capable of high resolution is largely averted, which is of advantage. The use of dyes of formula (I) results in advantageously homogeneous, amorphous and low-scatter recording layers having a high refractive index, and the absorption edge is surprisingly especially steep even in the solid phase. Further advantages are high light stability in daylight and under laser radiation of low power density with, at the same time, high sensitivity under laser radiation of high power density, uniform script width, high contrast, and also good thermal stability and storage stability.

At a high recording speed (for example 2×, 4×, 8× or 16×, preferably 8× or 16×, corresponding to a range of about 20 to 60 m·s$^{-1}$), the results obtained are surprisingly better than with previously known recording media. The marks are more precisely defined relative to the surrounding medium, and thermally induced deformations do not occur. The error rate (PI Sum 8) and the statistical variations in mark lengths (jitter) are also low both at normal recording speed and at elevated recording speed, so that an error-free recording and playback can be achieved over a wide range of speeds. There are virtually no rejects even at high recording speed, and the reading of written media is not slowed down by the correction of errors. The advantages are obtained over the entire range from 600 to 700 nm (preferably from 630 to 690 nm), but are especially marked at from 640 to 680 nm, more especially from 650 to 670 nm, particularly at 658±5 nm.

Suitable substrates are, for example, glass, minerals, ceramics and thermosetting or thermoplastic plastics. Preferred supports are glass and homo- or co-polymeric plastics. Suitable plastics are, for example, thermoplastic polycarbonates, poly-amides, polyesters, polyacrylates and polymethacrylates, polyurethanes, poly-olefins, polyvinyl chloride, polyvinylidene fluoride, polyimides, thermosetting poly-esters and epoxy resins. The substrate can be in pure form or may also comprise customary additives, for example UV absorbers or dyes, as proposed e.g. in JP 04/167 239 to provide light-stabilisation for the recording layer. In the latter case it may be advantageous for the dye added to the support substrate to have an absorption maximum hypsochromically shifted relative to the dye of the recording layer by at least 10 nm, preferably by at least 20 nm.

The substrate is advantageously transparent over at least a portion of the range from 600 to 700 nm (preferably as indicated above), so that it is permeable to at least 90% of the incident light of the writing or readout wavelength. The substrate has preferably on the coating side a spiral guide groove having a groove depth of from 50 to 500 nm, a groove width of from 0.2 to 0.8 µm and a track pitch between two turns of from 0.4 to 1.6 µm, especially having a groove depth of from 100 to 200 nm (or from 20 to 60 nm in dual layer), a groove width of from 0.35±0.10 µm and a pitch between two turns of from 0.6 to 0.8 µm. The recording layer is advantageously of different thickness in and outside the groove, depending upon the depth of the groove; the thickness of the recording layer in the groove is usually about from 2 to 20× greater than outside, typically 5-10× greater in the groove than outside. The recording layer can also be present exclusively in the groove.

The storage media according to the invention are therefore suitable especially advantageously for the optical recording of DVD media having the currently customary minimum pit length of 0.4 µm and track pitch of 0.74 µm. The increased recording speed relative to known media allows synchronous recording or, for special effects, even accelerated recording of video sequences with excellent image quality.

The recording layer, instead of comprising a single compound of formula (I), may alternatively comprise a mixture of such compounds having, for example, 2, 3, 4 or 5 metal azo dyes according to the invention. By the use of mixtures, for example mixtures of isomers or homologues as well as mixtures of different structures, often the solubility can be increased and/or the amorphous content improved. If desired, mixtures of ion pair compounds may have different anions, different cations or both different anions and different cations.

It is also judicious to use the instant compounds of formula (I) in admixtures with one or more salts of the cation of formula (I) with a suitable inorganic, organic or organometallic anion, and/or with one or more salts of the anion of formula (I) with a proton, a suitable metal, ammonium or phosphonium cation or a positively charged organic or organometallic chromophore. In many cases, the optical properties still remain satisfactory while the solubility and amorphicity of the solid layer can be improved. Compounds of formula (II) provide a particular benefit.

Suitable anions are, for example, hydroxide, oxide, fluoride, chloride, bromide, iodide, perchlorate, periodate, carbonate, hydrogen carbonate, sulfate, hydrogen sulfate, phosphate, hydrogen phosphate, dihydrogen phosphate, tetrafluoroborate, hexafluoroantimonate, acetate, oxalate, methanesulfonate, trifluoromethane-sulfonate, tosylate, methyl sulfate, phenolate, benzoate or a negatively charged metal complex.

Metal, ammonium or phosphonium cations are, for example, $Ca^{2+}$, $Co^{2+}$, $Co^{3+}$, $Cr^{3+}$, $Cu^{2+}$, $Fe^{2+}$, $Fe^{3+}$, $K^+$, $La^{3+}$, $Li^+$, $Mg^{2+}$, $Na^+$, $Ni^{2+}$, $Sn^{2+}$, $Zn^{2+}$, methylammonium, ethylammonium, pentadecylammonium, isopropylammonium, dicyclohexyl-ammonium, tetramethylammonium, tetraethylammonium, tetrabutylammonium, benzyltrimethylammonium, benzyltriethylammonium, methyltrioctylammonium, tridodecylmethylammonium, tetrabutylphosphonium, tetraphenylphosphonium, butyltriphenylphosphonium or ethyltriphenylphosphonium, or protonated Primene 81R™ or Rosin Amine D™. Preference is given to H, Na$^+$, K$^+$, NH$_4^+$, primary, secondary, tertiary or quaternary ammonium and also to cationic chromophores, especially those mentioned below, as well as cations of the additional chromophores mentioned below (obtainable for example through quaternisation of N). Other metal cations, such as those disclosed hereinbefore for M$_1$, are also suitable.

As positively charged organic chromophores there may be used any cations that absorb in the range of from 300 to 1500 nm, especially in the range of from 300 to 800 nm. The person skilled in the art will preferably select especially chromophore cations that have already been previously proposed for use in optical information media, for example cyanine, xanthene, dipyrromethene, styryl, triphenylmethine, azo, metal complex, quinone diimmonium, bipyridinium and other cations. Cyanine, xanthene (for example those of U.S. Pat. No. 5,851,621, WO-03/098 617 or WO-03/098 618), dipyrromethene and azo metal complex cations are preferred. Further chromophores suitable for use in cationic form are known from WO-01/75873, but those examples are on no account to be regarded as a limiting selection.

For a further increase in stability it is also possible, if desired, to add known stabilisers in customary amounts, for example a nickel dithiolate described in JP 04/025 493 as light stabiliser.

The recording layer comprises a compound of formula (I) or a mixture of such compounds advantageously in an amount sufficient to have a substantial influence on the refractive index, for example at least 10% by weight, preferably at least from 30 to 70% by weight, especially at least from 40 to 60% by weight. The recording layer can especially valuably comprise a compound of formula (I) or a mixture of a plurality of such compounds as main component, or may consist exclusively or substantially of one or more compounds of formula (I).

Further customary constituents are possible, for example other chromophores (for example those having an absorption maximum at from 300 to 1000 nm), UV absorbers and/or other stabilisers, $^1O_2$—, triplet- or luminescence-quenchers, melting-point reducers, decomposition accelerators or any other additives that have already been described in optical recording media, for example film-formers.

When the recording layer comprises further chromophores, such chromophores may in principle be any dyes that can be decomposed or modified by the laser radiation during the recording, or they may be inert towards the laser radiation. When the further chromophores are decomposed or modified by the laser radiation, this can take place directly by absorption of the laser radiation or can be induced indirectly by the decomposition of the compounds of formula (I) according to the invention, for example thermally.

Naturally, further chromophores or coloured stabilisers may influence the optical properties of the recording layer. It is therefore preferable to use further chromophores or coloured stabilisers, the optical properties of which conform as far as possible to, or are as different as possible from, those of the compounds of formula (I) or the amount of further chromophores is kept small.

When further chromophores having optical properties that conform as far as possible to those of compounds of formula (I) are used, preferably this should apply in the range of the longest-wavelength absorption flank. Preferably the wavelengths of the inversion points of the further chromophores and of the compounds of formula (I) are a maximum of 40 nm, especially a maximum of 20 nm, more especially a maximum of 10 nm, apart. In that case the further chromophores and the compounds of formula (I) should exhibit similar behaviour in respect of the laser radiation, so that it is possible to use as further chromophores known recording agents the action of which is synergistically enhanced or heightened by the compounds of formula (I).

When further chromophores or coloured stabilisers having optical properties that are as different as possible from those of compounds of formula (I) are used, they advantageously have an absorption maximum that is hypsochromically or bathochromically shifted relative to the dye of formula (I). In that case the absorption maxima are preferably at least 50 nm, especially at least 100 nm, apart. Examples thereof are UV absorbers that are hypsochromic to the dye of formula (I) or coloured stabilisers that are bathochromic to the dye of formula (I) and have absorption maxima lying, for example, in the NIR or IR range. Other dyes can also be added for the purpose of colour-coded identification, colour-masking ("diamond dyes") or enhancing the aesthetic appearance of the recording layer. In all those cases, the behaviour of the further chromophores or coloured stabilisers towards light and laser radiation should preferably be as inert as possible.

When another dye is added in order to modify the optical properties of the compounds of formula (I) the amount thereof is dependent upon the optical properties to be achieved. The person skilled in the art will find little difficulty in varying the ratio of additional dye to compound of formula (I) until he obtains the desired result.

When chromophores or coloured stabilisers are used for other purposes, the amount thereof should preferably be small so that their contribution to the total absorption of the recording layer in the range of from 600 to 700 nm is a maximum of 20%, preferably a maximum of 10%. In such a case, the amount of additional dye or stabiliser is advantageously a maximum of 50% by weight, preferably a maximum of 10% by weight, based on the recording layer.

Further chromophores which can optionally be used in the recording layer in addition to the compounds of formula (I) are, for example, cyanines also including zwitterions (EP-A-1 464678) and metal complexes thereof (U.S. Pat. No. 5,958,650), oxonol dyes (EP-A-833 314), azo dyes and azo metal complexes (JP-A-11/028865), phthalocyanines (EP-A-232 427, EP-A-337 209, EP-A-373 643, EP-A-463 550, EP-A-492 508, EP-A-509 423, EP-A-511 590, EP-A-513 370, EP-A-514 799, EP-A-518 213, EP-A-519 419, EP-A-519 423, EP-A-5-575 816, EP-A-600 427, EP-A-676 751, EP-A-712 904, WO-98/14520, WO-00/09522, CH-693/01), porphyrins and azaporphyrins (EP-A-822 546, U.S. Pat. No. 5,998,093), dipyrromethene dyes and metal chelate compounds thereof (EP-A-822 544, EP-A-903 733), xanthene dyes and metal complex salts thereof (U.S. Pat. No. 5,851, 621) or quadratic acid compounds (EP-A-568 877), or oxazines, dioxazines, diazastyryls, formazans, anthraquinones or phenothiazines; this list is on no account exhaustive and the person skilled in the art will interpret the list as including further known dyes.

Especially preferred additional chromophores are especially cyanines and xanthenes. Of the cyanines, preference is given to benzoindocarbocyanines, and of the xanthenes especially rhodamines.

It is very especially preferred, however, that no additional chromophore is added, unless it is a coloured stabiliser or a compound of formula

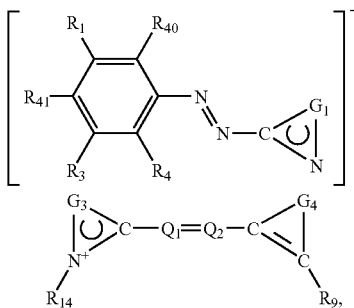

(III)

wherein one of $R_{40}$ and $R_{41}$ is $NR_{42}R_{43}$, $NR_{43}R_{44}$, $NR_{44}R_{45}$, $OR_{42}$, $SR_{42}$, $OR_{44}$ or $SR_{44}$, and the other of $R_{40}$ and $R_{41}$ is $O^-$, $S^-$ or $N^-R_{46}$;

$R_{42}$ and $R_{43}$ are each independently of the other $C_1$-$C_{12}$alkyl, $C_2$-$C_{12}$alkenyl, $C_2$-$C_{12}$alkynyl, $C_3$-$C_{12}$cycloalkyl, $C_3$-$C_{12}$cycloalkenyl or $C_2$-$C_{11}$heterocycloalkyl each unsubstituted or mono- or poly-substituted by halogen, $OR_{47}$, $SR_{47}$, $CR_{48}OR_{49}OR_{50}$, $NR_{48}R_{51}$, $NR_{48}COR_{49}$, $NR_{48}COOR_{47}$, $NR_{48}CONR_{52}R_{53}$, $NR_{48}CN$, $COR_{48}$, $NO_2$, CN, $COOR_{47}$, $CONR_{52}R_{53}$ and/or $SO_2R_{52}$; or $R_{42}$ and $R_{43}$ are together $C_2$-$C_{12}$alkylen, $C_2$-$C_{12}$alkenylen, $C_2$-$C_{12}$cycloalkylen or $C_2$-$C_{12}$cycloalkenylen, one to five non-successive carbon atoms of which can be replaced by oxygen and/or sulfur atoms and/or by identical or different groups $NR_{46}$, $C_2$-$C_{12}$alkylen, $C_2$-$C_{12}$alkenylen, $C_2$-$C_{12}$cycloalkylen or $C_2$-$C_{12}$cycloalkenylen being each unsubstituted or mono- or poly-substituted by halogen, $OR_{47}$, $SR_{47}$, $NR_{48}R_{51}$, $NR_{48}COR_{49}$, $NR_{48}COOR_{47}$, $NR_{48}CONR_{52}R_{53}$, $NR_{48}CN$, $COR_{48}$, $CR_{48}OR_{49}OR_{50}$, $NO_2$, CN, $COOR_{47}$, $CONR_{52}R_{53}$ and/or $SO_2R_{52}$;

$R_{44}$, $R_{45}$ and $R_{46}$ are each independently of the others H, $COR_{51}$, $CONR_{52}R_{53}$, CN, $SO_2NR_{52}R_{53}$ or $SO_2R_{52}$, preferably $R_{44}$ and/or $R_{45}$ are H and $R_{46}$ is $COR_{51}$, $CONR_{52}R_{53}$, CN, $SO_2NR_{52}R_{53}$ or $SO_2R_{52}$;

each $R_{47}$, independently of any other $R_{47}$, is $R_{51}$ or $R_{46}$, preferably H;

$R_{48}$, $R_{49}$ and $R_{50}$ are each independently of the others hydrogen; $C_1$-$C_4$alkyl, $C_2$-$C_4$alkenyl, $C_2$-$C_4$alkynyl, [$C_2$-$C_3$alkylene-O—]$_p$—$R_{54}$ or [$C_2$-$C_3$alkylene-$NR_{55}$—]$_p$—$R_{54}$ each unsubstituted or mono- or poly-substituted by halogen; or benzyl;

$R_{51}$, $R_{52}$ and $R_{53}$ are each independently of the others H; $C_1$-$C_6$alkyl, $C_2$-$C_6$alkenyl, $C_2$-$C_6$alkynyl, $C_3$-$C_6$cycloalkyl, $C_3$-$C_6$cycloalkenyl or $C_2$-$C_5$heterocycloalkyl each unsubstituted or mono- or poly-substituted by halogen, $OR_{47}$, $SR_{47}$, $NR_{48}R_{50}$, CN and/or $COOR_{48}$; or $C_6$-$C_{10}$aryl, $C_7$-$C_{11}$aralkyl or $C_1$-$C_5$heteroaryl each unsubstituted or mono- or poly-substituted by $C_1$-$C_4$alkyl, halogen, $OR_{47}$, $SR_{47}$, $NR_{48}R_{49}$, $COR_{48}$, $CR_{48}OR_{49}OR_{50}$, $NO_2$, CN and/or $COOR_{50}$;

or $NR_{48}R_{49}$, $NR_{48}R_{51}$, $NR_{49}R_{50}$ or $NR_{52}R_{53}$ is a five- or six-membered heterocycle which may contain a further N or O atom and which can be mono- or poly-substituted by methyl or ethyl;

$R_{54}$ and $R_{55}$ are each independently of the other methyl, ethyl, vinyl and/or allyl;

it being possible once or more times radicals of the same or different substituents each selected from the group consisting of $R_1$, $R_3$, $R_4$, $R_{40}$, $R_{41}$, $R_{42}$, $R_{45}$, $R_{46}$, $R_{47}$, $R_{48}$, $R_{49}$, $R_{50}$, $R_{51}$, $R_{52}$ and $R_{54}$ to be bonded to one another in pairs by way of a direct bond or an —O—, —S— or —N($R_{55}$)— bridge; and p is an integer from 1 to 4.

Stabilisers or fluorescence-quenchers are, for example, metal complexes of N- or S-containing enolates, phenolates, bisphenolates, thiolates or bisthiolates or of azo, azomethine or formazan dyes, such as ®Irgalan Bordeaux EL (Ciba Specialty Chemicals Inc.), ®Cibafast N3 (Ciba Specialty Chemicals Inc.) or similar compounds, hindered phenols and derivatives thereof (optionally also as anions $X^-$), such as ®Cibafast AO (Ciba Specialty Chemicals Inc.), 7,7',8,8'-tetracyano-quino-dimethane (TCNQ) and compounds thereof (optionally as an anion of a charge transfer complex), hydroxyphenyl-triazoles or -triazines or other UV absorbers, such as ®Cibafast W or ®Cibafast P (Ciba Specialty Chemicals Inc.) or hindered amines (TEMPO or HALS, also as nitroxides or NOR-HALS, optionally also as anions $X^-$).

Many such structures are known, some of them also in connection with optical recording media, for example from U.S. Pat. No. 5,219,707, JP-A-06/199045, JP-A-07/76169 or JP-A-07/262,604. They may be, for example, salts of the metal complex anions disclosed above with any desired cations, for example the cations disclosed above.

Also suitable are neutral metal complexes, for example those metal complexes disclosed in EP 0 822 544, EP 0 844 243, EP 0 903 733, EP 0 996 123, EP 1 056 078, EP 1 130 584 or U.S. Pat. No. 6,162,520, for example

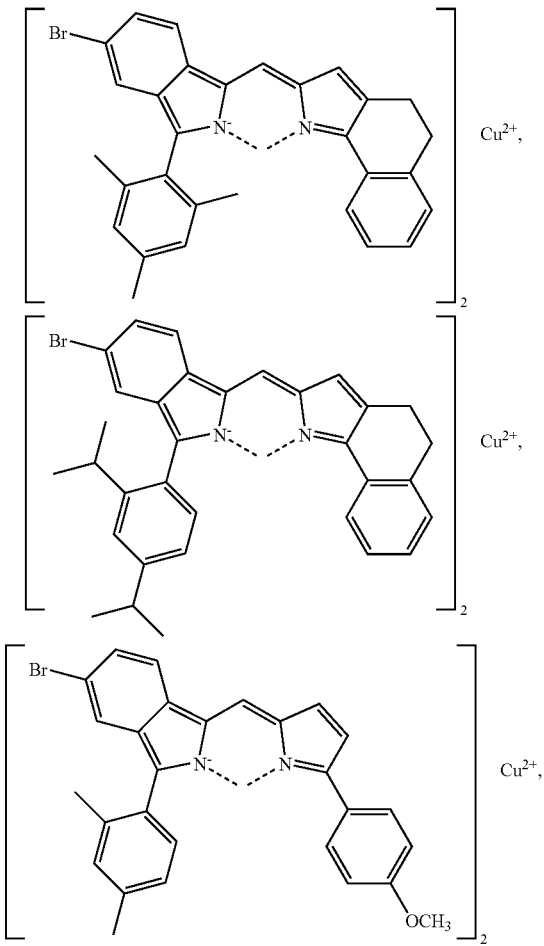

-continued

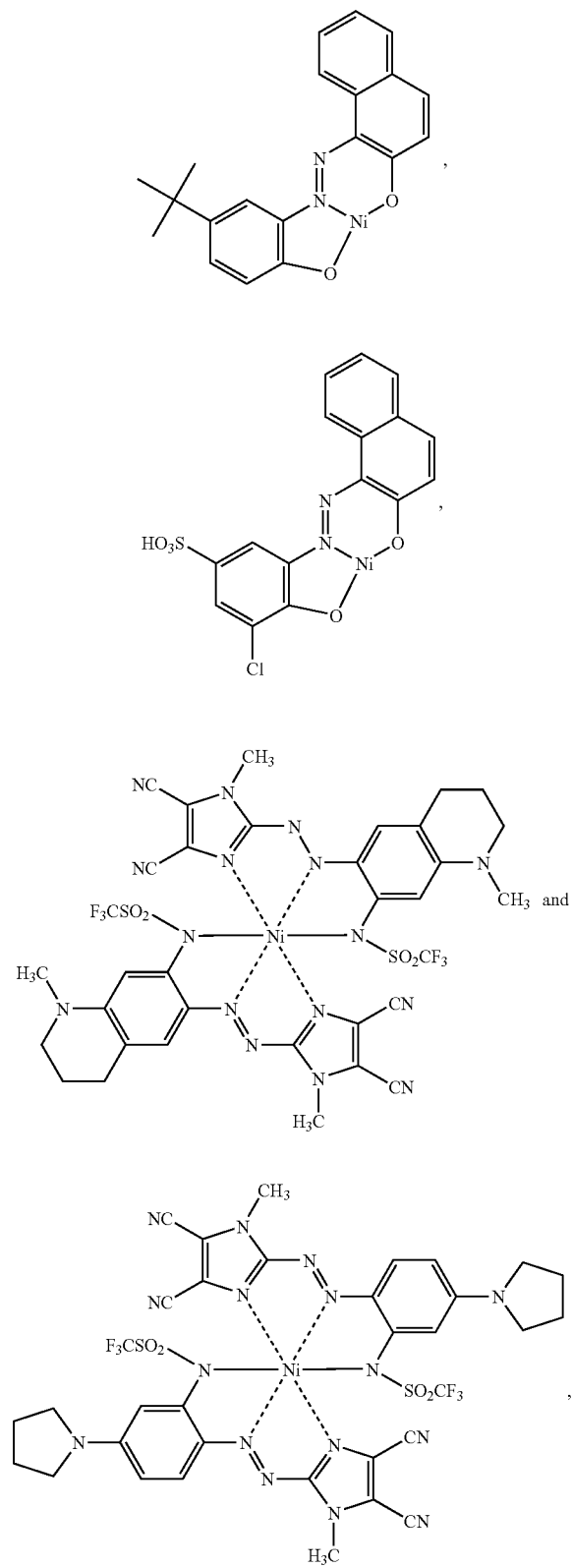

and other known metal complexes, illustrated, for example, by the compounds of formulae Further suitable additives are organometallic compounds, such as for example ferrocenes, for example those of EP-A-0 600 427 or US-A-2003/0 224 293, which provide some stability while controlling the decomposition temperature.

The person skilled in the art will know from other optical information media, or will easily identify, which additives in which concentration are particularly well suited to which purpose. Suitable concentrations of additives are, for example, from 0.001 to 1000% by weight, preferably from 1 to 50% by weight, based on the recording medium of formula (I). This range is also valid for the compounds of formula (II).

The recording medium according to the invention, in addition to comprising the compounds of formula (I) may additionally comprise salts, the ions of which may originate, for example, from the components used, such as those mentioned above. If present, the additional salts are preferably present in amounts of up to 20% by weight, based on the total weight of the recording layer.

Reflecting materials suitable for the reflective layer include especially metals, which provide good reflection of the laser radiation used for recording and playback, for example the metals of Groups 3-12, 13, 14 and 15 of the Periodic Table of the Chemical Elements. Ag, Al, Au, Bi, Cd, Ce, Co, Cr, Cu, Dy, Er, Eu, Fe, Gd, Hf, Hg, Ho, In, Ir, La, Lu, Mo, Nb, Nd, Ni, Os, Pb, Pd, Pm, Pr, Pt, Rh, Ru, Sb, Sc, Sm, Sn, Ta, Tb, Ti, Tm, V, W, Y, Yb, Zn and Zr and alloys thereof are especially suitable. Special preference is given to a reflective layer of aluminium, silver, copper, gold or an alloy thereof, on account of its high reflectivity and ease of production. It is suitable to check the compatibility of the reflecting layer with the recording layer compound, which is sometimes borderline at higher temperatures in a moist environment, depending on the chemical structure of the quinoid anion of the recording layer compound and the reflective layer's metal (potential redox reaction).

Materials suitable for the protective layer include chiefly plastics, which are applied in a thin layer to the support or to the uppermost layer either directly or with the aid of adhesive layers. It is advantageous to select mechanically and thermally stable plastics having good surface properties, which may be modified further, for example written on. The plastics may be thermosetting plastics or thermoplastic plastics. Preference is given to radiation-cured (e.g. using UV radiation) protective layers, which are particularly simple and economical to produce. A wide variety of radiation-curable materials is known. Examples of radiation-curable monomers and oligomers are acrylates and methacrylates of diols, triols and tetrols, polyimides of aromatic tetracarboxylic acids and aromatic diamines having $C_1$-$C_4$alkyl groups in at least two ortho-positions of the amino groups, and oligomers having dialkyl-maleinimidyl groups, e.g. dimethylmaleinimidyl groups.

The recording media according to the invention may also have additional layers, for example interference layers. It is also possible to construct recording media having a plurality of (for example two, three, four or five) recording layers. The structure and the use of such materials are known to the person skilled in the art (dual layer media are described more in detail below). Where present, interference layers are preferably arranged between the recording layer and the reflecting layer and/or between the recording layer and the substrate and consist of a dielectric material, for example as described in EP 353 393 of $TiO_2$, $Si_3N_4$, ZnS or silicone resins.

The recording media according to the invention can be produced by processes known per se, it being possible for various methods of coating to be employed depending upon the materials used and their function.

Suitable coating methods are, for example, immersion, pouring, brush-coating, blade-application and spin-coating, as well as vapour-deposition methods carried out under a high vacuum. When, for example, pouring methods are used, solutions in organic solvents are generally employed. When solvents are employed, care should be taken that the supports used are not sensitive to those solvents. Suitable coating methods and solvents are described, for example, in EP-A401 791.

The recording layer is applied preferably by the application of a dye solution by spin-coating, solvents that have proved satisfactory being especially alcohols, e.g. 2-methoxyethanol, n-propanol, isopropanol, isobutanol, n-butanol, 1-methoxy-2-propanol, amyl alcohol or 3-methyl-1-butanol, or preferably fluorinated alcohols, for example 2,2,2-trifluoroethanol or 2,2,3,3-tetrafluoro-1-propanol, and mixtures thereof. It will be understood that other solvents or solvent mixtures can also be used, for example those solvent mixtures described in EP-A-511 598 and EP-A-833 316. Ethers (dibutyl ether), ketones (2,6-dimethyl-4-heptanone, 5-methyl-2-hexanone), esters (e.g. the lactic acid esters known from WO-03/098 617) or saturated or unsaturated hydrocarbons (toluene, xylene or as disclosed in WO-03/034 146 tert-butyl-benzene and similar compounds) can also be used, optionally also in the form of mixtures (e.g. dibutyl ether/2,6-dimethyl-4-heptan-one) or mixed components.

The person skilled in the art of spin-coating will in general routinely try all the solvents with which he is familiar, as well as binary and ternary mixtures thereof, in order to discover the solvents or solvent mixtures which result in a high-quality and, at the same time, cost-effective recording layer containing the solid components of his choice. Known methods of process engineering can also be employed in such optimisation procedures, so that the number of experiments to be carried out can be kept to a minimum.

The invention therefore relates also to a method of producing an optical recording medium, wherein a solution of a compound of formula (I) in an organic solvent is applied to a substrate having depressions. The application is preferably carried out by spin-coating.

The application of the metallic reflective layer is preferably effected by sputtering, vapour-deposition in vacuo or by chemical vapour deposition (CVD). The sputtering technique is especially preferred for the application of the metallic reflective layer on account of the high degree of adhesion to the support. Such techniques are known and are described in specialist literature (e.g. J. L. Vossen and W. Kern, "Thin Film Processes", Academic Press, 1978).

The structure of the recording medium according to the invention is governed primarily by the readout method; known function principles include the measurement of the change in transmission or, preferably, reflection, but it is also known, for example, to measure the fluorescence instead of the transmission or reflection.

When the recording material is structured for a change in reflection, the following structures, for example, can be used: transparent support/recording layer (optionally multilayered)/reflective layer and, if expedient, protective layer (not necessarily transparent); or support (not necessarily transparent)/reflective layer/recording layer and, if expedient, transparent protective layer. In the first case, the light is incident from the support side, whereas in the latter case the radiation is incident from the recording layer side or, where applicable, from the protective layer side. In both cases the light detector is located on the same side as the light source. The first-mentioned structure of the recording material to be used according to the invention is generally preferred.

In particular, a dual layer disk where both recording layers can be recorded and read from the same side can be used: for example DVD+R Dual Layer or DVD-R Dual Layer featuring both 8.5 GB/side.

One way to manufacture such dual layer media called "2P Process" uses the following embodiment: transparent substrate/recording material/semi-reflective layer/spacer layer applied by spin-coating and cured through a transparent stamper/second recording layer/reflective layer/adhesive layer/second half disk. Intermediate protective layers can be introduced when required.

Another way to manufacture dual layer media called "inverted stack" consists of making on one hand a half-disk with the following embodiment: transparent substrate/recording material/semi-reflective layer and on the other hand another half-disk with an inverted layer sequence: substrate/ reflective layer/recording materials. The two half disks are then bonded together with an adhesive layer so that the two substrates form the two sides of the final disk. Intermediate protective layers can be introduced at various places when required, for example between the recording material and the adhesive layer. Such technique is described in WO-04/021 336 and in WO-04/042 717.

Of course, similar or analogue techniques can be used for media with a higher number of recording layers, too.

When the recording material is structured for a change in light transmission, the following different structure, for example, comes into consideration: transparent support/recording layer (optionally multilayered) and, if expedient, transparent protective layer. The light for recording and for readout can be incident either from the support side or the recording layer side or, where applicable, the protective layer side, the light detector in this case always being located on the opposite side.

Suitable lasers are those having a wavelength of from 600 to 700 nm, for example commercially available lasers having a wavelength of 602, 612, 633, 635, 647, 650, 670 or 680 nm, especially semi-conductor lasers, such as GaAsAl, InGaAlP or GaAs laser diodes having a wavelength especially of about 635, 650 or 658 nm. The recording is effected, for example, point for point in a manner known per se, by modulating the laser in accordance with the mark lengths and focussing its radiation onto the recording layer. It is known from the specialist literature that other methods are currently being developed which may also be suitable for use.

The method according to the invention allows the storage of information with great reliability and stability, distinguished by very good mechanical and thermal stability and by high light stability and by sharp pit boundary zones. Special advantages include the high contrast, the low jitter and the surprisingly high signal/noise ratio, so that excellent readout is achieved. The high storage capacity is especially valuable in the field of video and multimedia.

The readout of information is carried out according to methods known per se by registering the change in absorption or reflection using laser radiation, for example as described in "CD-Player und R-DAT Recorder" (Claus Biaesch-Wiepke, Vogel Buchverlag, Würzburg 1992).

The information-containing medium according to the invention is especially an optical information material of the WORM type. It can be used, for example, as a playable DVD (digital versatile disk), as storage material for a computer or as an identification and security card or for the production of diffractive optical elements, for example holograms.

The invention accordingly relates also to a method for the optical recording, storage and playback of information, wherein a recording medium according to the invention is used. The recording and/or the playback advantageously take place in a wavelength range of from 600 to 700 nm, preferably as already indicated.

The following examples illustrate the invention in greater detail (all percentages are by weight, unless otherwise indicated):

EXAMPLE 1

60.0 g of 97% 2-amino-5-nitrothiazole are dissolved, with stirring, in 880 ml of 50% (vol.) sulfuric acid at 23° C. The light-brown solution is cooled to −10° C. In the course of 40 minutes, 100 ml of aqueous 4N sodium nitrite solution are added. The now dark blue-green solution is stirred at from −10 to −8° C. for a further 15 minutes. During that time 48 g of resorcinol are dissolved in 400 ml of ethanol and cooled to −10 to −15° C. The resulting solution is then added slowly to the diazonium solution. Immediately a thick, dark-red precipitate is formed and the temperature rises to about 0° C. The reaction mixture is then stirred for a further 2 hours at from 0 to 5° C., diluted with 500 ml of water and filtered with suction. The suction-filtered material is washed with 4 litres of water and dried for 24 hours at 60° C./$10^3$ Pa, yielding 78 g of red-brown product of formula:

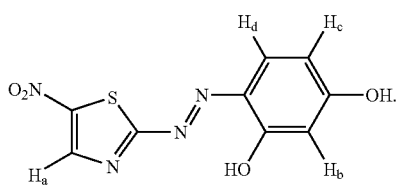

$^1$H-NMR [ppm]: 8.87 (s, $H_a$); 6.46 (s, $H_b$); 6.49/6.52 (d, $H_c$); 7.71/7.74 (d, $H_d$).

EXAMPLE 2

25 g of the compound according to example 1 are introduced into 100 ml of dimethylacetamide and stirred at 23° C. Then 12.7 g of cobalt(II) acetate tetrahydrate are added. Both starting materials slowly dissolve and an almost black solution is formed which is stirred at room temperature for 3 hours. After that time a dark-red precipitate has formed, which is filtered with suction through a Buchner filter and washed with 20 ml of dimethylacetamide. The suction-filtered material is suspended, with stirring, in 1.2 litres of methanol. After the addition of 10 g of sodium acetate (anhydrous) the reaction mixture is heated to 60-65° C. and clarified by filtration at that temperature. The filtrate is concentrated to 200 ml using a rotary evaporator and cooled to from 5 to 10° C., whereupon crystallisation begins. The precipitate is filtered with suction and washed with 50 ml of methanol of a temperature of 0-5° C. Drying at 50-55° C./$10^3$ Pa yields 15 g of an almost black product of formula:

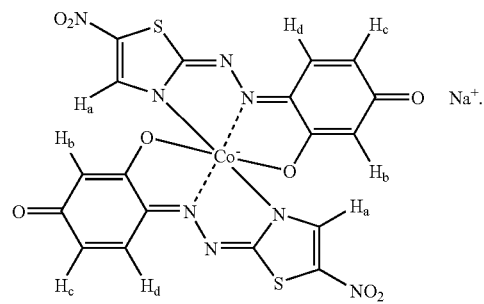

$^1$H-NMR [ppm]: 7.99 (s, $H_a$); 5.32 (s, $H_b$); 6.22/6.25 (d, $H_c$); 7.81/7.85 (d, $H_d$).

EXAMPLE 3

60.0 g of 2-amino-5-nitrothiazole are dissolved, with stirring, in 600 ml of 50% (vol.) sulfuric acid and 500 g of ice. The light-brown solution is cooled to −10° C. In the course of 108 minutes, 108 ml of aqueous 4N sodium nitrite solution are added. The now dark black-green solution is stirred at from −12 to −10° C. for a further 1 hour. During that time, 64 g of 4-chlor-resorcinol are dissolved in 400 ml of isopropanol and cooled to −5° C. The resulting solution is then added in the course of 10 minutes to the diazonium solution. The reaction mixture is then stirred for 15 h at from 0° C. to room temperature and filtered with suction. The suction-filtered material is washed with 4 litres of water and dried for 24 hours at 50° C./$10^3$ Pa, yielding 90 g of red-brown product of formula:

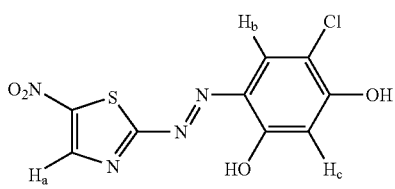

$^1$H-NMR [ppm]: 8.86 (s, $H_a$); 7.75 (s, $H_b$); 6.57 (s, $H_c$).

EXAMPLE 4

35 g of the compound according to example 3 are introduced into 620 ml of methanol and stirred at 23° C. Then 12.45 g of cobalt(II) acetate tetrahydrate are added. Both starting materials slowly dissolve and a dark violet solution is formed which is stirred for 15 h at room temperature. The solution is evaporated to about half the volume under vacuum ($10^3$ Pa) and cooled to 5° C. A dark violet precipitate has formed, which is filtered with suction through a Buchner filter and washed with methanol and isopropanol. Drying at 50° C./$10^3$ Pa yields 24 g of an almost black product of formula:

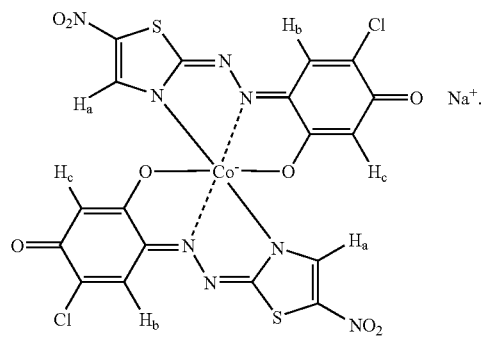

$^1$H-NMR [ppm]: 8.31 (s, $H_a$); 8.03 (s, $H_d$); 5.37 (s, $H_c$).

EXAMPLE 5

Synthesis of Indolium 1.53 g of p-toluenesulfonic acid are dissolved, with stirring, in 10 ml of methanol. To the colorless solution, an orange solution of 1.86 g of 8-methoxyjulolidine-9-aldehyde in 10 ml of methanol is added. 1.39 g of 1,3,3-trimethyl-2-methyleneindoline are then added to the now yellow-red solution, which turns violet and is stirred for 15 h at 23° C. The solvent is evaporated at $10^3$ Pa giving 4.67 g of a violet liquid. The product is dissolved in dichloromethane, filtered and the solvent is evaporated at $10^3$ Pa yielding 4 g of shining violet crystals of following formula, which are used directly for the next step (example 12):

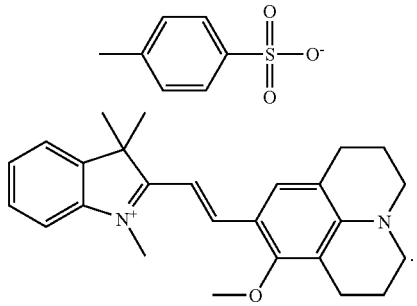

EXAMPLE 6

4.5 ml of 98% sulfuric acid are dissolved in 46 ml of ethanol under stirring, with some cooling in order to keep a temperature close to 25° C. 8 g of 4-chlor-phenylhydrazine hydrochloride are added, followed by 6.5 ml of 3-methyl-2-pentanone. The reaction media is then stirred at 75° C. for 15 h. After cooling to 23° C., some ethanol is evaporated under reduced pressure, and 60 ml of 5% aqueous NaOH solution are slowly added. The aqueous phase is extracted with ethyl acetate, and this organic phase is evaporated under reduced pressure to 9.1 g of dark orange oil. The product of the following formula is used crude for the next step (examples 6 and 35):

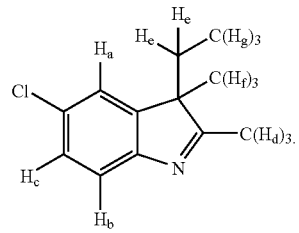

$^1$H-NMR [ppm]: 7.47/7.46 (d, $H_a$); 7.42/7.40 (d, $H_b$); 7.32-7.29 (dd, $H_c$); 2.15 (s, $3H_d$); 2.00-1.71 (m, $2H_e$); 1.23 (s, $3H_f$); 0.26 (t, $3H_g$).

EXAMPLE 7

The crude material according to example 6 is dissolved in 18 ml of chloroform, and 3.7 ml of methyliodide are added. Then, the reaction medium is heated to reflux for 18 hours. It is then cooled to 0° C. and filtrated at this temperature. The solid obtained is washed with cold acetone, yielding 11.2 g of a beige compound of formula:

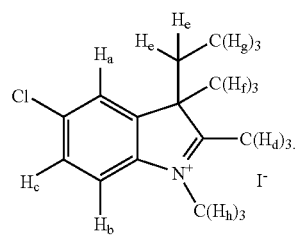

$^1$H-NMR [ppm]: 8.0 (d, H$_a$); 7.99/7.96 (d, H$_b$); 7.76-7.73 (dd, H$_c$); 4.02 (s, 3H$_h$); 2.8 (s, 3H$_d$); 2.31-2.05 (m, 2H$_e$); 1.55 (s, 3H$_f$); 0.41 (t, 3H$_g$).

EXAMPLE 8

2.1 g of the compound according to example 7 are dissolved in 40 ml of methanol. 1.24 g of 2-methoxy-4-diethylamino-benzaldehyde are added. The solution is refluxed for 4.5 hours. After cooling down to 23° C., the solution is evaporated under reduced pressure to yield 3.5 g of a dark-green crude compound of formula:

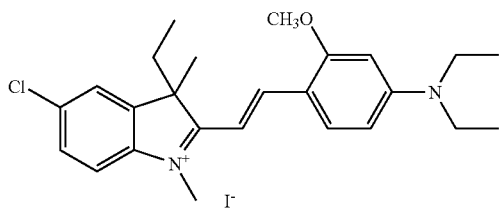

$^1$H-NMR [ppm]: 8.37/8.32 (d, 1H); 8.05/8.02 (d, 1H); 7.87-7.86 (d, 1H); 7.66-7.57 (m, 2H); 7.22/7.16 (d, 1H); 6.63-6.60 (dd, 1H); 4.02 (s, 3H); 3.85 (s, 3H, OMe); 3.65-3.58 (q, 4H); 2.38-2.20 (m, 2H); 1.70 (s, 3H); 1.20 (t, 6H); 0.35 (t, 3H).

EXAMPLE 9

10 ml of 98% sulfuric acid are dissolved in 105 ml of ethanol under stirring, with some cooling in order to keep a temperature close to 25° C. 17.9 g of 4-chlor-phenylhydrazine hydrochloride are added, followed by 15.1 g of cyclohexyl methyl ketone. The pink-beige suspension obtained is then stirred for 15 h at 75° C. After cooling to 23° C., some ethanol is evaporated under reduced pressure, and 130 ml of 5% aqueous NaOH solution are slowly added. The aqueous phase is extracted with ethyl acetate, and this organic phase is evaporated under reduced pressure to obtain 24.8 g of a dark brown oily solid. The product of the following formula is used crude for the next step (example 10):

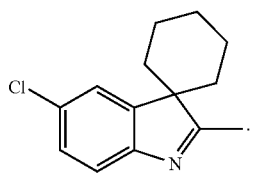

$^1$H-NMR [ppm]: 7.76 (d, 1H); 7.46/7.44 (d, 1H); 7.38-7.36 (dd, 1H); 2.21 (s, 3H); 1.90-1.09 (m, 11H).

EXAMPLE 10

23.3 g of the compound according to example 9 are dissolved in 40 ml chloroform. Then, 8.7 ml of methyl iodide are added. The solution is then heated to reflux for 4 hours, it becoming necessary to add 40 ml more of chloroform). The rest of the procedure is identical to example 7 and yields 18.4 g of a hell-beige solid of formula:

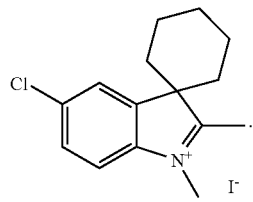

$^1$H-NMR [ppm]: 8.16/8.15 (d, 1H); 8.01/7.98 (d, 1H); 7.81-7.77 (dd, 1H); 3.96 (s, 3H); 2.80 (s, 3H); 2.09-1.23 (m, 11H).

EXAMPLE 11

2.25 g of the compound according to example 10 are dissolved in 40 ml of methanol. 1.15 g of p-morpholino-benzaldehyde are added and the solution is heated to reflux for 5 hours. After cooling down to 23° C., the solution is evaporated under reduced pressure to yield 3.4 g of a greenish crude compound of formula:

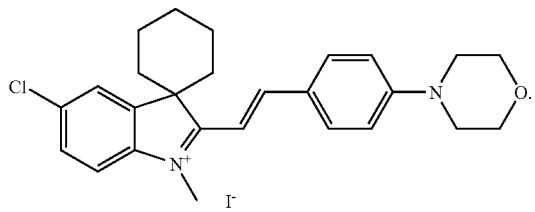

$^1$H-NMR [ppm]: 8.36/8.31 (d, 1H); 8.16/8.08 (m, 2H); 8.00-7.98 (d, 1H); 7.75-7.72 (dd, 2H); 7.30/7.25 (d, 1H); 7.13-7.10 (d, 2H); 4.04 (s, 3H); 3.77-3.72 (m, 4H); 3.51 (t, 4H); 2.30-1.44 (3m, 11H).

EXAMPLE 12

Synthesis of Salt 1 g of the product according to example 4 is added to 20 ml of methanol at 23° C. A solution of 0.82 g of the product according to example 5 in 10 ml of methanol is added and the resulting solution is stirred for 15 h at 23° C., thus giving a violet suspension. Water is added to the suspension and the organic solvents are removed under vacuum (10$^3$ Pa). The product is filtered with suction through a Büchner filter and washed with water. Drying at 40° C./10$^3$ Pa yields 1.27 g of an almost black product of formula:

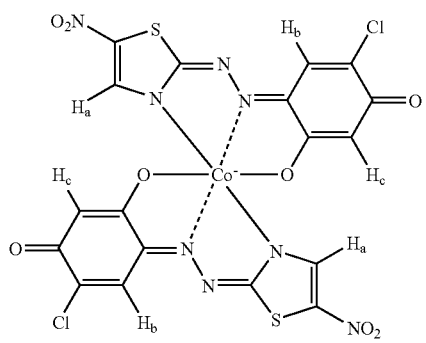

-continued

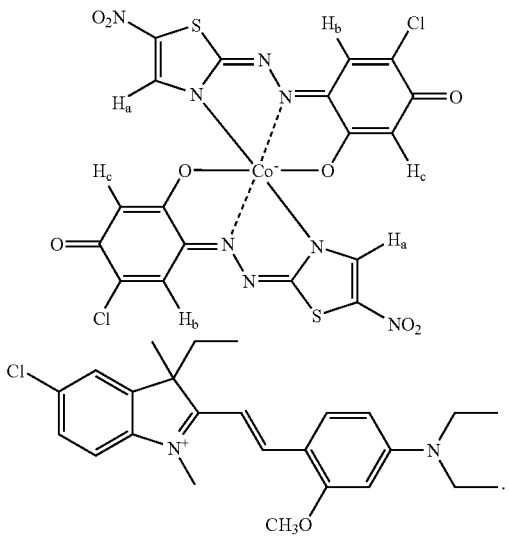

$^1$H-NMR [ppm]: 8.22 (d, 1 H); 8.16 (s, 2 H$_a$); 8.04 (s, 2 H$_d$); 7.81 (s, 1 H); 7.71 (d, 1 H); 7.62 (d, 1 H); 7.52 (d, 1 H); 7.42 (dd, 1 H); 7.10 (d, 1 H); 5.47 (s, 2 H$_c$); 3.87 (s, 3 H); 3.79 (s, 3 H); 3.43 (br. s, 4 H); 2.72 (m, 4 H); 1.89 (m, 4 H); 1.71 (s, 6 H).

| Microanalysis: | C | H | N | O | Na |
|---|---|---|---|---|---|
| [%] | 50.00 | 3.85 | 13.20 | 14.93 | 71 mg/kg |
| calc.: | 50.63 | 3.57 | 13.42 | 13.80 | 0 |

$\lambda_{max}$ (solid film): 560 nm.

EXAMPLE 13

The product is prepared according to the method of example 12 starting from 0.81 g of the product of example 4 and 0.64 g of the product of example 8. The product is a dark brown powder of formula:

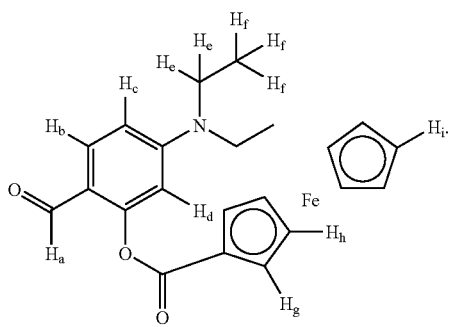

$^1$H-NMR [ppm]: 8.35 (d, 1 H); 8.15 (s, 2 H$_a$); 8.04 (s, 2 H$_b$); 8.03 (d, 1 H); 7.86 (d, 1 H); 7.61 (d, 1 H); 7.60 (d, 1 H); 7.21 (d, 1 H); 6.61 (d, 1 H); 6.24 (d, 1 H); 5.47 (s, 2 H$_c$); 4.01 (s, 3 H); 3.84 (s, 3 H); 3.59 (t, 4 H); 2.15-2.35 (m, 2 H); 1.70 (s, 3 H); 1.20 (t, 6 H); 0.36 (t, 3 H).

| Microanalysis: | C | H | N | Cl |
|---|---|---|---|---|
| [%] | 47.12 | 3.80 | 12.75 | 9.47 |
| calc.: | 48.35 | 3.59 | 13.11 | 9.96 |

EXAMPLE 14

1.5 g of the compound according to example 12 are dissolved in 98.5 g of 1-methoxy-2-propanol and filtered through a 0.2 μm Teflon™ filter. The dye solution is then applied at 250 rev/min to a 1.2 mm thick, planar polycarbonate disc (diameter 120 mm) and the speed of rotation is increased to 1200 rev/min so that the excess of solution is spun off and a uniform solid layer is formed. After drying, the layer thickness and the complex refractive index of the solid layer are determined by means of spectral transmission and reflection measurements using an optical measuring system (ETA-R™, Steag ETA-Optik GmbH). At 658 nm the dye layer has a refractive index n of 2.65 and an extinction coefficient k of 0.14. The photostability is determined with a calibrated xenon lamp (Hanau), the relative decrease in absorption –D$_{24}$ after 24 hours' irradiation is 29%.

EXAMPLE 15

1.5% by weight of the compound according to example 13 is dissolved in 2,2,3,3-tetrafluoropropanol and applied to a planar polycarbonate substrate by spin-coating. The film thickness and optical constants of the solid layer are determined by the same methods as in example 14. $\lambda_{max}$ of the 50 nm thick solid film is at 587 nm, with a refractive index n of 2.95 and an extinction coefficient k of 1.32. At 658 nm the dye layer has a refractive index n of 2.47 and an extinction coefficient k of 0.06, the relative decrease in absorption –D$_{24}$ is 6%. Thus, the dye film is both highly photostable and possesses a surprisingly high refractive index.

EXAMPLE 16

It is proceeded in close analogy to example 15, with the difference that the compound according to example 4 is used instead of the compound according to example 13. $\lambda_{max}$ of the 50 nm thick solid film is at 565 nm. At 658 nm the dye layer has a refractive index n of 2.54 and an extinction coefficient k of 0.11, the relative decrease in absorption –D$_{24}$ is 8%.

EXAMPLE 17

1 g of 4-(diethylamino)salicylaldehyde and 1.4 g of potassium carbonate are suspended in 25 ml of acetone. 1.9 g of ferrocenecarboxylic acid chloride is added dropwise. Then the reaction is stirred at 23° C. for 48 hours. The mixture is diluted with dichloromethane and washed with water. Drying of the organic phase over sodium sulphate and evaporation of the solvent lead to a brown-red oil that is purified by flash chromatography to obtain 0.7 g of a red compound of formula $^1$H-NMR [ppm]: 9.84 (s, H$_a$); 7.67 (m, H$_b$); 6.71 (d, H$_c$); 6.42 (s, H$_d$); 4.96 (m, 2H$_g$); 4.64 (m, 2H$_h$); 4.38 (m, 5H$_i$); 3.42 (m, 4H$_e$); 1.14 (m, 6H$_f$).

EXAMPLE 18

0.7 g of the compound according to example 17 and 0.59 g of the compound according to example 7 are dissolved in 25 ml of methanol. The solution is heated to reflux for 16 hours. After cooling down to 23° C., the solution is evaporated at 300 Pa to yield 1.3 g of a dark-blue crude compound of formula

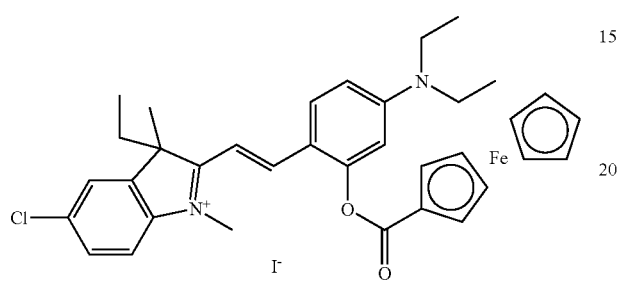

that is used directly to form the compound of example 282.

EXAMPLE 19

5 g of 3,4,5-trifluorobezyl bromide and 8 g of potassium iodide are suspended in 50 ml of acetone. The reaction is heated to reflux for 5 hours. After cooling down to 23° C., the mixture is diluted with water and extracted with dichloromethane. The organic phase is washed with a solution of sodium carbonate. Drying of the organic phase over sodium sulphate and evaporation of the solvent leads to 4 g of 3,4,5-trifluorobezyl iodide as a yellow oil that is used directly for the next step.

2.55 g of 3-ethyl-1,2,3-trimethyl-3H-indolium iodide are dissolved in 20 ml of methyl ethyl ketone. 4 g of 3,4,5-trifluorobenzyl iodide are added through a syringe. The mixture is heated to reflux for 15 hours.

3.35 g of 2-methoxy-4-diethylamino-benzaldehyde are added and the mixture is further heated to reflux for 7 hours. After cooling down to 10° C., the mixture is filtered and the solid is washed with cold acetone yielding 3.19 g of compound of formula

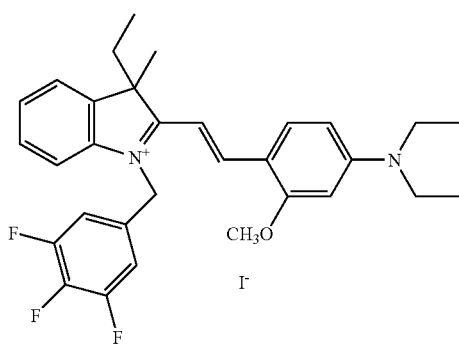

that is used directly to form the compound of example 20.

EXAMPLE 20

The product is prepared according to the method of example 12, starting from 2.92 g of the product according to example 2 and 3.19 g of the product according to example 19. The product is a dark green powder of formula:

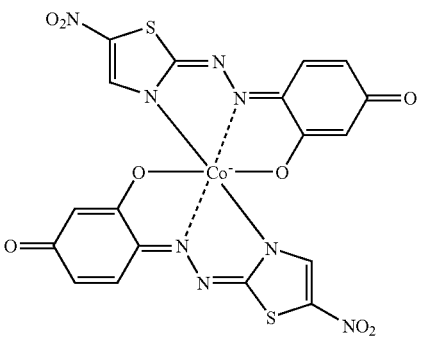

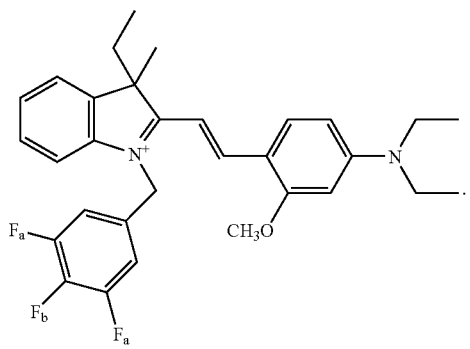

$^{19}$F-NMR [ppm]: −134 (s, F$_a$); −162 (s, F$_b$);

MS (−cACPI): 588 (M$^−$, A$^−$); (+cACPI): 507 (M$^+$, C$^+$); $\lambda_{max}$ (solid film): 550 nm.

See example 279 for the optical parameters of the solid compound.

EXAMPLE 21

The product is prepared in the same way as example 1 starting from 4.35 g of 2-amino-5-nitrothiazole and 5.24 g of 4-hexylresorcinol yielding 7.6 g of a violet powder of formula:

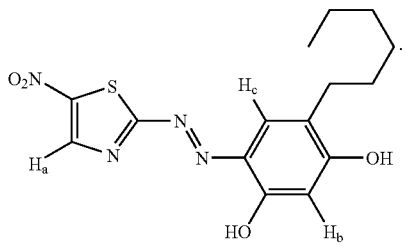

$^1$H-NMR [ppm]: 8.83 (s, H$_a$); 7.52 (s, H$_c$); 6.46 (s, H$_b$); 2.49 (m, 2 H); 1.46 (m, 2 H); 1.27 (m, 6 H); 0.84 (m, 3 H).

EXAMPLE 22

The product is prepared in the same way as example 2 starting from 7 g of the product of example 21 and 2.49 g of cobalt(II) acetate yielding 3 g of a dark green powder of formula:

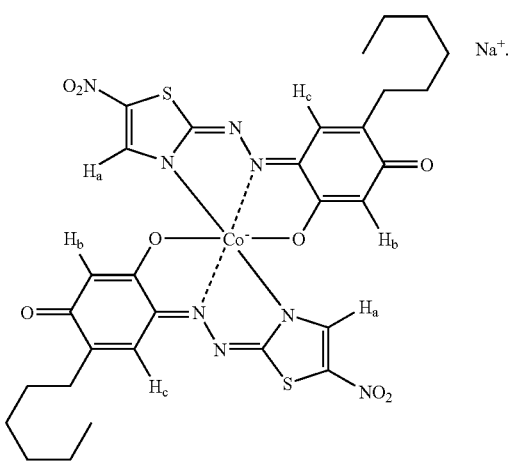

$^1$H-NMR [ppm]: 7.89 (s, H$_a$); 7.62 (s, H$_c$); 5.30 (s, H$_b$); 2.37 (m, 2 H); 1.51 (m, 2 H); 1.33 (m, 6 H); 0.88 (m, 3 H).

EXAMPLE 23

28.52 g of m-anisidine and 50.5 g of tri-propyl phosphate are heated 15 to 240° C. for 2 hours. After cooling down to 150° C., 50 ml of 30% aqueous NaOH solution are added slowly. The mixture is poured on water and extracted with dichloromethane. Drying of the organic phase over sodium sulphate and evaporation of the solvent leads to 48.9 g of a brown oil that is purified by chromatography (hexane) yielding 27.65 g of a colourless oil of the formula:

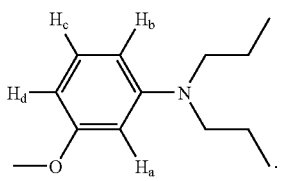

$^1$H-NMR [ppm]: 7.02 (t, J=8.1, H$_c$); 6.22 (m, H$_d$); 6.14 (m, H$_b$); 6.11 (s, H$_a$); 3.70 (s, 3 H); 3.19 (t, J=7.5, 4 H); 1.51 (m, 4 H); 0.87 (t, J=10.8, 6 H).

EXAMPLE 24

8.43 g of phosphorous trichloride are added dropwise to 30 ml of dimethylformamide (DMF) at −10° C. The mixture is stirred at 0° C. for 20 minutes. A solution of 12.65 g of the product according to example 23 in 10 ml of DMF are added and the mixture is heated to 110° C. for 2 hours. After cooling to 23° C., the mixture is poured on ice, neutralized with sodium bicarbonate and extracted with dichloromethane. Drying of the organic phase over sodium sulphate and evaporation of the solvent leads to 12.6 g of a brown viscous oil that is purified by chromatography (hexane ethyl acetate 5:1), yielding 10.55 g of a yellow solid of the formula

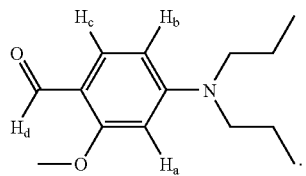

$^1$H-NMR [ppm]: 9.98 (s, H$_d$); 7.48 (d, J=9, HG); 6.34 (d, J=9, H$_b$); 6.12 (s, H$_a$); 3.85 (s, 3 H); 3.35 (t, J=7.5, 4 H); 1.57 (m, 4 H); 0.90 (t, J=7.2, 6 H).

EXAMPLE 25

3.46 g of the compound according to example 51 and 5.2 g of propyl iodide are heated at 120° C. in a closed vessel for 18 hours. After cooling to 23° C., the mixture is diluted with a 2:1 mixture of hexane and acetone, cooled to 0° C. and filtered giving 5.15 g of a beige solid of the formula

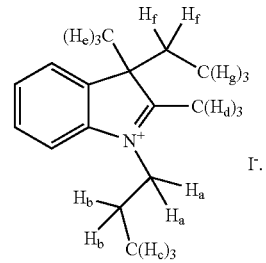

$^1$H-NMR [ppm]: 8.03 (m, H); 7.80 (m, H); 7.65 (m, 2 H); 4.48 (t, J=7.5H$_a$); 2.87 (s, 3 H$_d$); 2.32-2.07 (m, 2 H$_f$); 1.87 (m, 2 H$_b$); 1.55 (s, 3 H$_e$); 1.00 (t, J=7.5, 3H$_c$); 0.35 (t, J=7.5, 3H$_g$).

EXAMPLE 26

The product is prepared according to the method of example 11, starting from 1.03 g of the product according to example 24 and 0.7 g of the product according to example 25. The product, which is used directly to prepare the product of example 246, is a dark violet powder of the formula

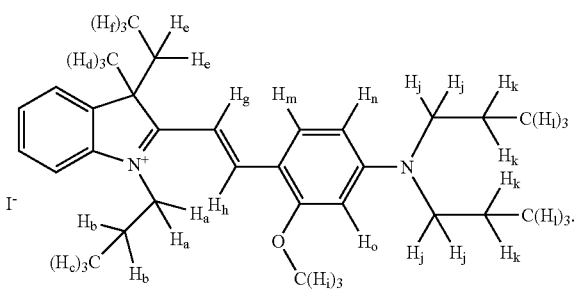

$^1$H-NMR [ppm]: 8.35 (m, H); 8.04 (m, H); 7.68 (m, H$_g$ and H$_m$); 7.47 (m, 2 H); 7.26 (m, H$_h$); 6.59 (m, H$_n$); 6.24 (m, H$_o$); 4.38 (m, 2 H$_a$); 4.00 (s, 3 H$_i$); 3.52 (m, 4 H$_j$); 2.33 (m, 2 H$_e$);

1.80 (m, 2 $H_b$); 1.70 (s, 3 $H_d$); 1.63 (m, 4 $H_k$); 1.03-0.83 (m, 6 $H_l$ and 3 $H_c$); 0.35 (t, J=6.9, 3$H_f$).

EXAMPLE 27

14.44 g of borane dimethylsulfide complex are added in 30 minutes to a solution of 21.5 g of N-(3,5-dimethoxy-phenyl)-acetamide in 80 ml of tetrahydro-furan (THF). The mixture is heated to 100° C. The solvent and the dimethylsulfide are distilled. After cooling to 23° C., 40 ml of 20% aqueous HCl are added and the mixture is heated to 100° C. for 30 minutes. After cooling to 0° C., 25 ml of 30% aqueous NaOH are added and the mixture is extracted with ethyl acetate. Drying of the organic phase over sodium sulphate and evaporation of the solvent leads to 21.2 g of greenish crystals of the formula

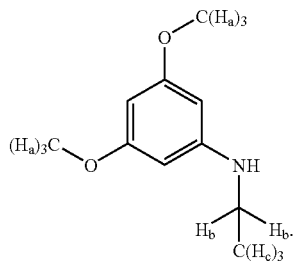

$^1$H-NMR [ppm]: 5.72 (m, 3 H); 5.49 (broad s, NH); 3.63 (s, 6 $H_a$); 2.98 (q, J=7.2, 2$H_b$); 1.12 (t, J=7.2, 3 $H_c$).

EXAMPLE 28

21 g of the product according to example 27 are dissolved in 80 ml of pyridine. 33.7 ml of acetic anhydride are added in 40 minutes and the mixture is stirred at 23° C. for 30 minutes. The mixture is poured into water and extracted with dichloromethane. Drying of the organic phase over sodium sulphate and evaporation of the solvent leads to 13.3 g of grey crystals of the formula

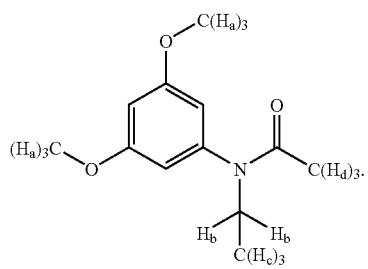

$^1$H-NMR [ppm]: 6.50 (m, H); 6.44 (m, 2 H); 3.75 (s, 6$H_a$); 3.60 (q, J=6.9, 2$H_b$); 1.77 (s, 3 $H_d$); 1.00 (t, J=7.2, 3 $H_c$).

EXAMPLE 29

13.3 g of the product according to example 28 are dissolved in 110 ml of dichloromethane and the solution is cooled to 0° C. 21.2 g of titanium tetra-chloride are added in 20 minutes and the mixture is stirred at 0° C. for 2 hours. The mixture is then cooled down to −78° C. and 9 g of dichloromethyl methyl ether are added in 10 minutes. The mixture is stirred for 1 hour at −78° C. and then warmed to 23° C. After pouring the solution on water, 20 ml of concentrated HCl are added. The organic phase is separated and evaporated under vacuum ($10^3$ Pa) giving a brown resin that is purified by chromatography yielding 16.1 g of a yellowish solid of the formula

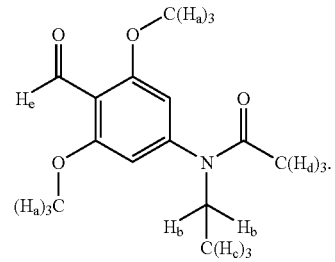

$^1$H-NMR [ppm]: 10.31 (s, $H_e$); 6.70 (s, 2 H); 3.84 (s, 6 $H_a$); 3.70 (q, J=7.2, 2 $H_b$); 1.89 (s, 3 $H_d$); 1.04 (t, J=7.2, 3 $H_c$).

EXAMPLE 30

2 g of the product according to example 29 and 0.44 mg of sodium methylate (as a 5.4 M solution in methanol) are dissolved in 21 ml of methanol. The solution is stirred at 23° C. for 10 days. After pouring the solution into water, the mixture is extracted with methylene dichloride. Drying of the organic phase over sodium sulphate and evaporation of the solvent leads to 1.5 g of a beige solid of the formula

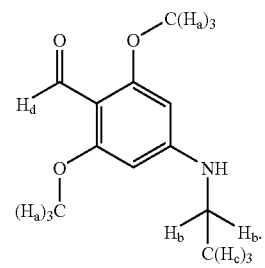

$^1$H-NMR [ppm]: 10.08 (s, $H_d$); 6.78 (m, NH); 5.78 (s, 2 H); 3.74 (s, 6 $H_a$); 3.16 (m, 2 $H_b$); 1.04 (t, J=7.2, 3 $H_c$).

EXAMPLE 31

It is proceeded according to the method of example 11, but starting from 0.32 g of the product according to example 30 and 0.21 g of 3-ethyl-1,2,3-trimethyl-3H-indolium iodide (prepared in a similar way as in example 7). The product is a dark violet powder of the formula

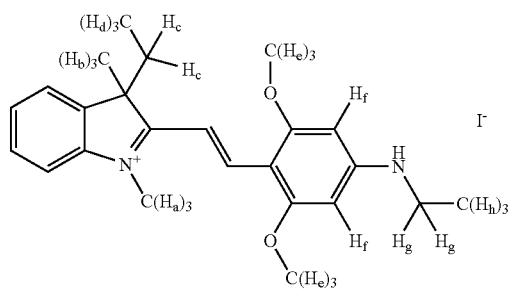

that is used directly to prepare the product of example 254.

$^1$H-NMR [ppm]: 8.42 (m, H); 7.95 (m, NH); 7.84-7.36 (m, 6 H); 6.00 (s, 2 H$_f$); 3.94 (s, 6 H$_e$); 3.76 (s, 3 H$_a$); 3.33 (m, 2 H$_g$); 2.30 (m, 2 H$_c$); 1.74 (s, 3 H$_b$); 1.20 (t, 3 H$_h$); 0.32 (t, 3 H$_d$).

EXAMPLE 32

2 g of 1,2-bis-bromoacetoxy-ethane (prepared according to Phosphorus, Sulfur Silicon Relat. Elem. 143, 191 [1998]) and 2.79 g of 4-diethyl-amino-2-hydroxy-benzaldehyde are suspended in 20 ml methyl ethyl ketone. 2.24 g of potassium bromide and 70 mg of potassium iodide are added in portions and the light brown suspension is heated to reflux for 24 h. The reaction mixture is cooled to 20° C., filtered and concentrated by rotary evaporation to yield 3.66 g of a brown residue which is purified by repeated crystallization from ethyl acetate/hexane to obtain the pure compound (oil) of formula

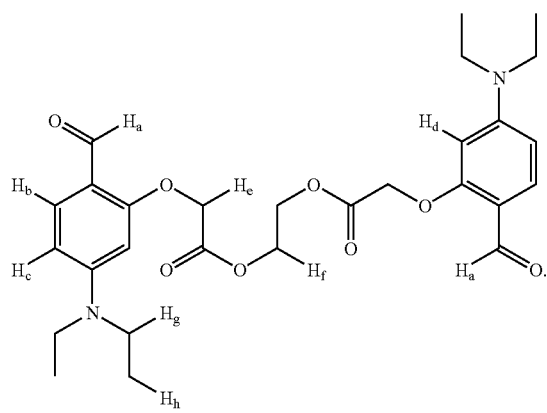

$^1$H-NMR [ppm]: 10.07 (s, 2H$_a$); 7.51 (d, 2H$_b$); 6.37 (d, 2H$_c$); 6.08 (s, 2H$_d$); 4.95 (s, 4H$_e$); 4.37 (s, 4H$_f$); 3.41 (q, 8H$_g$); 1.10 (t, 12H$_h$).

EXAMPLE 33

0.42 g of the compound according to example 32 and 0.56 g of the compound according to example 7 are suspended in 15 ml of methanol and heated to reflux for 15 h. After evaporation, 0.92 g of the product of formula

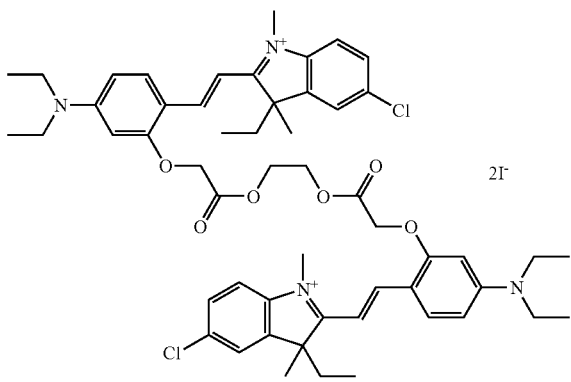

are obtained as a dark violet solid and used in example 34 without further purification.

$^1$H-NMR [ppm]: 8.4 (bd, 2H); 8.0 (m, 2H); 7.86 (d, 2H); 7.55-7.68 (m, 4H); 7.42 (broad s, 2H); 6.60 (d, 2H); 6.25 (s, 2H); 5.09 (s, 4H); 4.53 (s, 4H); 3.90 (s, 6H); 3.57 (q, 8H); 2.25-2.45 (m, 4H); 1.73 (s, 6H); 1.14 (t, 12H); 0.4 (t, 6H).

EXAMPLE 34

A solution of 0.65 g of the cobalt complex according to example 2 in 12 g of 1-methoxy-2-propanol is added dropwise to a solution of 0.7 g of the product according to example 33 in 15 ml of methanol. The mixture is stirred 18 h at 23° C., then poured onto a 2:1 mixture of water and methanol. The precipitate is filtered on a sintered glass filter, washed with water and dried at $10^3$ Pa to yield 0.72 g of the greenish black product of formula $^1$H-NMR [ppm]: 8.4 (bd, 2H); 8.0 (m, 6H); 7.80-7.92 (m, 6H); 7.55-7.68 (m, 4H); 7.42 (broad s, 2H); 6.60 (d, 2H); 6.25 (d, 4H); 6.21 (s, 2H); 5.31 (s, 4H); 5.07 (s, 4H); 4.51 (s, 4H); 3.89 (s, 6H); 3.58 (q, 8H); 2.25-2.45 (m, 4H); 1.73 (s, 6H); 1.14 (t, 12H); 0.34 (t, 6H).

$\lambda_{max}$ (solid film): 544 nm.

See example 276 for the optical parameters of the solid compound.

EXAMPLE 35

2.5 g of 3-methyl-4-phenyl-2-butanone (prepared according to Bull. Chem. Soc. Jpn. 62, 4072 [1989]) is reacted with 2.36 g of 4-chlorophenyl-hydrazine hydrochloride according to the method of example 6 to yield 3.7 g of the crude, brownish yellow oil of formula

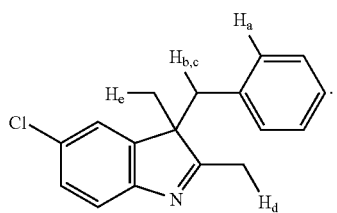

$^1$H-NMR [ppm]: 7.37-7.0 (m, 6 H); 6.82 (m, 2H$_a$); 3.18/3.14 (d, H$_b$); 2.89/2.85 (d, H$_c$); 2.34 (s, 3H$_d$); 1.39 (s, 3H$_e$).

EXAMPLE 36

3.2 g of the compound according to example 35 are alkylated with methyl iodide according to the method of example 7 to yield 1.6 g of a beige powder of formula

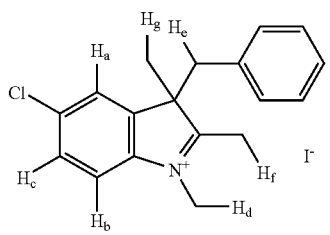

that is used directly to form the compound of example 37.

$^1$H-NMR [ppm]: 7.91 (d, H$_a$); 7.76/7.73 (d, H$_b$); 7.67/7.64 (dd, H$_c$); 7.13-7.03 (m, 3H); 6.79-6.76 (m, 2H); 3.82 (s, 3H$_d$); 3.6-3.3 (m, 2H$_e$); 2.94 (s, 3H$_f$); 1.67 (s, 3H$_g$).

EXAMPLE 37

1.36 g of the compound according to example 36 are treated with 0.68 g of 2-methoxy-4-diethylamino-benzaldehyde according to the method of example 8 to yield 2.0 g of a crude dark powder of formula

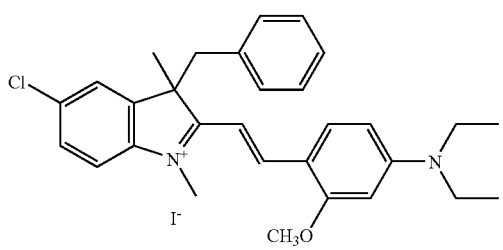

that is used directly for the next step (example 38).

$^1$H-NMR [ppm]: 8.50/8.45 (d, 1H); 8.08/8.05 (d, 1H); 8.0 (d, 1H); 7.52/7.49 (d, 1H); 7.42/7.39 (d, 1H); 7.19/7.14 (d, 1H); 7.07-7.0 (m, 3H); 6.66-6.61 (m, 3H); 6.28 (d, 1H); 4.04 (s, 3H); 3.7-3.3 (m, 6H); 3.56 (s, 3H); 1.86 (s, 3H); 1.22 (t, 6H).

EXAMPLE 38

According to the method of example 12, 2.0 g of the product according to example 37 are treated with 2.02 g of the cobalt complex according to example 2. After washing with water and drying, 2.56 g of a greenish black product of the following formula are obtained:

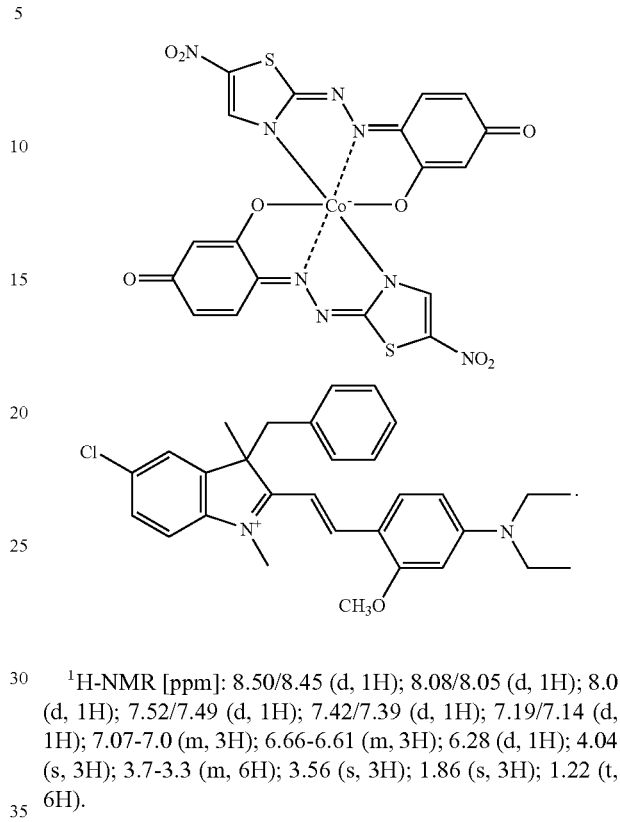

$^1$H-NMR [ppm]: 8.50/8.45 (d, 1H); 8.08/8.05 (d, 1H); 8.0 (d, 1H); 7.52/7.49 (d, 1H); 7.42/7.39 (d, 1H); 7.19/7.14 (d, 1H); 7.07-7.0 (m, 3H); 6.66-6.61 (m, 3H); 6.28 (d, 1H); 4.04 (s, 3H); 3.7-3.3 (m, 6H); 3.56 (s, 3H); 1.86 (s, 3H); 1.22 (t, 6H).

| Microanalysis: | C | H | N | O |
| --- | --- | --- | --- | --- |
| [%] | 54.32 | 3.99 | 13.20 | 13.57 |
| calc.: | 53.57 | 4.20 | 12.74 | 14.40 |

$\lambda_{max}$ (solid film): 552 nm.

See example 275 for the optical parameters of the solid compound.

EXAMPLE 39

2.5 g of 1,1,2,3-tetramethyl-benzindolinium iodide are stirred at 23° C. in 25 ml of methanol. 1.4 g of 4-diethylaminobenzaldehyde are added. The mixture is heated to 60° C. and stirred at this temperature for 3 hours. The obtained violet solution containing the compound of the following formula is used directly to prepare the product of example 40:

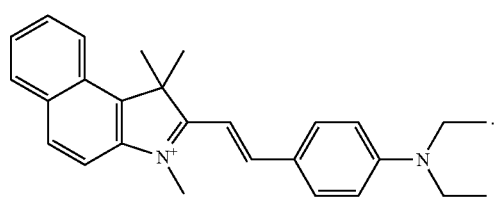

EXAMPLE 40

The product is prepared according to the method of example 12, starting from the product according to example 2 and the product according to example 39. The product is a dark green powder of formula

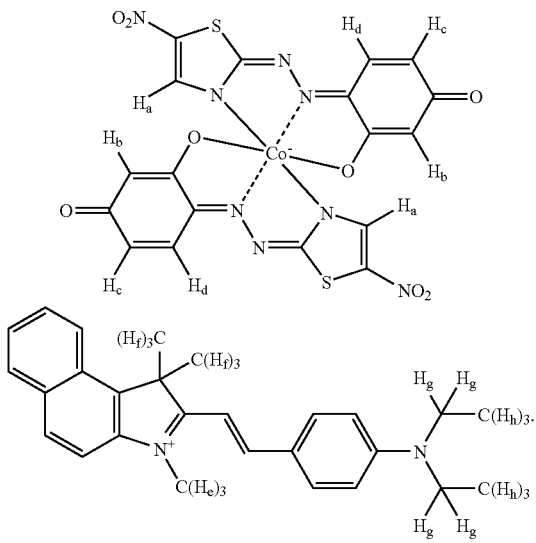

$^1$H-NMR [ppm]: 8.36 (m, 2 H); 8.17 (m, 2 H); 8.00 (m, 5 H); 7.83 (d, J=5, 2 H$_d$); 7.42 (broad s, 2H); 7.76 (m, 1 H); 7.63 (m, 1 H); 7.25 (d, J=16, 1 H); 6.87 (d, J=9, 2 H); 6.22 (dd, J=10, J=15, 2 H$_c$); 5.31 (s, 2 H$_b$); 5.07 (s, 4H); 4.07 (s, 3 H$_e$); 3.54 (q, J=7, 4 H$_g$); 1.98 (s, 6 H$_f$); 1.15 (t, J=7, 6 H$_h$).

See example 201 for the optical parameters of the solid compound.

EXAMPLE 41

111 g of 4-fluoro-aniline are stirred in 500 ml of water and 212.5 ml of hydrochloric acid 37% are added. The mixture is cooled to –5° C. 252 ml of aqueous 4N sodium nitrite solution are added within 50 minutes. The reaction mixture is stirred for 2 hours at 0° C. to 5° C. The orange solution is added within 30 minutes to a chilled solution of 74.8 g of imidazole in 750 ml of water. During this addition, the pH is kept at 10.5 by addition of 161.5 ml of a 30% aqueous solution of sodium hydroxyde while keeping the temperature between 0° C. and 5° C. The reaction mixture is stirred overnight (18 h) at room temperature (23° C.). The orange precipitate is filtered and washed with 5 liters of water.

The wet filter cake is stirred at room temperature in 700 ml of water. 266.5 ml of dimethylsulfate are added within 5 hours. During the addition, the pH is kept at 10 by adding 155 ml of a 30% aqueous solution of sodium hydroxyde while keeping the temperature between 25° C. and 30° C. The reaction mixture is stirred for 2 hours at 23° C. 500 g of sodium chloride and 250 g of potassium chloride are added leading to the precipitation of the product. The reaction mixture is stirred overnight, filtered and washed with 1.5 liter of brine (20%). The filtered material is dried for 24 hours at 50° C./10$^3$ Pa, yielding 324 g of an orange product which is dissolved in 1 liter of methanol and filtered. The solution is diluted with 350 ml of dimethyl-formamide and the methanol is evaporated at 10$^3$ Pa/40° C. The precipitate is diluted with 350 ml of acetone, cooled to 5° C., filtered and washed with 500 ml of acetone. The filtered material is dried for 24 hours at 50° C./10$^3$ Pa, yielding 227.1 g of a reddish brown product of formula

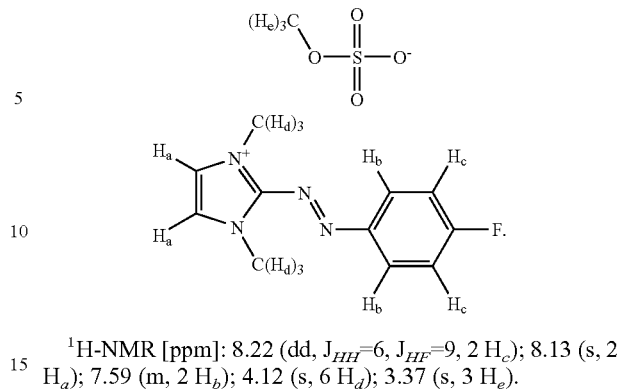

$^1$H-NMR [ppm]: 8.22 (dd, J$_{HH}$=6, J$_{HF}$=9, 2 H$_c$); 8.13 (s, 2 H$_a$); 7.59 (m, 2 H$_b$); 4.12 (s, 6 H$_d$); 3.37 (s, 3 H$_e$).

EXAMPLE 42

21.9 g of the compound according to example 41 are stirred at 23° C. in 100 ml of methanol. 13.3 g of fluoroaniline and 19.6 g of sodium acetate are added. The reaction is stirred for 18 h and the methanol evaporated at 10$^3$ Pa. The sticky residue is stirred in 200 ml of an 5% aqueous solution of sodium chloride. The solid formed is filtered and washed with 100 ml of an 5% aqueous solution of sodium chloride. The filtered material is dried for 24 hours at 50° C./10$^3$ Pa, yielding 26 g of an almost black product of formula

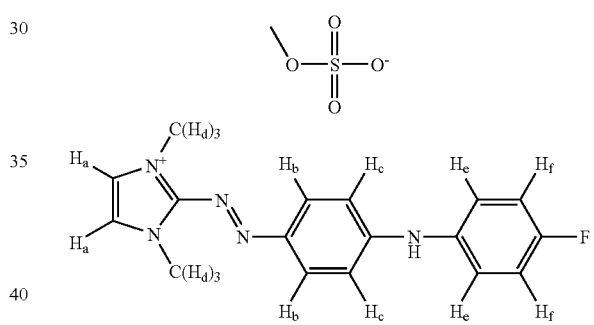

that is used directly to prepare the product of example 198.

$^1$H-NMR [ppm]: 7.88 (d, J$_{HF}$=9, 2 H$_f$); 7.73 (s, 2 H$_a$); 7.27 (m, 4 H); 7.08 (d, J=9, 2 H); 3.96 (s, 6 H$_d$).

EXAMPLE 43

The product is prepared according to the method of example 41, starting from 12.4 g of 2-fluoroaniline and 7.4 g of imidazole. 27 g of the compound of formula

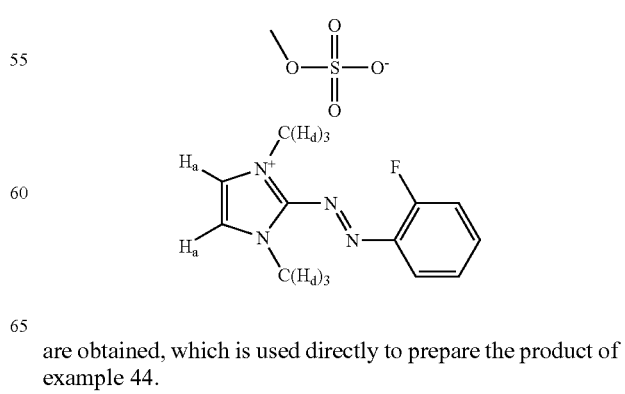

are obtained, which is used directly to prepare the product of example 44.

EXAMPLE 44

4 g of triethylamine are added at 23° C. to a stirred mixture of 2.04 g 2,2-dimethyl-1,3-diamino-propane, 100 g isopropanol and 14.3 g of the compound according to example 43. The mixture is stirred for 6 hours at 60° C. and 4 hours while cooling down to 22° C. The reaction mass is filtered. The cake is washed with 30 ml of isopropanol and dried for 24 hours at 50° C./10³ Pa, yielding 12 g of a reddish violet product of the following formula that is used directly to prepare the product of example 215:

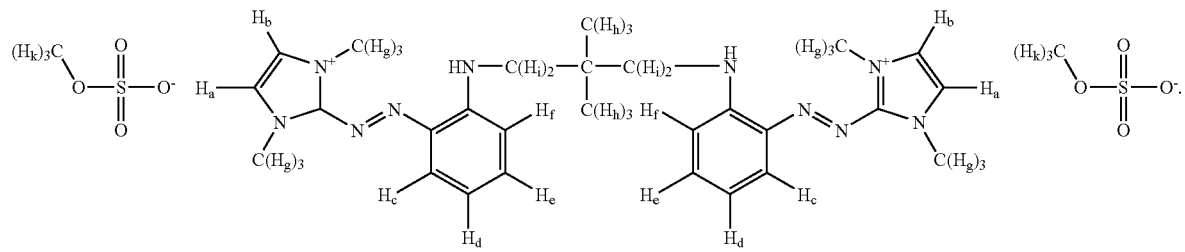

$^1$H-NMR [ppm]: 8.64 (broad s, 2 NH); 7.80 (s, 2 $H_a$ and 2 $H_b$); 7.74 (dd, J=3, J=9, 2 $H_c$); 7.47 (ddd, J=3, J=9, J=15, 2 $H_e$); 7.21 (d, J=9, 2 $H_f$); 6.79 (ddd, J=3, J=9, J=15 2 $H_d$); 3.97 (s, 12 $H_g$); 3.52 (d, J=6, 4 $H_i$); 3.37 (s, 4 $H_k$); 1.07 (s, 6 $H_h$).

EXAMPLE 45

3.3 g of anhydrous sodium acetate and 2.72 g of α,α'-diamino-p-xylene are added to a solution of 13.7 g of the compound according to example 41 in 270 ml of isopropanol at 23° C. The reaction mixture is stirred 18 h at 65-70° C. The isopropanol is evaporated at 40° C./10³ Pa and the residue is dissolved in 100 ml of water. 10 g of sodium chloride are added to precipitate the product. Filtration and washing with 100 ml of a 5% aqueous solution of sodium chloride affords a solid which is stirred in 40 ml of water for 10 minutes. Filtration and drying for 24 hours at 50° C./10³ Pa yields 5.5 g of dark reddish brown product of formula

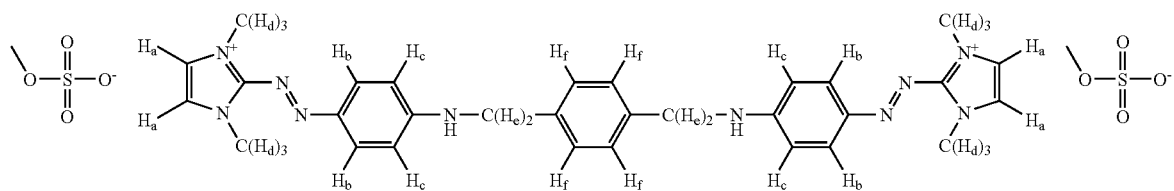

that is used directly to prepare the product of example 232.

$^1$H-NMR [ppm]: 8.65 (broad s, 2 NH); 7.86 (d, J=9, 4 $H_b$); 7.71 (s, 4 $H_a$); 7.34/-7.38 (m, 4 $H_f$); 6.87 (d, J=9, 4 $H_c$); 4.54 (s, 4 $H_e$); 3.94 (s, 12 $H_d$).

EXAMPLE 46

The product is prepared in the same way as in example 1, starting from 26.6 g of 2-amino-4,5-dicyano-imidazole and 22 g of resorcinol. The product is an orange powder of formula:

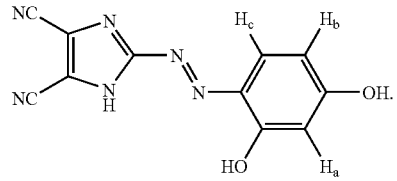

$^1$H-NMR [ppm]: 10.99 (s, 2 OH); 7.63 (d, J=6, $H_c$); 6.50 (dd, J=3, J=6, $H_b$); 6.40 (d, J=3, $H_a$); 4.8 (broad s, NH).

EXAMPLE 47

10.1 g of the compound according to example 46 are dissolved in 200 ml of 1-methoxy-2-propanol at 23° C. 3.3 g of anhydrous sodium acetate dissolved in 50 ml of methanol are added, followed by 5 g of cobalt(II) acetate tetrahydrate. The mixture is stirred for 3 hours, evaporated and the residue is dissolved in 100 ml of water. 10 g of sodium chloride are added and the solution kept 18 h at 5° C. The precipitate is filtered and washed with 20 ml of a 5% aqueous sodium chloride solution. Drying affords 9 g of an almost black product of formula

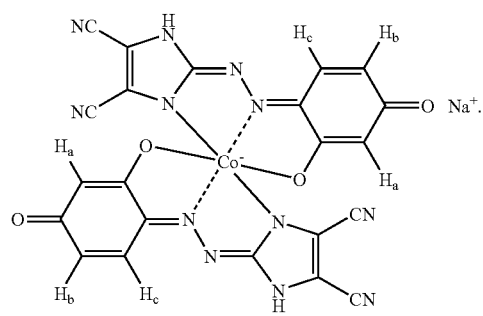

$^1$H-NMR [ppm]: 11.5 (broad s, 2 NH); 7.98 (d, J=9, $H_c$); 6.45 (dd, J=3, J=9 $H_b$); 6.04 (d, J=3, $H_a$).

EXAMPLE 48

The product is prepared in the same way as in example 1, starting from 14.6 g of (5-amino-1,3,4-thiadiazol-2-ylsulfanyl)-acetonitrile and 10 g of resorcinol. The product is an orange powder of formula

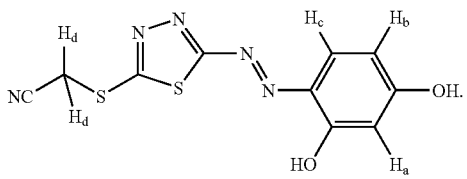

$^1$H-NMR [ppm]: 11.13 (broad s, OH); 11.08 (s, OH); 7.70 (m, $H_c$); 6.48 (m, $H_a$ and $H_b$); 4.57 (s, 2 $H_d$).

EXAMPLE 49

The product is prepared in the same way as in example 1, starting from 15 g of 2-amino-benzthiazole and 12.1 g of resorcinol. The product is an orange powder of formula

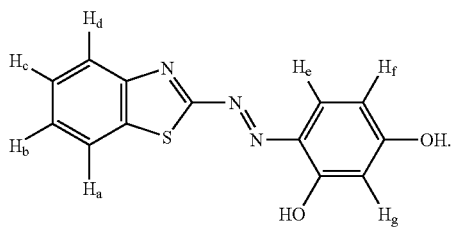

$^1$H-NMR [ppm]: 8.26 (m, $H_a$ and $H_d$); 7.94 (d, J=9, $H_e$); 7.66-7.78 (m, $H_b$ and $H_c$); 6.73 (m, $H_f$ and $H_g$).

EXAMPLE 50

33.3 g of the compound according to example 1 are dissolved, with stirring, in 550 ml of methanol at 23° C. To the red suspension, 10.25 g of sodium acetate are added. The now violet solution is stirred at room temperature for 3 hours. The solution is filtered with suction, evaporated under vacuum yielding after drying for 12 hours at 50° C./$10^3$ Pa 30.76 g of a black powder of formula:

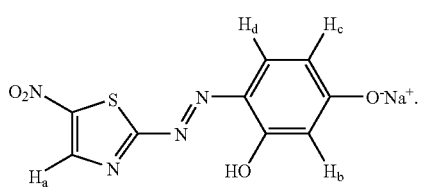

$^1$H-NMR [ppm]: 8.45 (s, $H_a$); 7.04/7.01 (d, $H_d$); 6.16/6.13 (d, $H_c$); 5.53/5.52 (d, $H_b$).

EXAMPLE 51

25 ml of 98% sulfuric acid are dissolved in 260 ml of ethanol under stirring, with some cooling in order to keep a temperature close to 25° C. 28.1 g of phenylhydrazine hydrochloride are added, followed by 38.3 ml of 3-methyl-2-pentanone. The reaction media is then stirred at 75° C. for 3 h. After cooling to 23° C., some ethanol is evaporated under reduced pressure, and 200 ml of 5% aqueous NaOH solution are slowly added. The aqueous phase is extracted with ethyl acetate, and this organic phase is evaporated under reduced pressure to 41.8 g of brown resin. The product of the following formula is used crude for the next step (example 52):

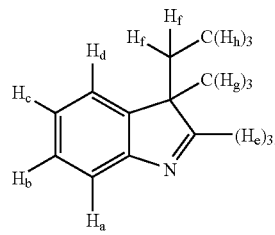

$^1$H-NMR [ppm]: 7.43/7.40 (d, $H_a$); 7.34/7.33 (d, $H_d$); 7.33-7.31 (dd, $H_b$); 7.16-7.14 (dd, $H_c$); 2.15 (s, 3$H_e$); 1.98-1.69 (m, 2$H_f$); 1.21 (s, 3$H_g$); 0.26 (t, 3$H_h$).

EXAMPLE 52

The crude material according to example 51 is dissolved in 150 ml of chloroform, and 20 ml of methyliodide are added. Then, the reaction medium is heated to reflux for 4 hours. It is then cooled to 0° C. and filtrated at this temperature. The solid obtained is washed with cold acetone, yielding 45 g of a beige compound of formula:

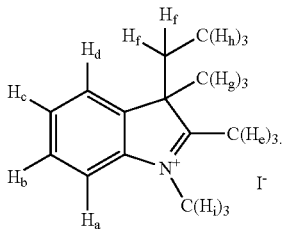

$^1$H-NMR [ppm]: 7.97-7.91 (dd, $H_a$); 7.82-7.76 (d, $H_d$); 7.69-7.61 (m, $H_b$ and $H_c$); 4.03 (s, 3$H_i$); 2.80 (s, 3$H_e$); 2.28-2.03 (m, 2$H_f$); 1.53 (s, 3$H_g$); 0.41 (t, 3$H_h$).

EXAMPLE 53

8 g of the compound according to example 52 are dissolved in 200 ml of methanol. 4.8 g of 4-diethylamino-salicylaldehyde are added. The solution is refluxed for 4 hours and stirred for 18 hours at room temperature, then adjusted to a volume of 220 ml and used directly in example 54. An analytical sample is evaporated at $10^3$ Pa to yield a dark-violet crude compound of formula:

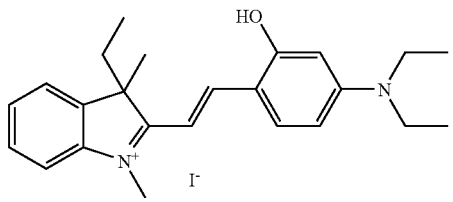

$^1$H-NMR [ppm]: 11.02 (br. S, OH); 8.42/8.37 (d, 1H); 7.98/7.95 (d, 1H); 7.68-7.61 (m, 2H); 7.55-7.50 (dd, 1H); 7.44-7.39 (dd, 1H); 7.23/7.18 (d, 1H); 6.55-6.51 (dd, 1H); 6.23/6.22 (d, 1H); 3.86 (s, 3H); 3.51-3.41 (m, 4H); 3.35 (s, 3H); 2.40-2.18 (m, 2H); 1.69 (s, 3H); 1.17 (t, 6H); 0.34 (t, 3H).

EXAMPLE 54

Synthesis of Salt 0.3 g of the product according to example 50 is added to 20 ml of methanol at 23° C. 8.8 ml of the solution of example 53 corresponding to 0.5 g of pure compound are added and the resulting solution is stirred for 2 h at 23° C., thus giving a violet suspension. 15 ml of water are added to the suspension and the product is filtered with suction through a Bücchner filter and washed with a 1:1 mixture of methanol and water. Drying at 50° C./10$^3$ Pa yields 0.24 g of an almost black product of formula:

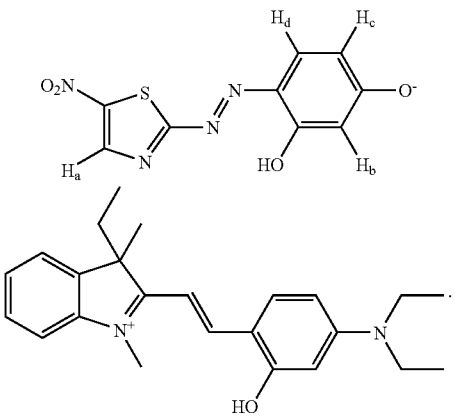

See example 288 for the optical parameters of a solid layer made from a mixture of this compound with the compound of example 88.

EXAMPLES 55-293

Analogously to examples 14 and 15, the $\lambda_{max}$ (solid film), the n- and k-values (using a Steag ETA-Optik) and the photostability (relative decrease in adsorption $-D_{24}$ after 24 hours' irradiation with a calibrated xenon lamp/Hanau) of recording layers are determined, the following compounds being used:

| Example | Structure | $\lambda_{max}$ [nm] | $n_{658}$ | $k_{658}$ | $-D_{24}$ [%] |
|---|---|---|---|---|---|
| 55 | | 546 | 2.52 | 0.07 | 41 |
| 56 | | 552 | 2.64 | 0.11 | 34 |
| 57 | | 559 | 2.58 | 0.08 | 14 |

-continued

| Example | Structure | $\lambda_{max}$ [nm] | $n_{658}$ | $k_{658}$ | $-D_{24}$ [%] |
|---|---|---|---|---|---|
| 58 | | 544 | 2.47 | 0.07 | 22 |
| 59 | | 574 | 2.42 | 0.05 | 13 |

-continued

| Example | Structure | $\lambda_{max}$ [nm] | $n_{658}$ | $k_{658}$ | $-D_{24}$ [%] |
|---|---|---|---|---|---|
| 60 | | 558 | 2.60 | 0.07 | 10 |
| 61 | | 552 | 2.57 | 0.08 | 10 |
| 62 | | 560 | 2.70 | 0.09 | 8 |

-continued

| Example | Structure | $\lambda_{max}$ [nm] | $n_{658}$ | $k_{658}$ | $-D_{24}$ [%] |
|---|---|---|---|---|---|
| 63 | | 552 | 2.51 | 0.06 | 19 |
| 64 | | 548 | 2.46 | 0.05 | 11 |
| 65 | | 568 | 2.60 | 0.09 | 10 |

-continued

| Example | Structure | $\lambda_{max}$ [nm] | $n_{658}$ | $k_{658}$ | $-D_{24}$ [%] |
|---|---|---|---|---|---|
| 66 | | 553 | 2.53 | 0.06 | 14 |
| 67 | | 555 | 2.60 | 0.07 | 16 |
| 68 | | 565 | 2.66 | 0.17 | 9 |

-continued
| Example | Structure | $\lambda_{max}$ [nm] | $n_{658}$ | $k_{658}$ | $-D_{24}$ [%] |
|---|---|---|---|---|---|
| 69 | 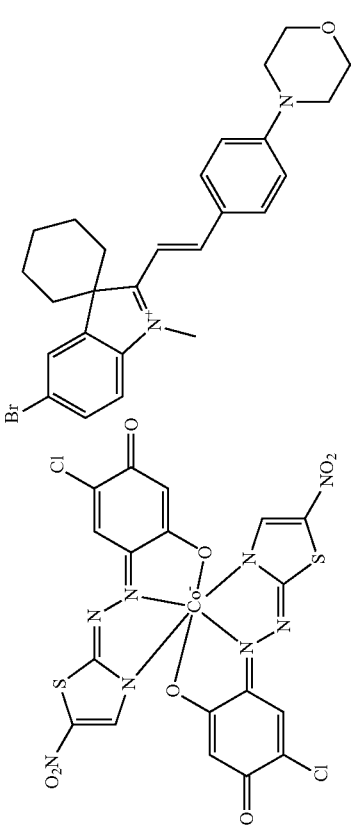 | 552 | 2.45 | 0.06 | 22 |
| 70 | 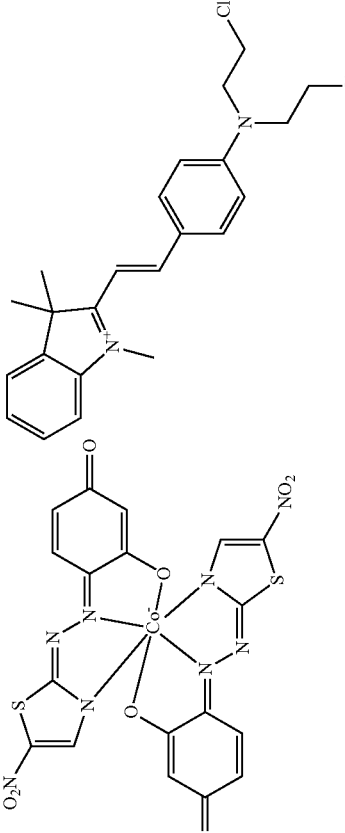 | 537 | 2.31 | 0.05 | 16 |

-continued

| Example | Structure | $\lambda_{max}$ [nm] | $n_{658}$ | $k_{658}$ | $-D_{24}$ [%] |
|---|---|---|---|---|---|
| 71 | | 566 | 2.72 | 0.14 | 13 |
| 72 | | 548 | 2.37 | 0.04 | 14 |
| 73 | | 548 | 2.41 | 0.04 | 14 |

-continued

| Example | Structure | $\lambda_{max}$ [nm] | $n_{658}$ | $k_{658}$ | $-D_{24}$ [%] |
|---|---|---|---|---|---|
| 74 | | 580 | 2.42 | 0.04 | 8 |
| 75 | | 549 | 2.42 | 0.05 | 15 |
| 76 | | 547 | 2.39 | 0.05 | 21 |

-continued

| Example | Structure | $\lambda_{max}$ [nm] | $n_{658}$ | $k_{658}$ | $-D_{24}$ [%] |
|---|---|---|---|---|---|
| 77 | | 538 | 2.34 | 0.04 | 28 |
| 78 | | 547 | 2.38 | 0.06 | 19 |
| 79 | | 578 | 2.42 | 0.05 | 12 |

-continued

| Example | Structure | $\lambda_{max}$ [nm] | $n_{658}$ | $k_{658}$ | $-D_{24}$ [%] |
|---|---|---|---|---|---|
| 80 | | 539 | 2.39 | 0.05 | 23 |
| 81 | | 553 | 2.37 | 0.05 | 23 |

-continued

| Example | Structure | λ$_{max}$ [nm] | n$_{658}$ | k$_{658}$ | -D$_{24}$ [%] |
|---|---|---|---|---|---|
| 82 | | 557 | 2.65 | 0.15 | 38 |
| 83 | | 557 | 2.57 | 0.12 | 27 |
| 84 | | 553 | 2.49 | 0.06 | 10 |

-continued

| Example | Structure | λ_max [nm] | n_658 | k_658 | -D_24 [%] |
|---|---|---|---|---|---|
| 85 | | 551 | 2.41 | 0.05 | 11 |
| 86 | | 555 | 2.51 | 0.05 | 13 |
| 87 | | 559 | 2.51 | 0.06 | 10 |

-continued

| Example | Structure | $\lambda_{max}$ [nm] | $n_{658}$ | $k_{658}$ | $-D_{24}$ [%] |
|---|---|---|---|---|---|
| 88 | | 552 | 2.47 | 0.05 | 19 |
| 89 | | 555 | 2.48 | 0.04 | 18 |
| 90 | | 552 | 2.46 | 0.03 | 30 |

-continued

| Example | Structure | $\lambda_{max}$ [nm] | $n_{658}$ | $k_{658}$ | $-D_{24}$ [%] |
|---|---|---|---|---|---|
| 91 | | 558 | 2.54 | 0.04 | 14 |
| 92 | | 554 | 2.50 | 0.05 | 18 |

-continued

| Example | Structure | $\lambda_{max}$ [nm] | $n_{658}$ | $k_{658}$ | $-D_{24}$ [%] |
|---|---|---|---|---|---|
| 93 | | 545 | 2.49 | 0.03 | 29 |
| 94 | | 561 | 2.67 | 0.09 | 16 |

-continued

| Example | Structure | $\lambda_{max}$ [nm] | $n_{658}$ | $k_{658}$ | $-D_{24}$ [%] |
|---|---|---|---|---|---|
| 95 | | 559 | 2.63 | 0.09 | 15 |
| 96 | | 561 | 2.65 | 0.09 | 15 |
| 97 | | 543 | 2.42 | 0.03 | 13 |

-continued

| Example | Structure | λ_max [nm] | $n_{658}$ | $k_{658}$ | $-D_{24}$ [%] |
|---|---|---|---|---|---|
| 98 | | 523 | 2.23 | 0.03 | 24 |
| 99 | | 547 | 2.48 | 0.05 | 12 |
| 100 | | 552 | 2.62 | 0.14 | 37 |

-continued

| Example | Structure | $\lambda_{max}$ [nm] | $n_{658}$ | $k_{658}$ | $-D_{24}$ [%] |
|---|---|---|---|---|---|
| 101 | | 554 | 2.43 | 0.06 | 11 |
| 102 | | 558 | 2.53 | 0.07 | 13 |

-continued

| Example | Structure | $\lambda_{max}$ [nm] | $n_{658}$ | $k_{658}$ | $-D_{24}$ [%] |
|---|---|---|---|---|---|
| 103 | | 561 | 2.60 | 0.22 | 25 |
| 104 | | 586 | 2.39 | 0.08 | 4 |

-continued

| Example | Structure | λ_max [nm] | n_658 | k_658 | -D_24 [%] |
|---|---|---|---|---|---|
| 105 | | 557 | 2.32 | 0.07 | 12 |
| 106 | | 560 | 2.38 | 0.08 | 9 |

-continued

| Example | Structure | $\lambda_{max}$ [nm] | $n_{658}$ | $k_{658}$ | $-D_{24}$ [%] |
|---|---|---|---|---|---|
| 107 | | 554 | 2.31 | 0.08 | 7 |
| 108 | | 555 | 2.52 | 0.07 | 6 |
| 109 | | 534 | 2.25 | 0.03 | 10 |

-continued

| Example | Structure | $\lambda_{max}$ [nm] | $n_{658}$ | $k_{658}$ | $-D_{24}$ [%] |
|---|---|---|---|---|---|
| 110 | | 549 | 2.24 | 0.04 | 10 |
| 111 | | 554 | 2.46 | 0.06 | 21 |
| 112 | | 552 | 2.51 | 0.09 | 6 |

-continued

| Example | Structure | λ$_{max}$ [nm] | n$_{658}$ | k$_{658}$ | -D$_{24}$ [%] |
|---|---|---|---|---|---|
| 113 | | 560 | 2.47 | 0.06 | 11 |
| 114 | | 564 | 2.64 | 0.12 | 14 |
| 115 | | 560 | 2.60 | 0.09 | 16 |

-continued

| Example | Structure | $\lambda_{max}$ [nm] | $n_{658}$ | $k_{658}$ | $-D_{24}$ [%] |
|---|---|---|---|---|---|
| 116 | | 547 | 2.49 | 0.07 | 18 |
| 117 | | 553 | 2.55 | 0.08 | 7 |
| 118 | | 561 | 2.54 | 0.06 | 18 |

-continued

| Example | Structure | $\lambda_{max}$ [nm] | $n_{658}$ | $k_{658}$ | $-D_{24}$ [%] |
|---|---|---|---|---|---|
| 119 | | 561 | 2.55 | 0.07 | 14 |
| 120 | | 553 | 2.55 | 0.07 | 26 |
| 121 | | 553 | 2.53 | 0.03 | 29 |

-continued

| Example | Structure | $\lambda_{max}$ [nm] | $n_{658}$ | $k_{658}$ | $-D_{24}$ [%] |
|---|---|---|---|---|---|
| 122 | | 549 | 2.42 | 0.06 | 27 |
| 123 | | 548 | 2.45 | 0.06 | 6 |
| 124 | | 555 | 2.53 | 0.06 | 9 |

-continued

| Example | Structure | $\lambda_{max}$ [nm] | $n_{658}$ | $k_{658}$ | $-D_{24}$ [%] |
|---|---|---|---|---|---|
| 125 | | 545 | 2.37 | 0.04 | 6 |
| 126 | | 545 | 2.40 | 0.05 | 4 |
| 127 | | 554 | 2.49 | 0.07 | 12 |

-continued

| Example | Structure | $\lambda_{max}$ [nm] | $n_{658}$ | $k_{658}$ | $-D_{24}$ [%] |
|---|---|---|---|---|---|
| 128 | | 546 | 2.40 | 0.04 | 11 |
| 129 | | 544 | 2.40 | 0.05 | 6 |
| 130 | | 546 | 2.44 | 0.04 | 13 |

-continued

| Example | Structure | $\lambda_{max}$ [nm] | $n_{658}$ | $k_{658}$ | $-D_{24}$ [%] |
|---|---|---|---|---|---|
| 131 | | 549 | 2.46 | 0.05 | 17 |
| 132 | | 588 | 2.32 | 0.06 | 2 |
| 133 | | 549 | 2.52 | 0.06 | 7 |

-continued

| Example | Structure | $\lambda_{max}$ [nm] | $n_{658}$ | $k_{658}$ | $-D_{24}$ [%] |
|---|---|---|---|---|---|
| 134 | | 583 | 2.48 | 0.05 | 8 |
| 135 | | 584 | 2.48 | 0.05 | 7 |
| 136 | | 586 | 2.47 | 0.04 | 9 |

-continued

| Example | Structure | $\lambda_{max}$ [nm] | $n_{658}$ | $k_{658}$ | $-D_{24}$ [%] |
|---|---|---|---|---|---|
| 137 | | 545 | 2.43 | 0.05 | 11 |
| 138 | | 545 | 2.43 | 0.05 | 11 |
| 139 | | 574 | 2.48 | 0.05 | 7 |

-continued

| Example | Structure | $\lambda_{max}$ [nm] | $n_{658}$ | $k_{658}$ | $-D_{24}$ [%] |
|---|---|---|---|---|---|
| 140 | | 574 | 2.48 | 0.05 | 7 |
| 141 | | 574 | 2.47 | 0.04 | 13 |
| 142 | | 548 | 2.38 | 0.04 | 17 |

-continued

| Example | Structure | $\lambda_{max}$ [nm] | $n_{658}$ | $k_{658}$ | $-D_{24}$ [%] |
|---|---|---|---|---|---|
| 143 | | 561 | 2.58 | 0.10 | 16 |
| 144 | | 559 | 2.61 | 0.07 | 11 |
| 145 | | 560 | 2.57 | 0.08 | 16 |

-continued

| Example | Structure | $\lambda_{max}$ [nm] | $n_{658}$ | $k_{658}$ | $-D_{24}$ [%] |
|---|---|---|---|---|---|
| 146 | | 558 | 2.55 | 0.10 | 23 |
| 147 | | 551 | 2.41 | 0.05 | 21 |
| 148 | | 560 | 2.60 | 0.09 | 27 |

-continued

| Example | Structure | λ_max [nm] | n_658 | k_658 | -D_24 [%] |
|---|---|---|---|---|---|
| 149 | | 552 | 2.40 | 0.06 | 17 |
| 150 | | 565 | 2.14 | 0.12 | 10 |
| 151 | | 556 | 2.31 | 0.05 | 18 |

-continued

| Example | Structure | λ$_{max}$ [nm] | n$_{658}$ | k$_{658}$ | −D$_{24}$ [%] |
|---|---|---|---|---|---|
| 152 | | 543 | 2.40 | 0.159 | 8 |
| 153 | | 534 | 2.46 | 0.04 | 15 |
| 154 | | 534 | 2.38 | 0.06 | 9 |

-continued

| Example | Structure | $\lambda_{max}$ [nm] | $n_{658}$ | $k_{658}$ | $-D_{24}$ [%] |
|---|---|---|---|---|---|
| 155 | | 532 | 2.39 | 0.039 | 23 |
| 156 | | 539 | 2.42 | 0.074 | 11 |
| 157 | | 537 | 2.35 | 0.043 | 11 |

-continued

| Example | Structure | $\lambda_{max}$ [nm] | $n_{658}$ | $k_{658}$ | $-D_{24}$ [%] |
|---|---|---|---|---|---|
| 158 | | 539 | 2.37 | 0.071 | 8 |
| 159 | | 535 | 2.34 | 0.043 | 13 |
| 160 | | 537 | 2.33 | 0.052 | 15 |

-continued

| Example | Structure | $\lambda_{max}$ [nm] | $n_{658}$ | $k_{658}$ | $-D_{24}$ [%] |
|---|---|---|---|---|---|
| 161 | | 538 | 2.38 | 0.05 | 24 |
| 162 | | 532 | 2.34 | 0.04 | 17 |
| 163 | | 546 | 2.47 | 0.05 | 20 |

-continued

| Example | Structure | $\lambda_{max}$ [nm] | $n_{658}$ | $k_{658}$ | $-D_{24}$ [%] |
|---|---|---|---|---|---|
| 164 | | 533 | 2.36 | 0.04 | 19 |
| 165 | | 539 | 2.42 | 0.06 | 8 |
| 166 | | 526 | 2.20 | 0.03 | 28 |

-continued

| Example | Structure | $\lambda_{max}$ [nm] | $n_{658}$ | $k_{658}$ | $-D_{24}$ [%] |
|---|---|---|---|---|---|
| 167 | | 534 | 2.28 | 0.03 | 13 |
| 168 | | 552 | 2.45 | 0.05 | 15 |
| 169 | | 558 | 2.79 | 0.50 | 17 |
| 170 | 95 parts compound of example 165<br>5 parts compound of example 169 | 537 | 2.45 | 0.08 | 8 |

-continued

| Example | Structure | $\lambda_{max}$ [nm] | $n_{658}$ | $k_{658}$ | $-D_{24}$ [%] |
|---|---|---|---|---|---|
| 171 | | 555 | 2.15 | 0.02 | 47 |
| 172 | | 543 | 2.40 | 0.16 | 8 |
| 173 | 95 parts compound of example 165<br>5 parts compound of example 172 | 537 | 2.44 | 0.06 | 7 |
| 174 | | 547 | 2.45 | 0.04 | 24 |

-continued

| Example | Structure | $\lambda_{max}$ [nm] | $n_{658}$ | $k_{658}$ | $-D_{24}$ [%] |
|---|---|---|---|---|---|
| 175 | | 533 | 2.60 | 0.15 | 22 |
| 176 | | 540 | 2.39 | 0.06 | 17 |

-continued

| Example | Structure | $\lambda_{max}$ [nm] | $n_{658}$ | $k_{658}$ | $-D_{24}$ [%] |
|---|---|---|---|---|---|
| 177 | | 540 | 2.31 | 0.05 | 17 |
| 178 | | 558 | 2.66 | 0.16 | 14 |

-continued

| Example | Structure | $\lambda_{max}$ [nm] | $n_{658}$ | $k_{658}$ | $-D_{24}$ [%] |
|---|---|---|---|---|---|
| 179 | | 544 | 2.47 | 0.08 | 11 |
| 180 | | 544 | 2.43 | 0.08 | 12 |

-continued

| Example | Structure | λ_max [nm] | $n_{658}$ | $k_{658}$ | $-D_{24}$ [%] |
|---|---|---|---|---|---|
| 181 | | 556 | 2.53 | 0.06 | 8 |
| 182 | | 545 | 2.52 | 0.06 | 19 |
| 183 | 95 parts compound of example 182<br>5 parts compound of example 172 | 543 | 2.46 | 0.07 | 15 |
| 184 | 95 parts compound of example 182<br>5 parts compound of example 169 | 543 | 2.51 | 0.08 | 16 |

-continued

| Example | Structure | λ_max [nm] | $n_{658}$ | $k_{658}$ | $-D_{24}$ [%] |
|---|---|---|---|---|---|
| 185 | | 557 | 2.64 | 0.08 | 20 |
| 186 | | 550 | 2.41 | 0.04 | 13 |
| 187 | | 550 | 2.40 | 0.05 | 11 |

-continued

| Example | Structure | $\lambda_{max}$ [nm] | $n_{658}$ | $k_{658}$ | $-D_{24}$ [%] |
|---|---|---|---|---|---|
| 188 | | 590 | 2.47 | 0.03 | 15 |
| 189 | | 544 | 2.44 | 0.05 | 9 |
| 190 | | 554 | 2.44 | 0.08 | 13 |

-continued

| Example | Structure | $\lambda_{max}$ [nm] | $n_{658}$ | $k_{658}$ | $-D_{24}$ [%] |
|---|---|---|---|---|---|
| 191 | | 578 | 2.42 | 0.04 | 12 |
| 192 | | 547 | 2.43 | 0.06 | 8 |
| 193 | | 557 | 2.58 | 0.08 | 15 |

-continued

| Example | Structure | $\lambda_{max}$ [nm] | $n_{658}$ | $k_{658}$ | $-D_{24}$ [%] |
|---|---|---|---|---|---|
| 194 | | 580 | 2.27 | 0.05 | 6 |
| 195 | | 575 | 2.24 | 0.04 | 4 |
| 196 | | 588 | 2.26 | 0.02 | 15 |

-continued

| Example | Structure | $\lambda_{max}$ [nm] | $n_{658}$ | $k_{658}$ | $-D_{24}$ [%] |
|---|---|---|---|---|---|
| 197 | | 596 | 2.31 | 0.04 | 18 |
| 198 | | 532 | 2.21 | 0.05 | 6 |
| 199 | | 556 | 2.49 | 0.12 | 14 |

-continued

| Example | Structure | $\lambda_{max}$ [nm] | $n_{658}$ | $k_{658}$ | $-D_{24}$ [%] |
|---|---|---|---|---|---|
| 200 | | 585 | 2.47 | 0.05 | 10 |
| 201 | | 554 | 2.57 | 0.10 | 15 |
| 202 | | 550 | 2.50 | 0.07 | 7 |

-continued

| Example | Structure | $\lambda_{max}$ [nm] | $n_{658}$ | $k_{658}$ | $-D_{24}$ [%] |
|---|---|---|---|---|---|
| 203 | | 589 | 2.37 | 0.04 | 18 |
| 204 | | 545 | 2.42 | 0.06 | 11 |
| 205 | | 552 | 2.49 | 0.07 | 16 |

-continued

| Example | Structure | $\lambda_{max}$ [nm] | $n_{658}$ | $k_{658}$ | $-D_{24}$ [%] |
|---|---|---|---|---|---|
| 206 | | 559 | 2.66 | 0.11 | 17 |
| 207 | | 557 | 2.51 | 0.09 | 14 |
| 208 | | 538 | 2.45 | 0.06 | 20 |

-continued

| Example | Structure | $\lambda_{max}$ [nm] | $n_{658}$ | $k_{658}$ | $-D_{24}$ [%] |
|---|---|---|---|---|---|
| 209 | | 590 | 2.38 | 0.04 | 15 |
| 210 | | 592 | 2.34 | 0.05 | 15 |
| 211 | | 545 | 2.34 | 0.02 | 13 |

-continued

| Example | Structure | λ$_{max}$ [nm] | n$_{658}$ | k$_{658}$ | −D$_{24}$ [%] |
|---|---|---|---|---|---|
| 212 | | 536 | 2.45 | 0.05 | 20 |
| 213 | | 532 | 2.38 | 0.04 | 14 |

-continued

| Example | Structure | $\lambda_{max}$ [nm] | $n_{658}$ | $k_{658}$ | $-D_{24}$ [%] |
|---|---|---|---|---|---|
| 214 | | 529 | 2.39 | 0.05 | 22 |
| 215 | | 555 | 2.29 | 0.07 | 20 |

-continued

| Example | Structure | $\lambda_{max}$ [nm] | $n_{658}$ | $k_{658}$ | $-D_{24}$ [%] |
|---|---|---|---|---|---|
| 216 | | 579 | 2.36 | 0.13 | 8 |
| 217 | | 531 | 2.36 | 0.03 | 15 |

-continued

| Example | Structure | $\lambda_{max}$ [nm] | $n_{658}$ | $k_{658}$ | $-D_{24}$ [%] |
|---|---|---|---|---|---|
| 218 | | 531 | 2.30 | 0.06 | 13 |
| 219 | | 533 | 2.40 | 0.04 | 20 |

-continued

| Example | Structure | $\lambda_{max}$ [nm] | $n_{658}$ | $k_{658}$ | $-D_{24}$ [%] |
|---|---|---|---|---|---|
| 220 | | 547 | 2.43 | 0.04 | 20 |
| 221 | | 541 | 2.40 | 0.07 | 11 |

-continued

| Example | Structure | $\lambda_{max}$ [nm] | $n_{658}$ | $k_{658}$ | $-D_{24}$ [%] |
|---|---|---|---|---|---|
| 222 | | 549 | 2.46 | 0.06 | 11 |
| 223 | | 541 | 2.38 | 0.04 | 20 |
| 224 | | 550 | 2.46 | 0.03 | 18 |

-continued
| Example | Structure | $\lambda_{max}$ [nm] | $n_{658}$ | $k_{658}$ | $-D_{24}$ [%] |
|---|---|---|---|---|---|
| 225 | 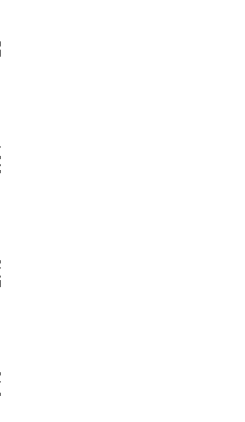 | 548 | 2.45 | 0.04 | 21 |
| 226 | 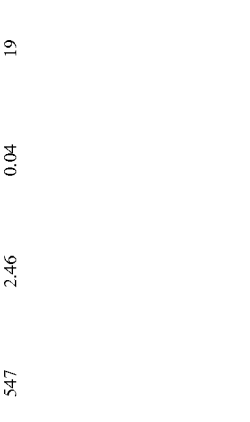 | 547 | 2.46 | 0.04 | 19 |
| 227 |  | 543 | 2.40 | 0.05 | 18 |

-continued

| Example | Structure | $\lambda_{max}$ [nm] | $n_{658}$ | $k_{658}$ | $-D_{24}$ [%] |
|---|---|---|---|---|---|
| 228 | | 551 | 2.46 | 0.05 | 16 |
| 229 | | 549 | 2.51 | 0.05 | 17 |
| 230 | | 542 | 2.45 | 0.05 | 24 |

| Example | Structure | $\lambda_{max}$ [nm] | $n_{658}$ | $k_{658}$ | $-D_{24}$ [%] |
|---|---|---|---|---|---|
| 231 | 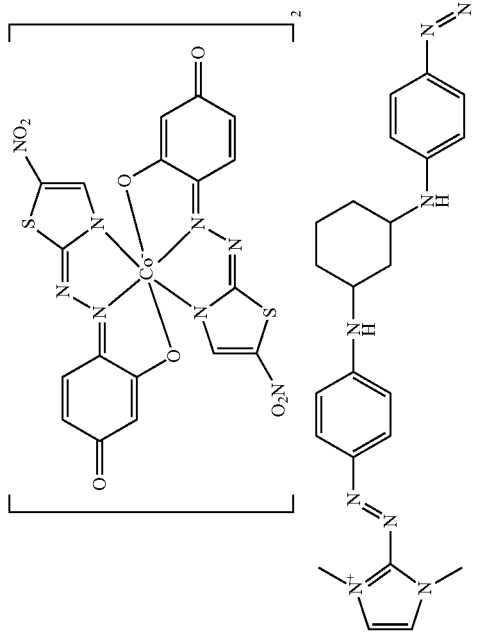 | 531 | 2.37 | 0.05 | 12 |
| 232 | 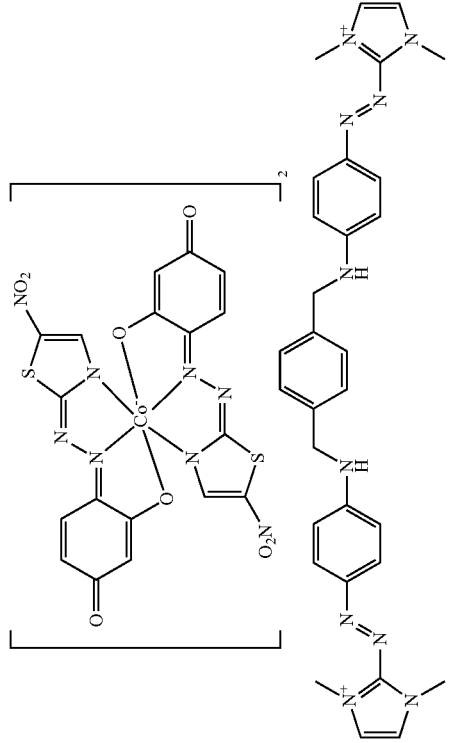 | 531 | 2.34 | 0.04 | 20 |

-continued

| Example | Structure | $\lambda_{max}$ [nm] | $n_{658}$ | $k_{658}$ | $-D_{24}$ [%] |
|---|---|---|---|---|---|
| 233 | | 543 | 2.41 | 0.05 | 39 |
| 234 | | 542 | 2.37 | 0.04 | 16 |

-continued

| Example | Structure | $\lambda_{max}$ [nm] | $n_{658}$ | $k_{658}$ | $-D_{24}$ [%] |
|---|---|---|---|---|---|
| 235 | | 587 | 2.42 | 0.03 | 14 |
| 236 | | 550 | 2.43 | 0.04 | 15 |
| 237 | | 548 | 2.43 | 0.04 | 15 |

-continued

| Example | Structure | $\lambda_{max}$ [nm] | $n_{658}$ | $k_{658}$ | $-D_{24}$ [%] |
|---|---|---|---|---|---|
| 238 | | 554 | 2.56 | 0.08 | 30 |
| 239 | | 553 | 2.44 | 0.05 | 16 |

-continued

| Example | Structure | $\lambda_{max}$ [nm] | $n_{658}$ | $k_{658}$ | $-D_{24}$ [%] |
|---|---|---|---|---|---|
| 240 | | 546 | 2.36 | 0.04 | 18 |
| 241 | | 546 | 2.31 | 0.06 | 20 |
| 242 | | 550 | 2.45 | 0.04 | 15 |

-continued

| Example | Structure | $\lambda_{max}$ [nm] | $n_{658}$ | $k_{658}$ | $-D_{24}$ [%] |
|---|---|---|---|---|---|
| 243 | | 546 | 2.39 | 0.04 | 14 |
| 244 | | 587 | 2.54 | 0.05 | 14 |
| 245 | | 544 | 2.40 | 0.03 | 16 |

-continued

| Example | Structure | λ_max [nm] | n_658 | k_658 | -D_24 [%] |
|---|---|---|---|---|---|
| 246 | | 545 | 2.38 | 0.03 | 18 |
| 247 | | 549 | 2.44 | 0.03 | 17 |
| 248 | | 549 | 2.42 | 0.03 | 17 |

| Example | Structure | | $\lambda_{max}$ [nm] | $n_{658}$ | $k_{658}$ | $-D_{24}$ [%] |
|---|---|---|---|---|---|---|
| 249 | | | 545 | 2.37 | 0.03 | 17 |
| 250 | | | 547 | 2.35 | 0.03 | 17 |
| 251 | | | 554 | 2.36 | 0.04 | 10 |

-continued

| Example | Structure | λ$_{max}$ [nm] | n$_{658}$ | k$_{658}$ | −D$_{24}$ [%] |
|---|---|---|---|---|---|
| 252 | | 548 | 2.42 | 0.05 | 14 |
| 253 | | 561 | 2.33 | 0.03 | 17 |
| 254 | | 555 | 2.32 | 0.03 | 15 |

-continued

| Example | Structure | $\lambda_{max}$ [nm] | $n_{658}$ | $k_{658}$ | $-D_{24}$ [%] |
|---|---|---|---|---|---|
| 255 | | 547 | 2.27 | 0.03 | 16 |
| 256 | | 557 | 2.15 | 0.02 | 17 |
| 257 | | 563 | 2.14 | 0.03 | 14 |

-continued

| Example | Structure | λ$_{max}$ [nm] | n$_{658}$ | k$_{658}$ | -D$_{24}$ [%] |
|---|---|---|---|---|---|
| 258 | | 549 | 2.43 | 0.04 | 16 |
| 259 | | 549 | 2.45 | 0.05 | 20 |
| 260 | | 520 | 2.01 | 0.03 | 33 |

-continued

| Example | Structure | $\lambda_{max}$ [nm] | $n_{658}$ | $k_{658}$ | $-D_{24}$ [%] |
|---|---|---|---|---|---|
| 261 | | 551 | 2.48 | 0.04 | 17 |
| 262 | | 552 | 2.50 | 0.05 | 23 |
| 263 | | 554 | 2.50 | 0.05 | 22 |

-continued

| Example | Structure | λ_max [nm] | n_658 | k_658 | -D_24 [%] |
|---|---|---|---|---|---|
| 264 | | 555 | 2.53 | 0.05 | 22 |
| 265 | | 545 | 2.45 | 0.03 | 19 |
| 266 | | 548 | 2.46 | 0.03 | 21 |

-continued
| Example | Structure | $\lambda_{max}$ [nm] | $n_{658}$ | $k_{658}$ | $-D_{24}$ [%] |
|---|---|---|---|---|---|
| 267 | 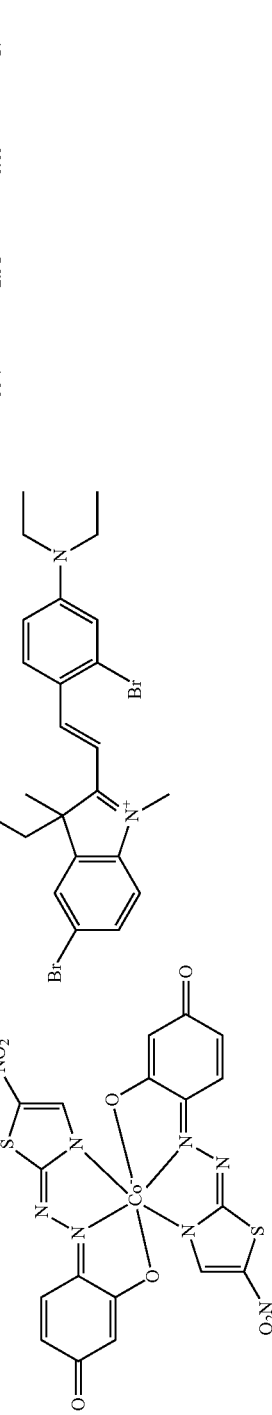 | 554 | 2.51 | 0.05 | 17 |
| 268 | 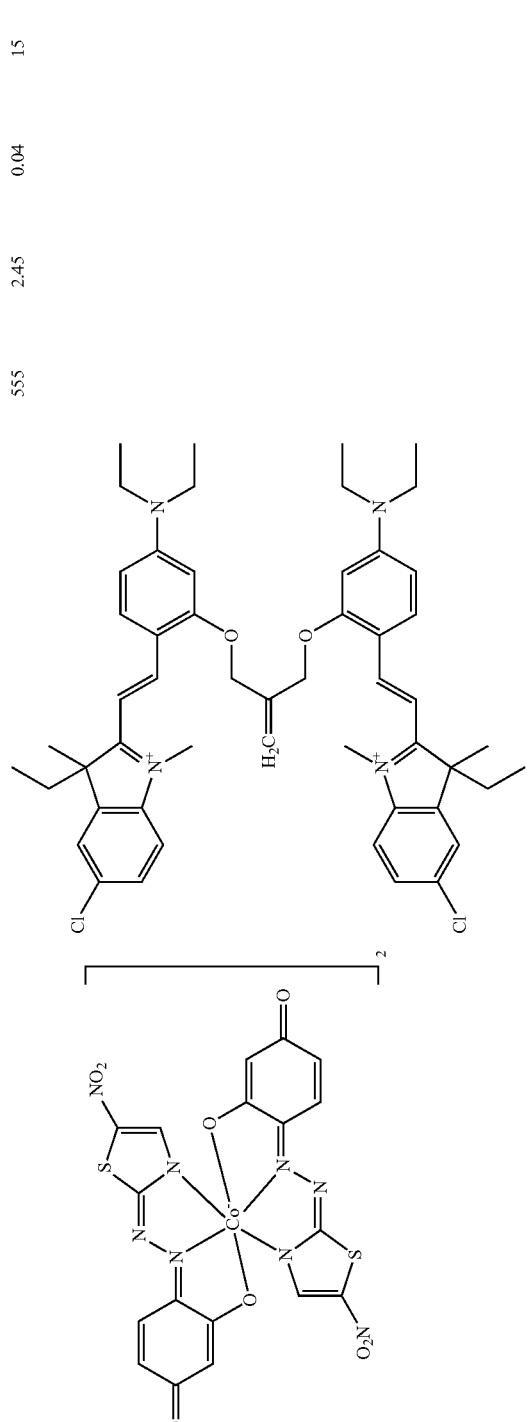 | 555 | 2.45 | 0.04 | 15 |

-continued

| Example | Structure | λ_max [nm] | $n_{658}$ | $k_{658}$ | $-D_{24}$ [%] |
|---|---|---|---|---|---|
| 269 | | 548 | 2.42 | 0.04 | 19 |
| 270 | | 552 | 2.44 | 0.03 | 20 |
| 271 | | 554 | 2.48 | 0.04 | 19 |

-continued

| Example | Structure | $\lambda_{max}$ [nm] | $n_{658}$ | $k_{658}$ | $-D_{24}$ [%] |
|---|---|---|---|---|---|
| 272 | | 554 | 2.55 | 0.05 | 18 |
| 273 | | 550 | 2.40 | 0.05 | 18 |

-continued

| Example | Structure | $\lambda_{max}$ [nm] | $n_{658}$ | $k_{658}$ | $-D_{24}$ [%] |
|---|---|---|---|---|---|
| 274 | | 550 | 2.41 | 0.06 | 16 |
| 275 | | 552 | 2.44 | 0.05 | 16 |

-continued
| Example | Structure | $\lambda_{max}$ [nm] | $n_{658}$ | $k_{658}$ | $-D_{24}$ [%] |
|---|---|---|---|---|---|
| 276 | 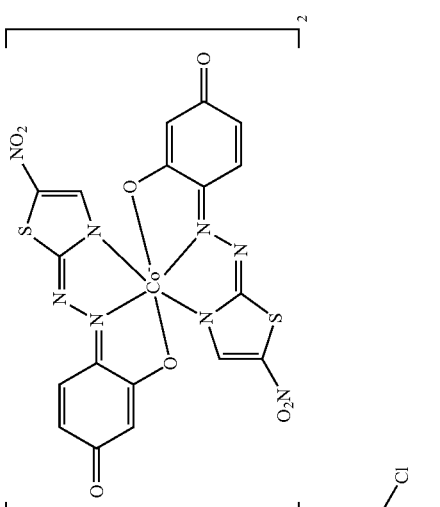 | 544 | 2.35 | 0.04 | 20 |
| 277 | 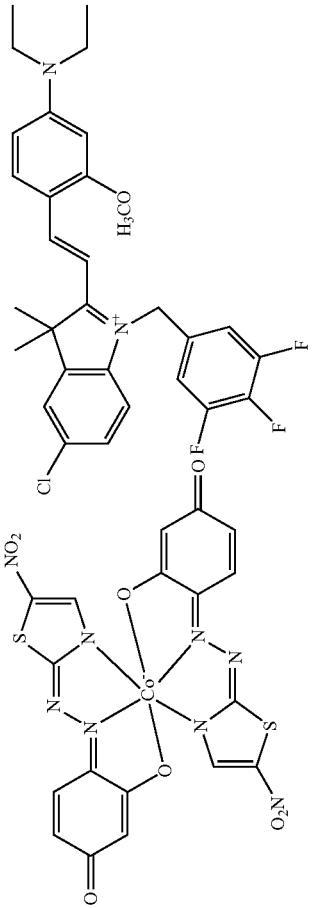 | 553 | 2.44 | 0.05 | 15 |

-continued

| Example | Structure | $\lambda_{max}$ [nm] | $n_{658}$ | $k_{658}$ | $-D_{24}$ [%] |
|---|---|---|---|---|---|
| 278 | | 540 | 2.30 | 0.05 | 21 |
| 279 | | 550 | 2.25 | 0.03 | 13 |
| 280 | | 548 | 2.46 | 0.05 | 10 |

| Example | Structure | $\lambda_{max}$ [nm] | $n_{658}$ | $k_{658}$ | $-D_{24}$ [%] |
|---|---|---|---|---|---|
| 281 | 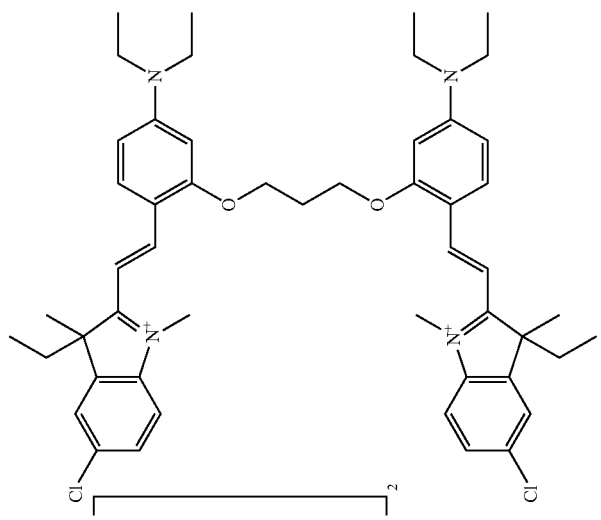 | 552 | 2.39 | 0.04 | 14 |
| 282 | 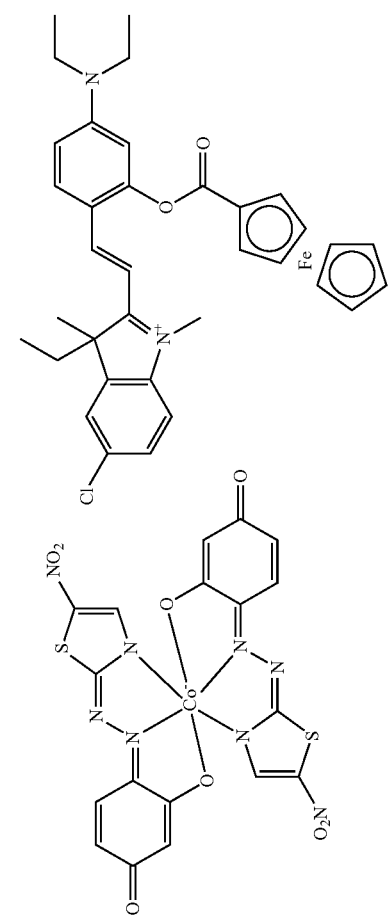 | 550 | 2.39 | 0.05 | 25 |

| Example | Structure | $\lambda_{max}$ [nm] | $n_{658}$ | $k_{658}$ | $-D_{24}$ [%] |
|---|---|---|---|---|---|
| 283 | 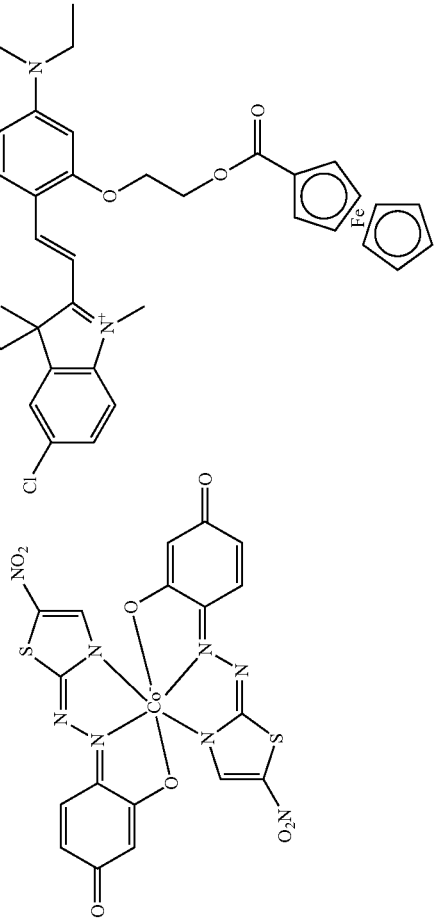 | 550 | 2.33 | 0.04 | 17 |
| 284 | 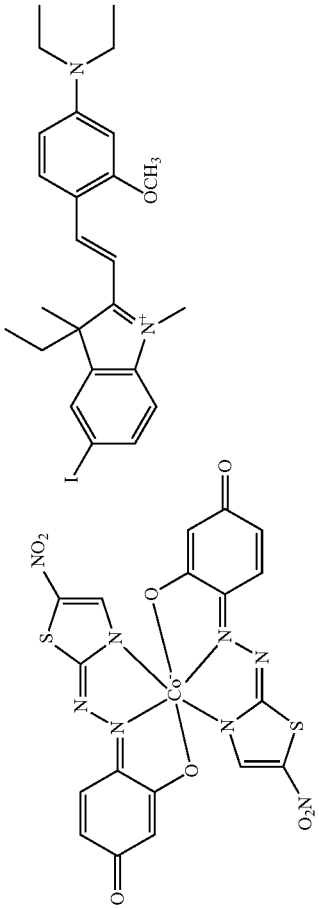 | 596 | 2.42 | 0.04 | 10 |

-continued

| Example | Structure | $\lambda_{max}$ [nm] | $n_{658}$ | $k_{658}$ | $-D_{24}$ [%] |
|---|---|---|---|---|---|
| 285 | | 562 | 2.53 | 0.07 | 14 |
| 286 | | 568 | 2.44 | 0.04 | 10 |
| 287 | | 558 | 2.40 | 0.06 | 13 |

-continued

| Example | Structure | $\lambda_{max}$ [nm] | $n_{658}$ | $k_{658}$ | $-D_{24}$ [%] |
|---|---|---|---|---|---|
| 288 | 1 part compound of example 54 + 1 part compound of example 88 | 580 | 2.47 | 0.08 | 17 |
| 289 | 1 part compound of example 88 + 1 part compound of example 151 | 550 | 2.40 | 0.05 | 16 |
| 290 | | 546 | 2.37 | 0.04 | 21 |
| 291 | 1 part compound of example 88 + 1 part compound of example 278 | 535 | 2.37 | 0.12 | 15 |
| 292 | | 587 | 2.48 | 0.13 | 17 |
| 293 | | 551 | 2.65 | 0.09 | 14 |

EXAMPLE 294

1.48 g of the compound according to example 13 are dissolved in 100 ml of 2,2,3,3-tetrafluoropropanol and filtered through a Teflon™ filter having a pore size of 0.2 µm. The dye solution is then applied at 250 rev/min to the surface of a 0.6 mm thick, grooved polycarbonate disc (groove depth 164 nm, groove width 380 nm, track pitch 0.74 mm) having a diameter of 120 mm. The excess of solution is spun off by increasing the speed of rotation. When the solvent is evaporated off, the dye remains behind in the form of a uniform, amorphous solid layer. Drying is carried out in a circulating-air oven at 70° C. for 20 minutes. In a vacuum-coating apparatus (Twister™, Balzers Unaxis) a 120 nm thick silver layer is then applied to the recording layer by sputter coating. An adhesive layer of a UV-curable photo-polymer (LMD2277™, Vantico/Huntsman) is then applied thereto by spin-coating, and a second polycarbonate disc (0.6 mm thick, 120 mm diameter) is adhesively bonded thereto. The final disk has a reflectivity of 45% at 658 nm. On a commercial test apparatus (DDU-1000™, Pulstec Japan), using a laser diode of wavelength 658 nm, marks are written into the active layer at speeds of ~3.5 m·s$^{-1}$ (3.49=1×) and 28 m·s$^{-1}$ (8×). Then, on a commercial test apparatus (DVD Pro, Audio Dev), the following dynamic parameters are determined: data-to-clock (DTC) jitter, R14H, I14/I14H, asymmetry. After routine optimisation of the writing strategy, especially low values for DTC jitter are obtained.

| Writing speed [m·s$^{-1}$] | R14H [%] | I14/I14H | DTC Jitter [%] | Asymmetry [%] |
|---|---|---|---|---|
| 3.5 (1×) | 45 | 0.61 | 8.7 | 10 |
| 28 (8×) | 45 | 0.71 | 9.4 | 0 |

The performance is excellent at both low (1×) and high (8×) recording speeds.

EXAMPLES 295-533

It is proceeded analogously to example 294, with the difference that the compound according to example 13 is replaced by the compounds of examples 55-293. The performance of each recording medium is tested at 1× (3.5 m·s$^{-1}$), 2× (7 m·s$^{-1}$), 4× (14 m·s$^{-1}$), 8× (28 m·s$^{-1}$) and 16× (56 m·s$^{-1}$) recording and playback speeds.

EXAMPLE 534

1.48 g of the compound according to example 88 are dissolved in 100 ml of 2,2,3,3-tetrafluoropropanol and filtered through a Teflon™ filter having a pore size of 0.2 µm. The dye solution is then applied at 500 rev/min to the surface of a 0.6 mm thick, grooved polycarbonate disc (groove depth 165 nm, groove width 370 nm, track pitch 0.74 mm) having a diameter of 120 mm. The excess of solution is spun off by increasing the speed of rotation up to 3500 rev/min. When the solvent is evaporated off, the dye remains behind in the form of a uniform, amorphous solid layer. Drying is carried out in a circulating-air oven at 70° C. for 20 minutes. In a vacuum-coating apparatus (Twister™, Balzers Unaxis) a 120 nm thick silver layer is then applied to the recording layer by sputter coating. An adhesive layer of a UV-curable photopolymer (LMD2277™, Vantico/Huntsman) is then applied thereto by spin-coating, and a second polycarbonate disc (0.6 mm thick, 120 mm diameter) is adhesively bonded thereto. The final disk has a reflectivity of 48% at 658 nm and 25 mm radius. On a commercial test apparatus (ODU-1000™, Pulstec Japan), using a laser diode of wavelength 658 nm and numerical aperture 0.65, marks are written into the active layer at speeds of 8.38 m·s$^{-1}$ (2.4×), 27.92 m·s$^{-1}$ (8×) and 55.84 m·s$^{-1}$ (16×). Then, the following dynamic parameters are determined on the same drive: data-to-clock (DTC) jitter, R14H, I14/I14H, laser power. After routine optimisation of the writing strategy, especially low values for DTC jitter are obtained.

| Writing speed [m·s$^{-1}$] | R14H [%] | I14/I14H | DTC Jitter [%] | Laser power [mW] |
|---|---|---|---|---|
| 8.38 (2.4×) | 48 | 0.60 | 7.6 | 11.0 |
| 55.84 (16×) | 52 | 0.74 | 7.9 | 48.0 |

The performance is excellent from low (2.4×) to high (16×) recording speeds.

The instant optical recording media according to examples 294-534 are compatible with both DVD+R and DVD-R formats. Excellent results, especially at high recording speeds, are obtained in particular with a groove depth of from 150 to 190 nm and a groove width of from 0.35 to 0.40 µm, preferably with a groove depth of from 160 to 180 nm and a groove width of from 0.36 to 0.39 µm, most preferred with a groove depth of from 165 to 172 nm and a groove width of from 0.37 to 0.38 µm; preferably in combination with a groove side wall angle of from 60 to 85°, more preferably from 65 to 80°, most preferred from 70 to 75°.

EXAMPLES 535-540

It is proceeded analogously to example 534, with the difference that the compound according to example 88 is replaced by the compounds of examples 68, 168, 188, 208, 268 or 280. The performance of each recording medium is tested at 2.4× (8.38 m·s$^{-1}$) and 16× (56 m·s$^{-1}$) recording speed. The same testing procedure as described in example 534 is followed except that the recording at 16× speed are made on a commercial DVD+/–R drive (BenQ 1620) and tested on another reference test equipment (DVD Pro, Audio Dev AB), showing a good performance from low (2.4×) to high (16×) recording speeds with sensitivities (laser power) appropriate for high speed recording:

| Example | Compound according to example: | Reflectivity [%] | 2.4× Modulation I14/I14H | 16× DC-Jitter [%] | 16× Optimum Laser power [mW] |
|---|---|---|---|---|---|
| 535 | 68 | 44.5% | 0.68 | 9.3% | 48 |
| 536 | 168 | 51.5% | 0.69 | 9% | 49 |
| 537 | 188 | 54% | 0.59 | 10% | 45 |
| 538 | 208 | 47% | 0.65 | 9% | 52 |
| 539 | 268 | 47% | 0.51 | 9% | 44 |
| 540 | 280 | 47% | 0.67 | 10.1% | 49 |

COMPARATIVE EXAMPLE

The $\lambda_{max}$ (solid film), n- and k-values and the photostability of recording layers are determined as in examples 55-293, however using a layer consisting of the compound closely similar to that of example 8 of EP-A-1 170 339, but with the difference that both imidazoles are deprotonated and cobalt is in the higher oxidation state (+3) and hexacoordinated:

| Example | Structure | $\lambda_{max}$ [nm] | $n_{658}$ | $k_{658}$ | $-D_{24}$ [%] |
|---|---|---|---|---|---|
| 541 | 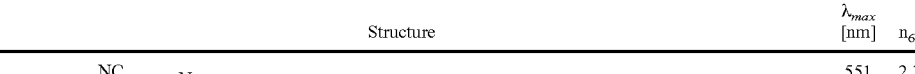 | 551 | 2.35 | 0.07 | 7 |

The same procedure as described in example 534 is then followed, except that the above comparative compound according to example 541 is compared with the instant compound according to example 88 on the same apparatus (ODU-1000, Pulstec Co, Japan) at 2.4× (8.38 m·s$^{-1}$) and 12× (42 m·s$^{-1}$) recording speed. The performance of both recording media is as follows:

| Compound according to example: | 2.4× Optimum laser power [mW] | 2.4× DC-Jitter [%] | 12× DC-Jitter [%] | 12× I14/I14H Modulation |
|---|---|---|---|---|
| 88 (instant) | 15.75 | 6.4% | 8.5% | 0.71 |
| 541 (comparative) | 17 | 9% | 13% | 0.49 |

The compound closely similar to that of example 8 of EP-A-1 170 339 shows a much worse mark formation (higher jitter) from low (2.4×) to high (16×) recording speeds. Moreover, this compound is significantly less sensitive and clearly fails at high recording speed (too high jitter, much too low modulation).

The examples show clearly that the identity of the instant groups R$_2$ and their capability of forming a quinoid structure are essential for obtaining satisfactory sensitivity and recording properties, especially at high recording speeds.

The invention claimed is:

1. An optical recording medium comprising a substrate, a reflecting layer and a recording layer, wherein the recording layer comprises a compound of formula

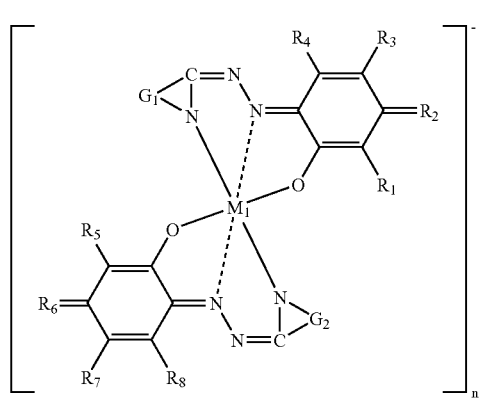

(I)

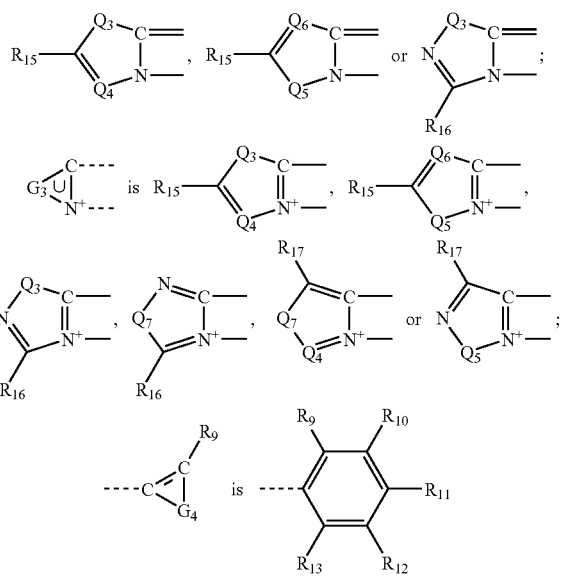

or a mesomeric or tautomeric form thereof, wherein
M$_1$ is a metal cation in the oxidation state +3, a hydroxy or halogeno metal group wherein the metal is in the oxidation state +4, or an oxo metal group wherein the metal is in the oxidation state +5;

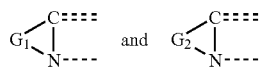

are each independently of the other or C$_2$-C$_8$heteroaryl unsubstituted or mono- or poly-substituted by R$_{10}$, R$_{11}$, R$_{12}$ and/or R$_{13}$;
Q$_1$ is N or CR$_{18}$, Q$_2$ is N or CR$_{19}$, Q$_3$, Q$_5$ and Q$_7$ are each independently of the other CR$_{20}$R$_{21}$, O, S or NR$_{22}$, Q$_4$ is CR$_{16}$ or N and Q$_6$ is CR$_{17}$ or N;
R$_1$, R$_3$, R$_4$, R$_5$, R$_7$, R$_8$, R$_9$, R$_{10}$, R$_{11}$, R$_{12}$, R$_{13}$, R$_{15}$, R$_{16}$, R$_{17}$, R$_{18}$ and R$_{19}$ are each independently of all others H, halogen, OR$_{23}$, SR$_{23}$, NR$_{22}$R$_{24}$, NR$_{22}$COR$_{25}$, NR$_{22}$COOR$_{26}$, NR$_{22}$CONR$_{26}$R$_{27}$, NR$_{22}$CN, OSiR$_{22}$R$_{25}$R$_{28}$, COR$_{22}$, CR$_{22}$OR$_{25}$OR$_{28}$, NO$_2$, CN, COOR$_{23}$, CONR$_{26}$R$_{27}$, SO$_2$R$_{22}$, SO$_2$NR$_{26}$R$_{27}$, SO$_3$R$_{26}$, PO(OR$_{22}$)(OR$_{25}$); C$_1$-C$_6$alkyl, C$_2$-C$_6$alkenyl, C$_2$-C$_6$alkynyl, C$_3$-C$_6$cycloalkyl, C$_3$-C$_6$cycloalkenyl or C$_2$-C$_5$heterocycloalkyl each unsubstituted or mono- or poly-substituted by halogen, OR$_{23}$, SR$_{23}$, NR$_{22}$R$_{24}$, NR$_{22}$COR$_{25}$, NR$_{22}$COOR$_{23}$, NR$_{22}$CONR$_{26}$R$_{27}$, NR$_{22}$CN, COR$_{22}$, CR$_{22}$OR$_{25}$OR$_{28}$, NO$_2$, CN, COOR$_{23}$, CONR$_{26}$R$_{27}$ and/or SO$_2$R$_{26}$; or C$_7$-C$_{11}$aralkyl, C$_6$-C$_{10}$aryl or C$_1$-C$_8$heteroaryl each unsubstituted or mono- or poly-substituted by C$_1$-C$_4$alkyl, halogen, OR$_{23}$, SR$_{23}$, NR$_{22}$R$_{24}$, COR$_{22}$, NO$_2$, CN and/or COOC$_1$-C$_4$alkyl; or R$_{15}$ and R$_{16}$ or R$_{15}$ and R$_{17}$ are together in pairs

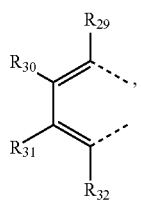

thus forming a phenyl ring together with the two adjacent carbons to which they are bound;

R$_2$ is O, S or NR$_{33}$;

R$_6$ is O, S or NR$_{33}$;

R$_{14}$ is C$_1$-C$_{12}$alkyl, C$_3$-C$_{12}$cycloalkyl, C$_1$-C$_{12}$heterocycloalkyl, C$_2$-C$_{12}$alkenyl, C$_3$-C$_{12}$cycloalkenyl, C$_4$-C$_{12}$heterocycloalkenyl, C$_7$-C$_{12}$aralkyl, C$_1$-C$_9$heteroaryl, C$_2$-C$_{11}$heteroaralkyl, C$_6$-C$_{12}$aryl or C$_1$-C$_{12}$alkyl interrupted by from one to five non-successive oxygen and/or sulfur atoms and/or by from one to five identical or different groups NR$_{22}$, each unsubstituted or mono- or poly-substituted by halogen, OR$_{23}$, SR$_{23}$, NR$_{22}$R$_{24}$, NR$_{22}$COR$_{25}$, NR$_{22}$COOR$_{26}$, NR$_{22}$CONR$_{26}$R$_{27}$, NR$_{22}$CN, OSiR$_{22}$R$_{25}$R$_{28}$, COR$_{22}$, CR$_{22}$OR$_{25}$OR$_{28}$, NO$_2$, CN, COOR$_{23}$, CONR$_{26}$R$_{27}$, SO$_2$R$_{22}$, SO$_2$NR$_{26}$R$_{27}$, SO$_3$R$_{26}$ or PO(OR$_{22}$)(OR$_{25}$);

R$_{20}$ and R$_{21}$ are each independently of the other C$_1$-C$_{12}$alkyl, C$_2$-C$_{12}$alkenyl, C$_2$-C$_{12}$alkynyl, C$_7$-C$_{12}$aralkyl, C$_3$-C$_{12}$cycloalkyl, C$_3$-C$_{12}$cycloalkenyl or C$_2$-C$_{11}$heterocycloalkyl each unsubstituted or mono- or poly-substituted by halogen, OR$_{23}$, SR$_{23}$, NR$_{22}$R$_{24}$, NR$_{22}$COR$_{25}$, NR$_{22}$COOR$_{23}$, NR$_{22}$CONR$_{26}$R$_{27}$, NR$_{22}$CN, COR$_{22}$, CR$_{22}$OR$_{25}$OR$_{28}$, NO$_2$, CN, COOR$_{23}$, CONR$_{26}$R$_{27}$ and/or SO$_2$R$_{26}$; or R$_{20}$ and R$_{21}$ are together C$_2$-C$_{12}$alkylene, C$_2$-C$_{12}$alkenylene, C$_2$-C$_{12}$cycloalkylene or C$_2$-C$_{12}$cycloalkenylene, one to five non-successive carbon atoms of which can be replaced by oxygen and/or sulfur atoms and/or by identical or different groups NR$_{22}$, C$_2$-C$_{12}$alkylene, C$_2$-C$_{12}$alkenylene, C$_2$-C$_{12}$cycloalkylene or C$_2$-C$_{12}$cycloalkenylene being each unsubstituted or mono- or poly-substituted by halogen, OR$_{23}$, SR$_{23}$, NR$_{22}$R$_{24}$, NR$_{22}$COR$_{25}$, NR$_{22}$COOR$_{23}$, NR$_{22}$CONR$_{26}$R$_{27}$, NR$_{22}$CN, COR$_{22}$, CR$_{22}$OR$_{25}$OR$_{28}$, NO$_2$, CN, COOR$_{23}$, CONR$_{26}$R$_{27}$ and/ or SO$_2$R$_{26}$;

R$_{22}$, R$_{25}$ and R$_{28}$ are each independently of the others hydrogen; C$_1$-C$_4$alkyl, C$_2$-C$_4$alkenyl, C$_2$-C$_4$alkynyl, [C$_2$-C$_3$alkylene-O—]$_k$—R$_{34}$ or [C$_2$-C$_3$alkylene-NR$_{35}$—]$_k$—R$_{34}$ each unsubstituted or mono- or poly-substituted by halogen; or benzyl;

each R$_{23}$, independently of any other R$_{23}$, is R$_{24}$ or COR$_{24}$, CONR$_{24}$R$_{24}$, CN, SO$_2$NR$_{24}$R$_{24}$ or SO$_2$R$_{24}$;

each R$_{24}$ independently of the other R$_{24}$ is H; C$_1$-C$_6$alkyl, C$_2$-C$_6$alkenyl, C$_2$-C$_6$alkynyl, C$_3$-C$_6$cycloalkyl, C$_3$-C$_6$cycloalkenyl or C$_2$-C$_5$heterocycloalkyl each unsubstituted or mono- or poly-substituted by halogen, OR$_{28}$, SR$_{28}$, NR$_{22}$R$_{28}$, CN and/or COOR$_{22}$; or C$_6$-C$_{10}$aryl, C$_7$-C$_{11}$aralkyl or C$_1$-C$_8$heteroaryl each unsubstituted or mono- or poly-substituted by C$_1$-C$_4$alkyl, halogen, OR$_{28}$, SR$_{28}$, NR$_{22}$R$_{25}$, COR$_{22}$, CR$_{22}$OR$_{25}$OR$_{28}$, NO$_2$, CN and/or COOR$_{28}$;

R$_{26}$ and R$_{27}$ are each independently of the others H; C$_1$-C$_6$-alkyl, C$_2$-C$_6$-alkenyl, C$_2$-C$_6$-alkynyl, C$_3$-C$_6$cycloalkyl, C$_3$-C$_6$cycloalkenyl or C$_2$-C$_5$heterocycloalkyl each unsubstituted or mono- or poly-substituted by halogen, OR$_{23}$, SR$_{23}$, NR$_{22}$R$_{28}$, CN and/or COOR$_{22}$; C$_6$-C$_{10}$aryl, C$_7$-C$_{11}$aralkyl or C$_1$-C$_8$heteroaryl each unsubstituted or mono- or poly-substituted by C$_1$-C$_4$alkyl, halogen, OR$_{23}$, SR$_{23}$, NR$_{22}$R$_{25}$, COR$_{22}$, CR$_{22}$OR$_{25}$OR$_{28}$, NO$_2$, CN or COOR$_{28}$;

or NR$_{22}$R$_{24}$, NR$_{22}$R$_{25}$, NR$_{25}$R$_{28}$ or NR$_{26}$R$_{27}$ is a five- or six-membered heterocycle which may contain a further N or O atom and which can be mono- or poly-substituted by methyl or ethyl;

R$_{29}$, R$_{30}$, R$_{31}$ and R$_{32}$ are each independently of the other H, C$_1$-C$_4$alkyl, halogen, OR$_{23}$, SR$_{23}$, NR$_{22}$R$_{24}$, COR$_{22}$, NO$_2$, CN or COOC$_1$-C$_4$alkyl;

R$_{33}$ is COR$_{24}$, CONR$_{26}$R$_{27}$, CN, SO$_2$NR$_{26}$R$_{27}$ or SO$_2$R$_{26}$;

R$_{34}$ and R$_{35}$ are each independently of the other methyl, ethyl, vinyl or allyl;

it being possible once or more times for radicals of the same or different substituents each selected from the group consisting of R$_1$, R$_3$, R$_4$, R$_5$, R$_7$, R$_8$, R$_9$, R$_{10}$, R$_{11}$, R$_{12}$, R$_{13}$, R$_{14}$, R$_{15}$, R$_{16}$, R$_{17}$, R$_{18}$, R$_{19}$, R$_{20}$, R$_{22}$, R$_{23}$, R$_{24}$, R$_{25}$, R$_{26}$, R$_{28}$, R$_{29}$, R$_{30}$, R$_{31}$, R$_{32}$, R$_{34}$ and R$_{36}$ to be bonded to one another in pairs by way of a direct bond or an —O—, —S— or —N(R$_{35}$)— bridge, optionally forming a dimer, trimer or oligomer comprising two or more identical or different moieties of formula (I);

k is an integer 1, 2, 3 or 4; and n is an integer 1, 2 or 3.

2. An optical recording medium according to claim 1, wherein Q$_3$ is S in

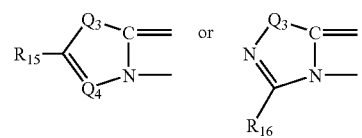

standing for

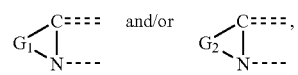

and/or Q$_3$ is CR$_{20}$R$_{21}$, in

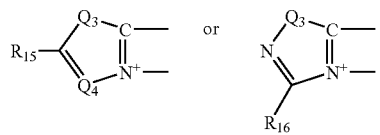

standing for

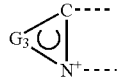

3. An optical recording medium according to claim 1, wherein $R_2$ and $R_6$ are selected from the group consisting of O, S, N—CN or N—$SO_2CF_3$.

4. An optical recording medium according to claim 1, wherein $R_3$ and/or $R_7$ are H, halogen, $CF_3$, $NO_2$, CN, $COR_{22}$, $COOR_{23}$, $SO_3R_{26}$.

5. An optical recording medium according to claim 1, wherein in the heterocycle comprising $G_1$ or $G_2$, at least one of $R_{15}$ and $R_{17}$, is $CF_3$, $NO_2$, CN, $COR_{22}$, $COOR_{23}$, $CR_{22}OR_{25}OR_{28}$, $CONR_{26}R_{27}$, $SO_2R_{22}$, $SO_3R_{26}$, $SO_2NR_{26}R_{27}$ or $PO(OR_{22})(OR_{25})$, or $R_{15}$ and $R_{17}$ are together butadienylene either unsubstituted or substituted.

6. An optical recording medium according to claim 1, wherein in the heterocycle comprising $G_3$, $R_{16}$ is H or F, or together with $R_{15}$ is butadienylene either unsubstituted or substituted by one or more $C_1$-$C_4$alkyl, halogen, $OR_{23}$, $SR_{23}$, $NR_{22}R_{24}$, $CF_3$, $NO_2$, CN, $COR_{22}$, and/or $COOC_1$-$C_4$alkyl.

7. An optical recording medium according to claim 1, wherein $Q_5$ and $Q_7$ are S.

8. An optical recording medium according to claim 1, wherein $M_1$ is $Al^{3+}$, $As^{3+}$, $Au^{3+}$, $Bi^{3+}$, $Ce^{3+}$, $Co^{3+}$, $Cr^{3+}$, $Dy^{3+}$, $Er^{3+}$, $Eu^{3+}$, $Fe^{3+}$, $Gd^{3+}$, $Ho^{3+}$, $Ir^{3+}$, $La^{3+}$, $Lu^{3+}$, $Mn^{3+}$, $Mo^{3+}$, $Nb^{3+}$, $Nd^{3+}$, $Pm^{3+}$, $Pr^{3+}$, $Rh^{3+}$, $Ru^{3+}$, $Sb^{3+}$, $Sc^{3+}$, $Sm^{3+}$, $Ta^{3+}$, $Tb^{3+}$, $Ti^{3+}$, $[TiCl]^{3+}$, $[TiOH]^{3+}$, $Tm^{3+}$, $V^{3+}$, $[VO]^{3+}$, $W^{3+}$, $Y^{3+}$, $Yb^{3+}$, $[ZrCl]^{3+}$ or $[ZrOH]^{3+}$.

9. An optical recording medium according to claim 1, wherein n is 1 or 2.

10. A method for the optical recording or playback of information, wherein the information is recorded onto or played back from a recording medium according to claim 1, and the recording and/or the playback take place in a wavelength range of from 600 to 700 nm.

11. A method according to claim 10, wherein the recording medium has a groove depth of from 150 to 190 nm and the groove width is from 0.35 to 0.40 μm.

12. A method according to claim 10, wherein recording or playback of information takes place at a speed of from 20 to 60 m·s$^{-1}$.

13. A compound of formula (I)

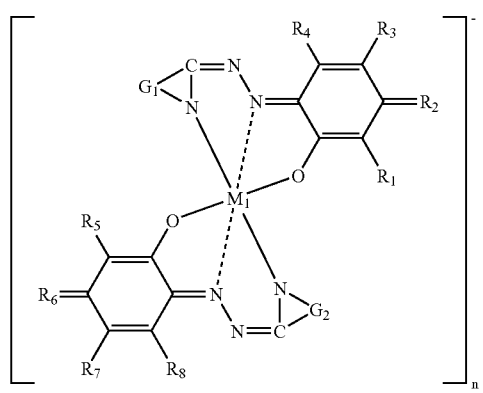

(I)

-continued

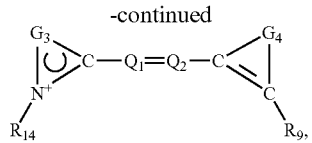

or a mesomeric or tautomeric form thereof, wherein
$M_1$ is a metal cation in the oxidation state +3, a hydroxy or halogeno metal group wherein the metal is in the oxidation state +4, or an oxo metal group wherein the metal is in the oxidation state +5;

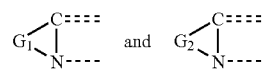

are each independently of the other

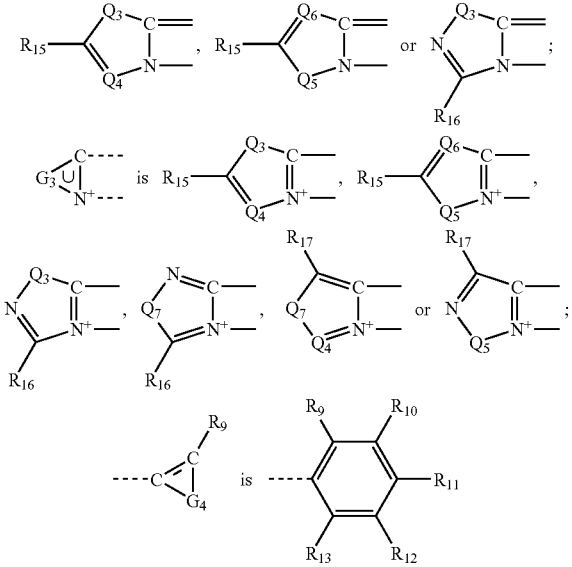

or $C_2$-$C_8$heteroaryl unsubstituted or mono- or poly-substituted by $R_{10}$, $R_{11}$, $R_{12}$ and/or $R_{13}$;

$Q_1$ is N or $CR_{18}$, $Q_2$ is N or $CR_{19}$, $Q_3$, $Q_5$ and $Q_7$ are each independently of the other $CR_{20}R_{21}$, O, S or $NR_{22}$, $Q_4$ is $CR_{16}$ or N and $Q_6$ is $CR_{17}$ or N ;

$R_1$, $R_3$, $R_4$, $R_5$, $R_7$, $R_8$, $R_9$, $R_{10}$, $R_{11}$, $R_{12}$, $R_{13}$, $R_{15}$, $R_{16}$, $R_{17}$, $R_{18}$ and $R_{19}$ are each independently of all others H, halogen, $OR_{23}$, $SR_{23}$, $NR_{22}R_{24}$, $NR_{22}COR_{25}$, $NR_{22}COOR_{26}$, $NR_{22}CONR_{26}R_{27}$, $NR_{22}CN$, $OSiR_{22}R_{25}R_{28}$, $COR_{22}$, $CR_{22}OR_{25}OR_{28}$, $NO_2$, CN, $COOR_{23}$, $CONR_{26}R_{27}$, $SO_2R_{22}$, $SO_2NR_{26}R_{27}$, $SO_3R_{26}$, $PO(OR_{22})(OR_{25})$; $C_1$-$C_6$alkenyl, $C_2$-$C_6$alkynyl, $C_2$-$C_6$alkynyl, $C_3$-$C_6$cycloalkyl, $C_3$-$C_6$cycloalkenyl or $C_2$-$C_5$heterocycloalkyl each unsubstituted or mono- or poly-substituted by halogen, $OR_{23}$, $SR_{23}$, $NR_{22}R_{24}$, $NR_{22}COR_{25}$, $NR_{22}COOR_{23}$, $NR_{22}CONR_{26}R_{27}$, $NR_{22}CN$, $COR_{22}$, $CR_{22}OR_{25}OR_{28}$, $NO_2$, CN, $COOR_{23}$, $CONR_{26}R_{27}$ and/or $SO_2R_{26}$; or $C_7$-$C_{11}$aralkyl, $C_6$-$C_{10}$aryl or $C_1$-$C_8$heteroaryl each unsubstituted or mono- or poly-substituted by $C_1$-$C_4$alkyl, halogen, $OR_{23}$, $SR_{23}$, $NR_{22}R_{24}$, $COR_{22}$, $NO_2$, CN and/or $COOC_1$-$C_4$alkyl; or $R_{15}$ and $R_{16}$ or $R_{15}$ and $R_{17}$ are together in pairs

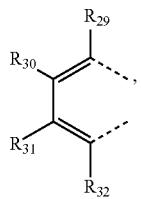

thus forming a phenyl ring together with the two adjacent carbons to which they are bound;

$R_2$ is O, S or $NR_{33}$;

$R_6$ is O, S or $NR_{33}$;

$R_{14}$ is $C_1$-$C_{12}$alkyl, $C_3$-$C_{12}$cycloalkyl, $C_1$-$C_{12}$heterocycloalkyl, $C_2$-$C_{12}$alkenyl, $C_3$-$C_{12}$cycloalkenyl, $C_4$-$C_{12}$heterocycloalkenyl, $C_7$-$C_{12}$aralkyl, $C_1$-$C_9$heteroaryl, $C_2$-$C_{11}$heteroaralkyl, $C_6$-$C_{12}$aryl or $C_1$-$C_{12}$alkyl interrupted by from one to five non-successive oxygen and/or sulfur atoms and/or by from one to five identical or different groups $NR_{22}$, each unsubstituted or mono- or poly-substituted by halogen, $OR_{23}$, $SR_{23}$, $NR_{22}R_{24}$, $NR_{22}COR_{25}$, $NR_{22}COOR_{26}$, $NR_{22}CONR_{26}R_{27}$, $NR_{22}CN$, $OSiR_{22}R_{25}R_{28}$, $COR_{22}$, $CR_{22}OR_{25}OR_{28}$, $NO_2$, CN, $COOR_{23}$, $CONR_{26}R_{27}$, $SO_2R_{22}$, $SO_2NR_{26}R_{27}$, $SO_3R_{26}$ or $PO(OR_{22})(OR_{25})$;

$R_{20}$ and $R_{21}$ are each independently of the other $C_1$-$C_{12}$alkyl, $C_2$-$C_{12}$alkenyl, $C_2$-$C_{12}$alkynyl, $C_7$-$C_{12}$aralkyl, $C_3$-$C_{12}$cycloalkyl, $C_3$-$C_{12}$cycloalkenyl or $C_2$-$C_{11}$heterocycloalkyl each unsubstituted or mono- or poly-substituted by halogen, $OR_{23}$, $SR_{23}$, $NR_{22}R_{24}$, $NR_{22}COR_{25}$, $NR_{22}COOR_{23}$, $NR_{22}CONR_{26}R_{27}$, $NR_{22}CN$, $COR_{22}$, $CR_{22}OR_{25}OR_{28}$, $NO_2$, CN, $COOR_{23}$, $CONR_{26}R_{27}$ and/or $SO_2R_{26}$; or $R_{20}$ and $R_{21}$ are together $C_2$-$C_{12}$alkylene, $C_2$-$C_{12}$alkenylene, $C_2$-$C_{12}$cycloalkylene or $C_2$-$C_{12}$cycloalkenylene, one to five non-successive carbon atoms of which can be replaced by oxygen and/or sulfur atoms and/or by identical or different groups $NR_{22}$, $C_2$-$C_{12}$alkylene, $C_2$-$C_{12}$alkenylene, $C_2$-$C_{12}$cycloalkylene or $C_2$-$C_{12}$cycloalkenylene being each unsubstituted or mono- or poly-substituted by, halogen, $OR_{23}$, $SR_{23}$, $NR_{22}R_{24}$, $NR_{22}COR_{25}$, $NR_{22}COOR_{23}$, $NR_{22}CONR_{26}R_{27}$, $NR_{22}CN$, $COR_{22}$, $CR_{22}OR_{25}OR_{28}$, $NO_2$, CN, $COOR_{23}$, $CONR_{26}R_{27}$ and/or $SO_2R_{26}$;

$R_{22}$, $R_{25}$ and $R_{28}$ are each independently of the others hydrogen; $C_1$-$C_4$alkyl, $C_2$-$C_4$alkenyl, $C_2$-$C_4$alkynyl, $[C_2$-$C_3$alkylene-O—$]_k$—$R_{34}$ or $[C_2$-$C_3$alkylene-$NR_{35}$—$]_k$—$R_{34}$ each unsubstituted or mono- or poly-substituted by halogen; or benzyl;

each $R_{23}$, independently of any other $R_{23}$, is $R_{24}$ or $COR_{24}$, $CONR_{24}R_{24}$, CN, $SO_2NR_{24}R_{24}$ or $SO_2R_{24}$;

each $R_{24}$ independently of any other $R_{24}$ is H; $C_1$-$C_6$alkyl, $C_2$-$C_6$alkenyl, $C_2$-$C_6$alkynyl, $C_3$-$C_6$cycloalkyl, $C_3$-$C_6$cycloalkenyl or $C_2$-$C_5$heterocycloalkyl each unsubstituted or mono- or poly-substituted by halogen, $OR_{28}$, $SR_{28}$, $NR_{22}R_{28}$, CN and/or $COOR_{22}$; or $C_6$-$C_{10}$aryl, $C_7$-$C_{11}$aralkyl or $C_1$-$C_8$heteroaryl each unsubstituted or mono- or poly-substituted by $C_1$-$C_4$alkyl, halogen, $OR_{28}$, $SR_{28}$, $NR_{22}R_{25}$, $COR_{22}$, $CR_{22}OR_{25}OR_{28}$, $NO_2$, CN and/or $COOR_{28}$;

$R_{26}$ and $R_{27}$ are each independently of the others H; $C_1$-$C_6$alkyl, $C_2$-$C_6$alkenyl, $C_2$-$C_6$alkynyl, $C_3$-$C_6$cycloalkyl, $C_3$-$C_6$cycloalkenyl or $C_2$-$C_5$heterocycloalkyl each unsubstituted or mono- or poly-substituted by halogen, $OR_{23}$, $SR_{23}$, $NR_{22}R_{28}$, CN and/or $COOR_{22}$; or $C_6$-$C_{10}$aryl, $C_7$-$C_{11}$aralkyl or $C_1$-$C_8$heteroaryl each unsubstituted or mono- or poly-substituted by $C_1$-$C_4$alkyl, halogen, $OR_{23}$, $SR_{23}$, $NR_{22}R_{25}$, $COR_{22}$, $CR_{22}OR_{25}OR_{28}$, $NO_2$, CN and/or $COOR_{28}$;

or $NR_{22}R_{24}$, $NR_{22}R_{25}$, $NR_{25}R_{28}$ or $NR_{26}R_{27}$ is a five- or six-membered heterocycle which may contain a further N or O atom and which can be mono- or poly-substituted by methyl or ethyl;

$R_{29}$, $R_{30}$, $R_{31}$ and $R_{32}$ are each independently of the other H, $C_1$-$C_4$alkyl, halogen, $OR_{23}$, $SR_{23}$, $NR_{22}R_{24}$, $COR_{22}$, $NO_2$, CN or $COOC_1$-$C_4$alkyl;

$R_{33}$ is $COR_{24}$, $CONR_{26}R_{27}$, CN, $SO_2NR_{26}R_{27}$ or $SO_2R_{26}$;

$R_{34}$ and $R_{35}$ are each independently of the other methyl, ethyl, vinyl or allyl;

it being possible once or more times for radicals of the same or different substituents each selected from the group consisting of $R_1$, $R_3$, $R_4$, $R_5$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{22}$, $R_{23}$, $R_{24}$, $R_{25}$, $R_{26}$, $R_{28}$, $R_{29}$, $R_{30}$, $R_{31}$, $R_{32}$, $R_{34}$ and $R_{36}$ to be bonded to one another in pairs by way of a direct bond or an —O—, —S— or —N($R_{35}$)— bridge, optionally forming a dimer, trimer or oligomer comprising two or more identical or different moieties of formula (I);

k is an integer 1, 2, 3 or 4; and n is an integer 1, 2 or 3.

14. A compound of formula (I) according to claim 13, wherein n is 1 or wherein n is 2 and one of $G_3$, $R_9$, $R_{10}$, $R_{11}$, $R_{12}$, $R_{13}$ or $R_{14}$, comprises a positively charged N-substituted $C_1$-$C_5$heteroaryl group.

15. A compound of formula (I) according to claim 13, wherein $Q_3$ is S in

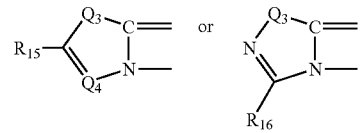

standing for

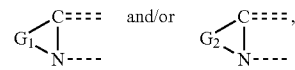

and/or $Q_3$ is $CR_{20}R_{21}$.

16. A compound according to claim 13, which is a dimer or trimer comprising two or three identical or different moieties of formula (I).

17. A compound according to claim 13, wherein $G_3$ comprises

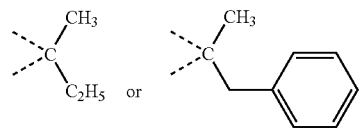

as $Q_3$, and $R_{15}$—C═$Q_4$ is part of a phenyl ring.

18. An optical recording medium according to claim 1 comprising a compound of formula (I) and a compound of formula

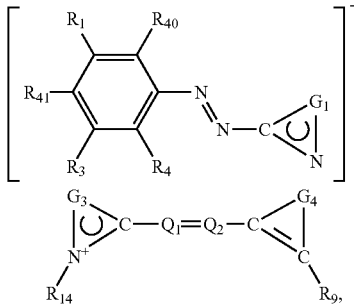

(III)

wherein one of $R_{40}$ and $R_{41}$ is $NR_{42}R_{43}$, $NR_{43}R_{44}$, $NR_{44}R_{45}$, $OR_{42}$, $SR_{42}$, $OR_{44}$ or $SR_{44}$, and the other of $R_{40}$ and $R_{41}$ is $O^-$, $S^-$ or $N^-R_{46}$;

$R_{42}$ and $R_{43}$ are each independently of the other $C_1$-$C_{12}$alkyl, $C_2$-$C_{12}$alkenyl, $C_2$-$C_{12}$alkynyl, $C_3$-$C_{12}$cycloalkyl, $C_3$-$C_{12}$cycloalkenyl or $C_2$-$C_{11}$heterocycloalkyl each unsubstituted or mono- or poly-substituted by halogen, $OR_{47}$, $SR_{47}$, $CR_{48}OR_{49}OR_{50}$, $NR_{48}R_{51}$, $NR_{48}COR_{49}$, $NR_{48}COOR_{47}$, $NR_{48}CONR_{52}R_{53}$, $NR_{48}CN$, $COR_{48}$, $NO_2$, $CN$, $COOR_{47}$, $CONR_{52}R_{53}$ and/or $SO_2R_{52}$; or $R_{42}$ and $R_{43}$ are together $C_2$-$C_{12}$alkylene, $C_2$-$C_{12}$alkenylene, $C_2$-$C_{12}$cycloalkylene or $C_2$-$C_{12}$cycloalkenylene, one to five non-successive carbon atoms of which can be replaced by oxygen and/or sulfur atoms and/or by identical or different groups $NR_{46}$, $C_2$-$C_{12}$alkylene, $C_2$-$C_{12}$alkenylene, $C_2$-$C_{12}$cycloalkylene or $C_2$-$C_{12}$cycloalkenylene being each unsubstituted or mono- or poly-substituted by halogen, $OR_{47}$, $SR_{47}$, $NR_{48}R_{51}$, $NR_{48}COR_{49}$, $NR_{48}COOR_{47}$, $NR_{48}CONR_{52}R_{53}$, $NR_{48}CN$, $COR_{48}$, $CR_{48}OR_{49}OR_{50}$, $NO_2$, $CN$, $COOR_{47}$, $CONR_{52}R_{53}$ and/or $SO_2R_{52}$;

$R_{44}$, $R_{45}$ and $R_{46}$ are each independently of the others H, $COR_{51}$, $CONR_{52}R_{53}$, $CN$, $SO_2NR_{52}R_{53}$ or $SO_2R_{52}$;

each $R_{47}$, independently of any other $R_{47}$, is $R_{51}$ or $R_{46}$;

$R_{48}$, $R_{49}$ and $R_{50}$ are each independently of the others hydrogen; $C_1$-$C_4$alkyl, $C_2$-$C_4$alkenyl, $C_2$-$C_4$alkynyl, [$C_2$-$C_3$alkylene-O—]$_p$—$R_{54}$ or [$C_2$-$C_3$alkylene-$NR_{55}$—]$_p$—$R_{54}$ each unsubstituted or mono- or poly-substituted by halogen; or benzyl;

$R_{51}$, $R_{52}$ and $R_{53}$ are each independently of the others H; $C_1$-$C_6$alkyl, $C_2$-$C_6$alkenyl, $C_2$-$C_6$alkynyl, $C_3$-$C_6$cycloalkyl, $C_3$-$C_6$cycloalkenyl or $C_2$-$C_5$heterocycloalkyl each unsubstituted or mono- or poly-substituted by halogen, $OR_{48}$, $SR_{48}$, $NR_{48}R_{50}$, $CN$ and/or $COOR_{48}$; or $C_6$-$C_{10}$aryl, $C_7$-$C_{11}$aralkyl or $C_1$-$C_5$heteroaryl each unsubstituted or mono- or poly-substituted by $C_1$-$C_4$alkyl, halogen, $OR_{48}$, $SR_{48}$, $NR_{48}R_{49}$, $COR_{48}$, $CR_{48}OR_{49}OR_{50}$, $NO_2$, $CN$ or $COOR_{50}$;

or $NR_{48}R_{49}$, $NR_{48}R_{51}$, $NR_{49}R_{50}$ or $NR_{52}R_{53}$ is a five- or six-membered heterocycle which may contain a further N or O atom and which can be mono- or poly-substituted by methyl or ethyl;

$R_{54}$ and $R_{55}$ are each independently of the other methyl, ethyl, vinyl or allyl;

it being possible once or more times for radicals of the same or different substituents each selected from the group consisting of $R_1$, $R_3$, $R_4$, $R_{40}$, $R_{41}$, $R_{42}$, $R_{45}$, $R_{46}$, $R_{47}$, $R_{48}$, $R_{49}$, $R_{50}$, $R_{51}$, $R_{52}$ and $R_{54}$ to be bonded to one another in pairs by way of a direct bond or an —O—, —S— or —N($R_{55}$)— bridge; and p is an integer from 1 to 4.

* * * * *